United States Patent
Hoots et al.

(10) Patent No.: US 9,630,127 B2
(45) Date of Patent: Apr. 25, 2017

(54) FILTER VESSEL ASSEMBLY AND RELATED METHODS OF USE

(75) Inventors: Joshua Lee Hoots, Clemmons, NC (US); Jon Terence Stone, Clemmons, NC (US); Michael Todd Pace, Winston-Salem, NC (US)

(73) Assignee: Hayward Industries, Inc., Elizabeth, NJ (US)

( * ) Notice: Subject to any disclaimer, the term of this patent is extended or adjusted under 35 U.S.C. 154(b) by 1115 days.

(21) Appl. No.: 13/547,244

(22) Filed: Jul. 12, 2012

(65) Prior Publication Data

US 2013/0020246 A1 Jan. 24, 2013

Related U.S. Application Data

(60) Provisional application No. 61/509,485, filed on Jul. 19, 2011.

(51) Int. Cl.
*B01D 35/30* (2006.01)
*B01D 29/27* (2006.01)
(Continued)

(52) U.S. Cl.
CPC .............. *B01D 29/27* (2013.01); *B01D 29/13* (2013.01); *B01D 35/30* (2013.01); *B01D 36/001* (2013.01); *B01D 2201/0407* (2013.01); *B01D 2201/0415* (2013.01); *B01D 2201/0423* (2013.01); *B01D 2201/304* (2013.01); *B01D 2201/4084* (2013.01)

(58) Field of Classification Search
None
See application file for complete search history.

(56) References Cited

U.S. PATENT DOCUMENTS

| 2,081,968 A | 6/1937 | Wicks et al. |
| 2,106,218 A | 1/1938 | Krieck |

(Continued)

FOREIGN PATENT DOCUMENTS

| EP | 0 937 868 A1 | 8/1999 |
| WO | WO 2010/139706 | 12/2010 |

OTHER PUBLICATIONS

European Search Report and Opinion for European patent Application No. EP 12 17 7107, completed Jun. 14, 2013 (11 pages).

(Continued)

*Primary Examiner* — Thomas M Lithgow
(74) *Attorney, Agent, or Firm* — McCarter & English, LLP

(57) ABSTRACT

Improved filter vessel assemblies for filtering fluids in fluid systems (e.g., industrial and/or commercial systems) are provided. More particularly, the present disclosure provides for advantageous filter vessel assemblies that include a releasable locking assembly for a removable filter member (e.g., a filter bag). The present disclosure provides for improved systems/designs for easily securing and/or unsecuring removable filter members to or from a locking assembly of a filter vessel assembly. Improved, convenient, low-cost and/or effective systems and methods for easily securing and/or unsecuring removable filter members to or from a filter vessel assembly by utilizing advantageous locking assemblies associated with a supporting assembly or basket assembly of the filter vessel assembly are provided.

76 Claims, 61 Drawing Sheets

(51) Int. Cl.
    *B01D 29/13*    (2006.01)
    *B01D 36/00*    (2006.01)

(56) References Cited

U.S. PATENT DOCUMENTS

| | | | |
|---|---|---|---|
| 2,156,329 A | | 5/1939 | Beck |
| 2,298,674 A | | 10/1942 | Burhans |
| 2,982,413 A | | 5/1961 | Kraissl, Jr. |
| 3,122,501 A | * | 2/1964 | Hultgren ............ B01D 29/114 |
| | | | 210/444 |
| 3,282,434 A | | 11/1966 | Pall |
| 3,931,015 A | | 1/1976 | Jenkins |
| 4,124,511 A | | 11/1978 | Lay |
| 4,157,964 A | | 6/1979 | Rishel |
| 4,251,374 A | * | 2/1981 | Cunningham ......... B01D 24/12 |
| | | | 210/232 |
| 4,253,959 A | | 3/1981 | Tafara |
| 4,356,791 A | | 11/1982 | Ward et al. |
| 4,419,240 A | | 12/1983 | Rosaen |
| 4,637,879 A | | 1/1987 | Hartley |
| 4,683,057 A | | 7/1987 | Krause et al. |
| 4,693,820 A | | 9/1987 | Baxter |
| 4,721,563 A | | 1/1988 | Rosaen |
| 4,775,469 A | | 10/1988 | Zimmerly |
| 4,935,134 A | | 6/1990 | Hensgen et al. |
| 4,948,504 A | * | 8/1990 | Kierdorf ............... B01D 29/27 |
| | | | 210/238 |
| 5,006,243 A | | 4/1991 | Arnaud |
| D361,823 S | | 8/1995 | Layton et al. |
| 5,441,650 A | * | 8/1995 | Kirsgalvis ............ B01D 29/23 |
| | | | 210/452 |
| 5,514,275 A | | 5/1996 | Morgan, Jr. |
| 5,624,559 A | | 4/1997 | Levin et al. |
| 6,101,996 A | * | 8/2000 | Arita ..................... B01D 29/21 |
| | | | 123/196 A |
| 6,776,906 B2 | * | 8/2004 | Reid .................... B01D 35/303 |
| | | | 210/232 |
| 7,959,803 B2 | * | 6/2011 | Antoun ................ B01D 29/27 |
| | | | 210/232 |
| 8,978,898 B2 | * | 3/2015 | Sakairi ................. B01D 29/27 |
| | | | 210/448 |

OTHER PUBLICATIONS

Response to European Search Report and Opinion for European patent Application No. EP 12 17 7107, filed Feb. 5, 2014 with the EPO (25 pages).

Partial European Search Report, Application No. EP 12 17 7107, dated: Oct. 26, 2012, Prepared by Sergio Arrojo, Examiner of the European Patent Office, Munich, 4 pages.

\* cited by examiner

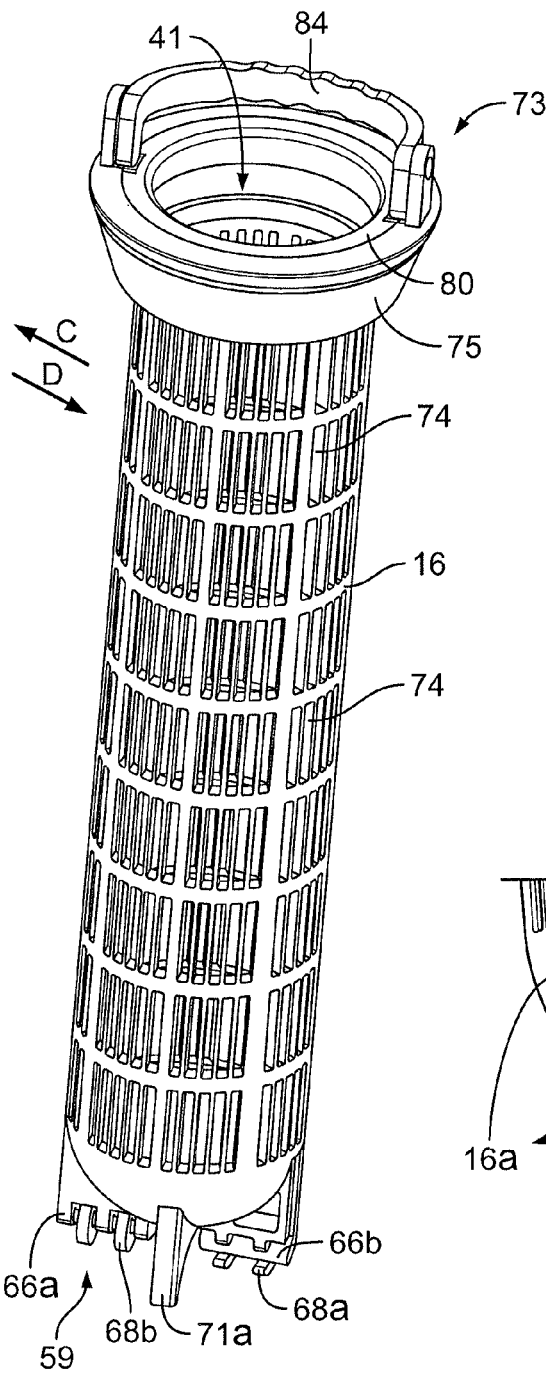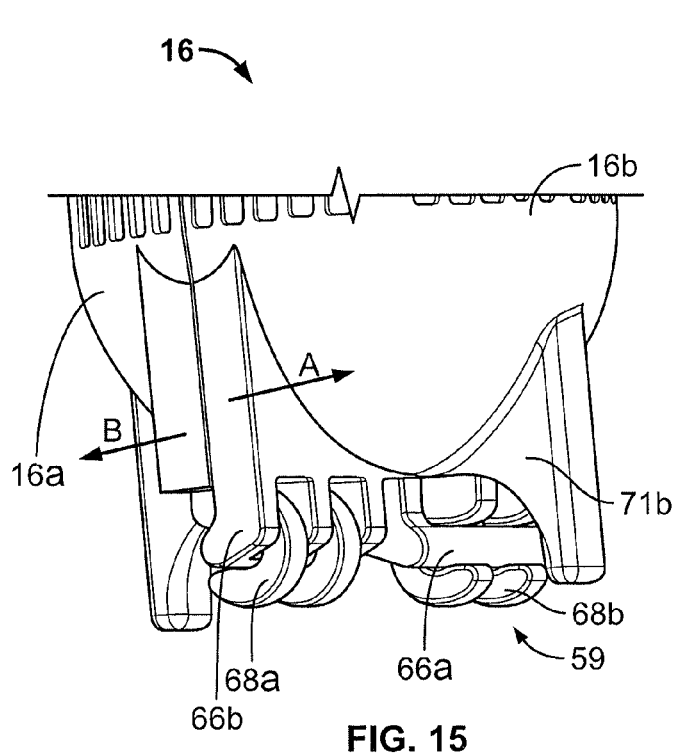
FIG. 14
FIG. 15

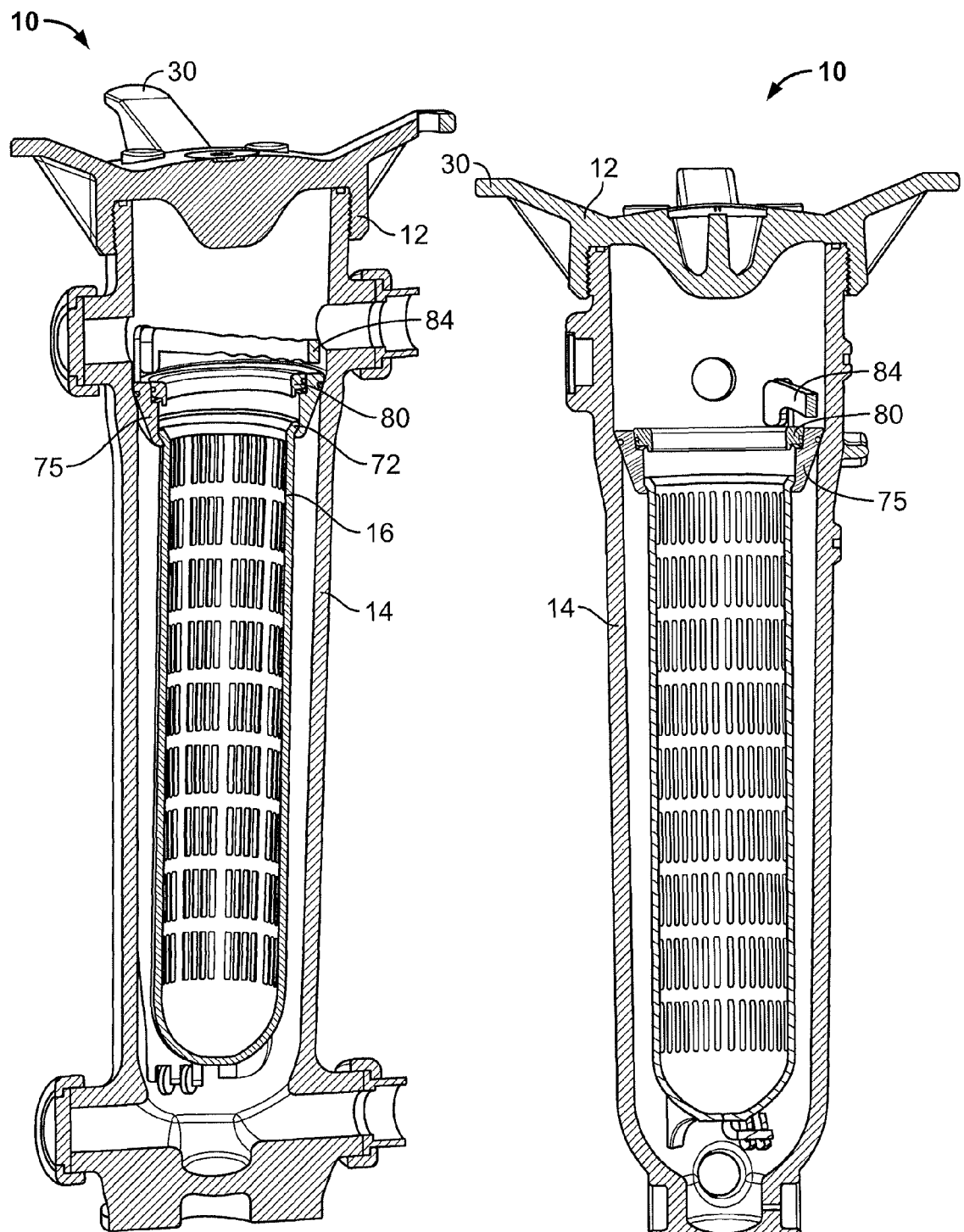

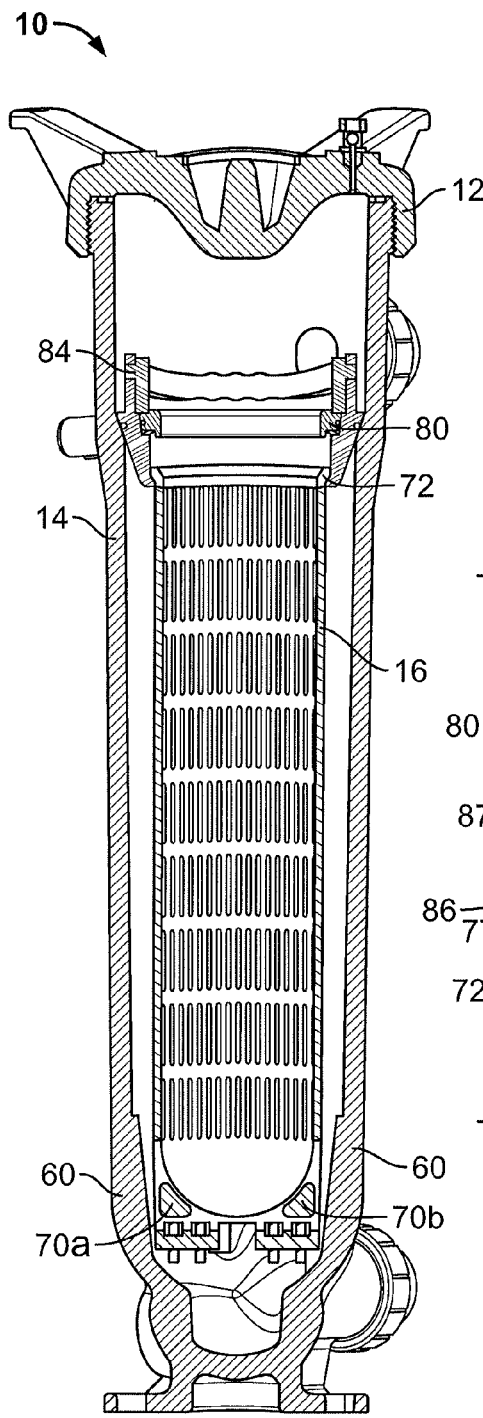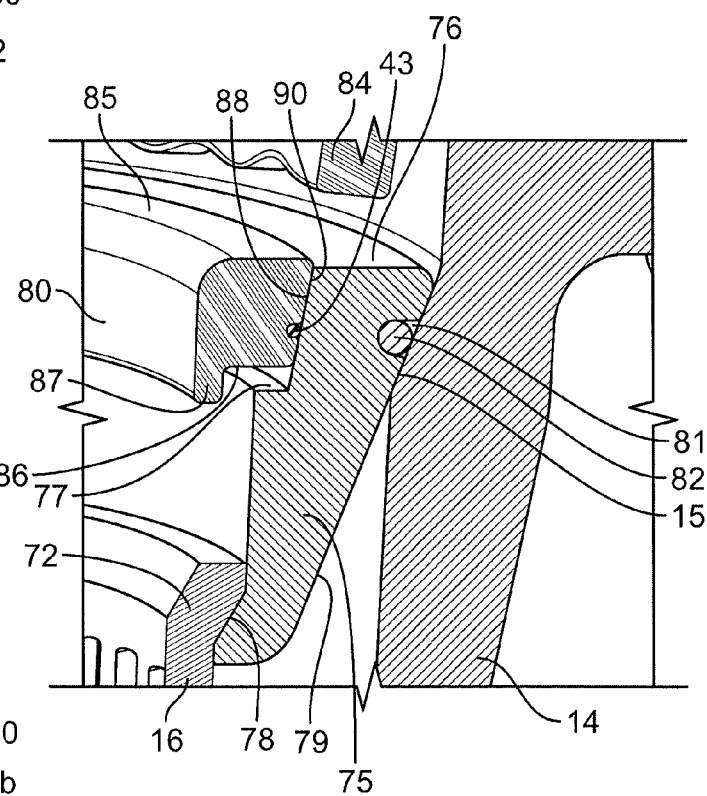
FIG. 23
FIG. 24

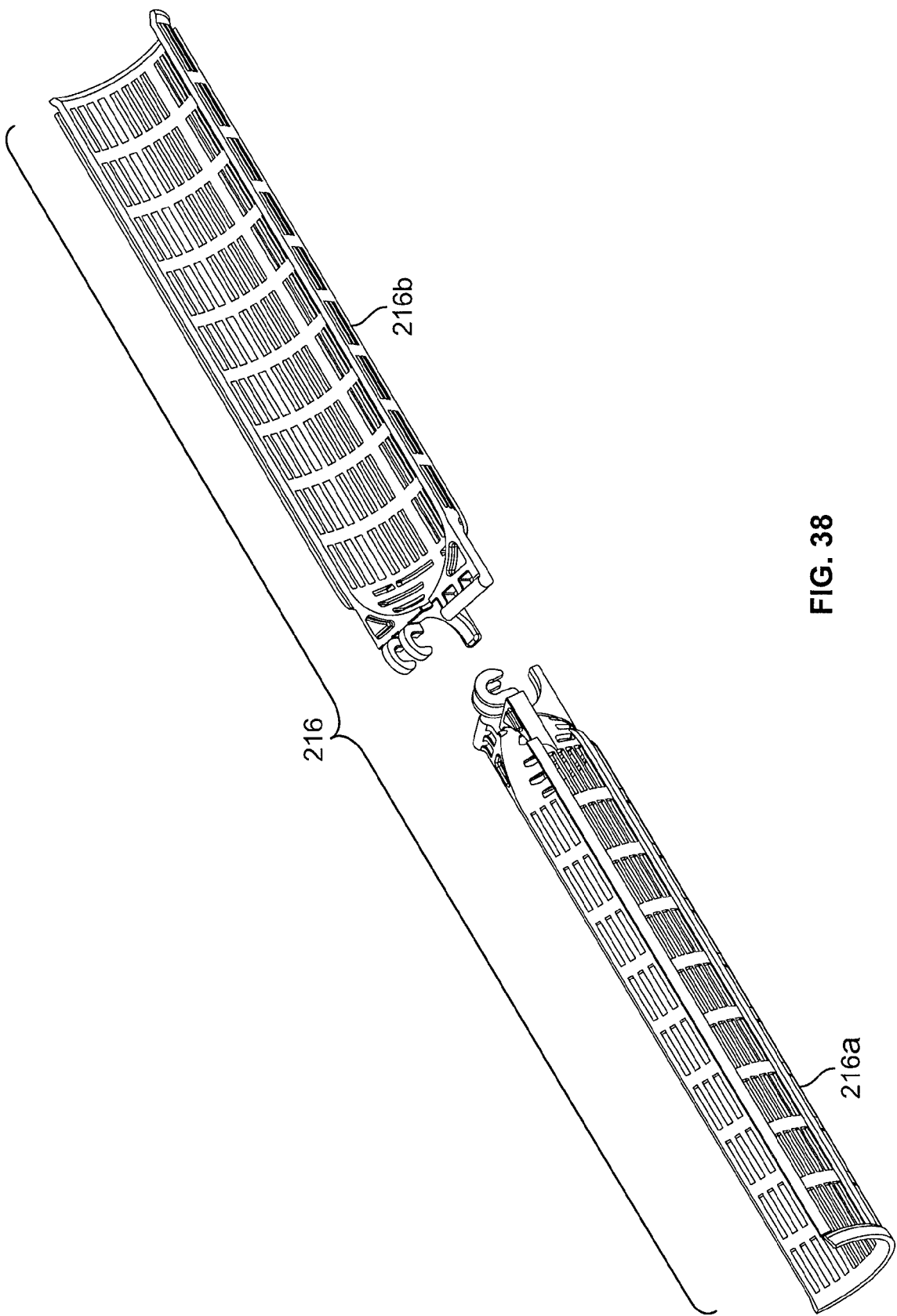

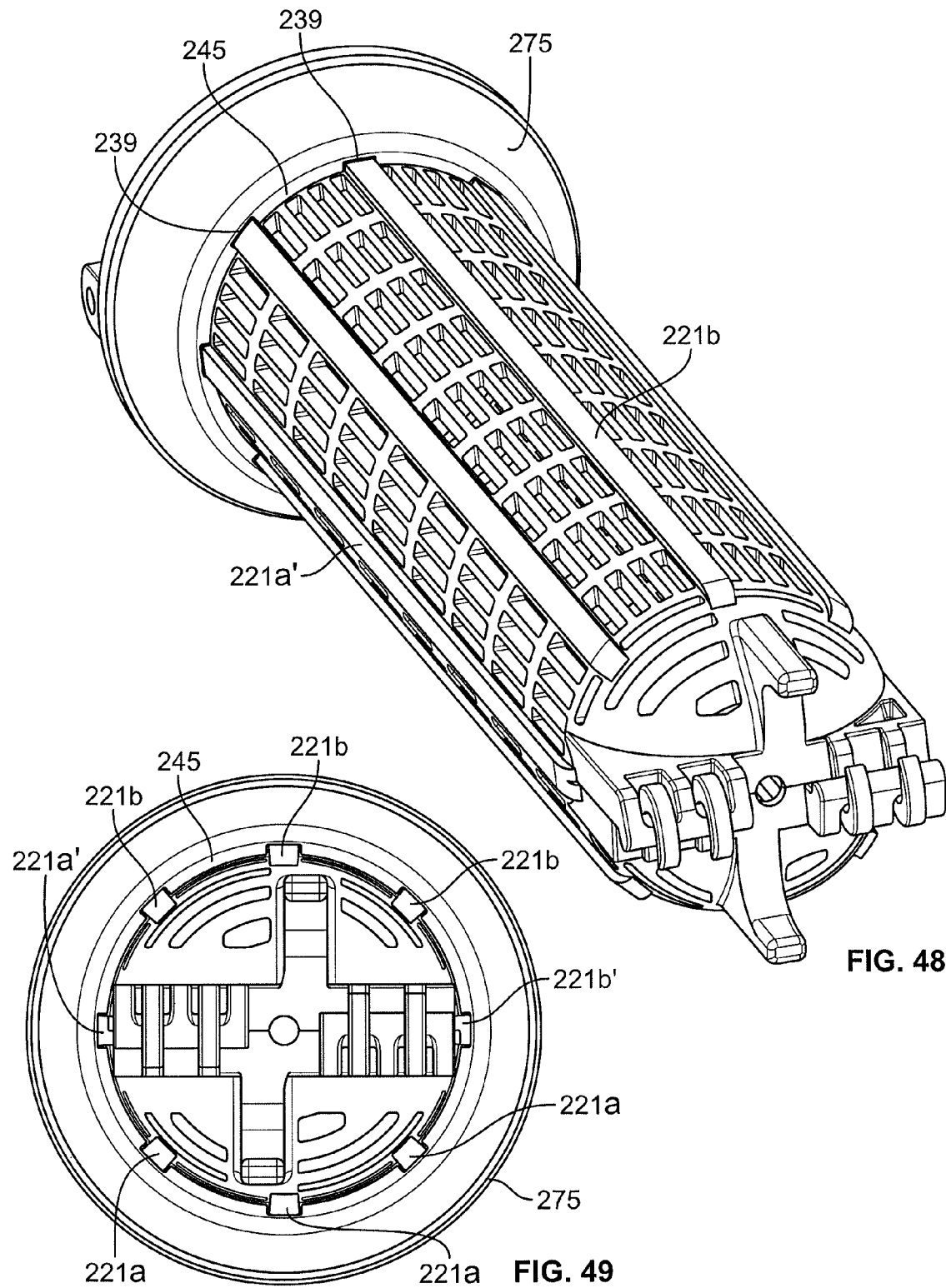

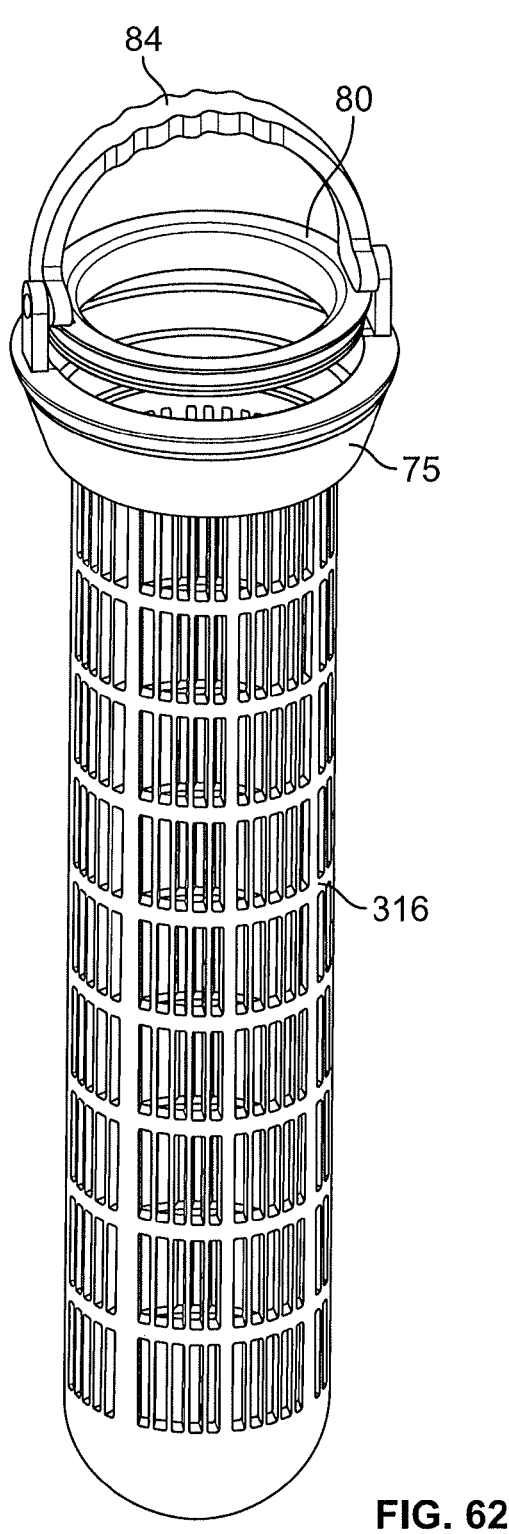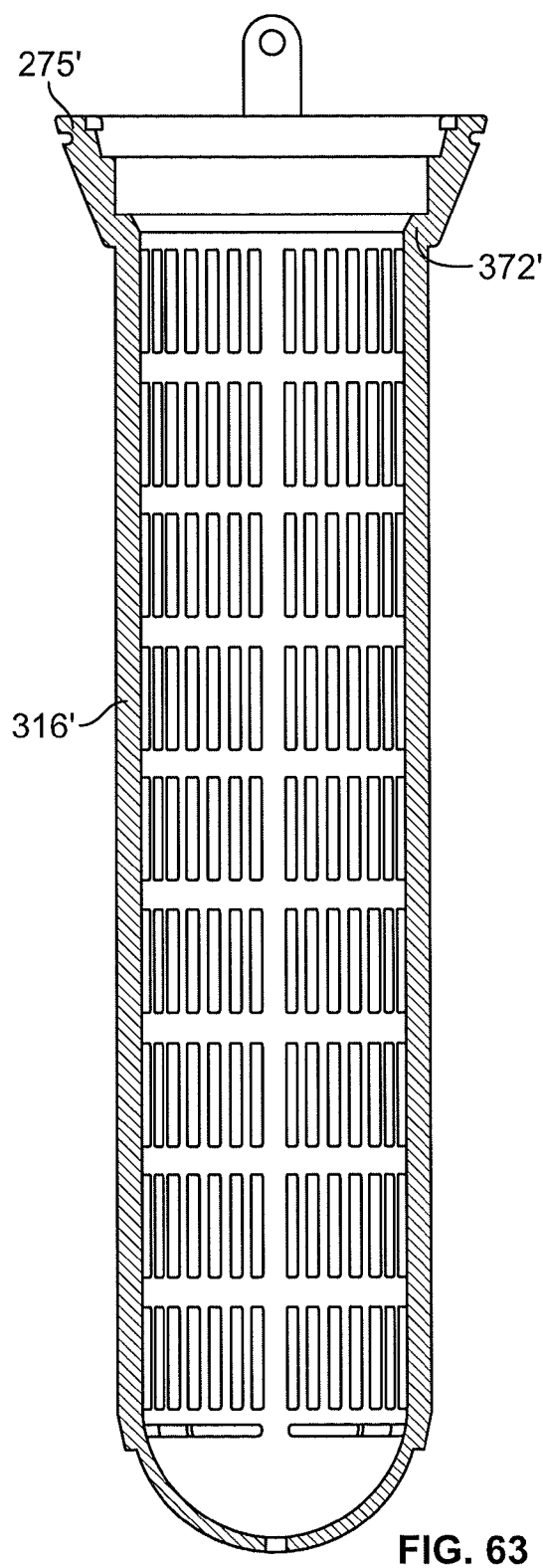
FIG. 62　　FIG. 63

FILTER VESSEL ASSEMBLY AND RELATED METHODS OF USE

CROSS-REFERENCE TO RELATED APPLICATIONS

This application claims the benefit of U.S. Provisional Patent Application Ser. No. 61/509,485, filed Jul. 19, 2011, the entire contents of which is herein incorporated by reference in its entirety.

BACKGROUND

1. Technical Field

The present disclosure generally relates to filter vessel assemblies for filtering fluids in fluid systems (e.g., industrial and/or commercial systems) and, more particularly, to filter vessel assemblies that include a releasable locking assembly for a removable filter member (e.g., a filter bag).

2. Background Art

In general, filter assemblies for filtering fluids in fluid systems (e.g., industrial and/or commercial systems) are known. For example, filter assemblies utilizing a filter member (e.g., a filter bag or filter cartridge) through which the fluid is filtered through to remove contaminants or the like from the fluid have been developed. Fluid filter assemblies are useful in a myriad of different environments for commercial and industrial applications.

Some conventional filter assemblies typically include a filter housing that is configured to house, contain and/or position a filter member. For example, such conventional filter assemblies are described and disclosed in U.S. Pat. Nos. 2,081,968; 2,106,218; 2,156,329; 3,931,015; 4,253,959; 4,419,240; 4,721,563 and 5,624,559, the entire contents of each being hereby incorporated by reference in their entireties.

Filter assemblies utilizing a filter bag typically utilize a basket member or the like to house, secure and/or position the filter bag. In general, it is desirable to have filter bags that are easily secured to or unsecured from such basket members or associated assemblies. For example, operators or technicians are frequently confronted with the need to secure or unsecure filter bags to or from basket members or associated assemblies during conventional procedures and/or under difficult conditions.

Thus, despite efforts to date, a need remains for improved systems/designs for easily securing and/or unsecuring removable filter members to or from a filter assembly. These and other inefficiencies and opportunities for improvement are addressed and/or overcome by the systems, assemblies and methods of the present disclosure.

SUMMARY

The present disclosure provides for improved filter vessel assemblies for filtering fluids in fluid systems (e.g., industrial and/or commercial systems). More particularly, the present disclosure provides for advantageous filter vessel assemblies that include a releasable locking assembly for a removable filter member (e.g., a filter bag). In general, the present disclosure provides for improved systems/designs for easily securing and/or unsecuring removable filter members to or from a locking assembly of a filter vessel assembly. In exemplary embodiments, the present disclosure provides for improved, convenient, low-cost and/or effective systems and methods for easily securing and/or unsecuring removable filter members to or from a filter vessel assembly by utilizing advantageous locking assemblies associated with a supporting assembly or basket assembly of the filter vessel assembly.

The present disclosure provides for a filter vessel assembly including an elongated housing having an interior surface; a supporting assembly disposed within the housing; a removable filter member configured to be at least partially disposed within the supporting assembly; a locking assembly including a first securing member, a second securing member and a locking member disposed within the housing; wherein the locking member is movably secured with respect to the first securing member, thereby allowing a user to move the locking member to a desired position; wherein at least a portion of the first securing member is sized to rest upon at least a portion of the interior surface of the housing; wherein at least a portion of the supporting assembly is configured to mount with respect to at least a portion of the first securing member; wherein at least a portion of the filter member is sized to rest upon at least a portion of the first securing member; wherein at least a portion of the second securing member is configured to be positioned above at least a portion of the filter member resting upon the first securing member; and wherein the movably secured locking member is configured to allow the user to move the locking member to engage at least a portion of the locking member with at least a portion of at least one of the first and second securing member to releasably secure the filter member to the locking assembly.

The present disclosure also provides for a filter vessel assembly wherein the housing includes an open end and at least one fluid inlet; wherein the interior surface of the housing includes an intermediate interior surface that extends inwardly toward the center of the housing; wherein at least a portion of the first securing member is sized to rest upon at least a portion of the intermediate interior surface of the housing; and wherein the intermediate interior surface of the housing is positioned below the at least one fluid inlet relative to the open end of the housing.

The present disclosure also provides for a filter vessel assembly wherein the housing includes an open end; and further including a cover member removably mounted with respect to the open end of the housing; and wherein the cover member fluidically seals the open end of the housing when the cover member is removably mounted with respect to the open end of the housing. The present disclosure also provides for a filter vessel assembly wherein the open end of the housing includes external threads, the external threads having a non-threaded section that is configured to allow fluid to escape from the housing via the non-threaded section when the cover member is mounted with respect to the open end of the housing, and at least one of: (i) the housing is over-pressurized, (ii) the user is attempting to remove the cover member from the open end of the housing without de-pressurizing the housing, and (iii) the user has not fully secured the cover member to the housing and is attempting to pressurize the housing.

The present disclosure also provides for a filter vessel assembly wherein the open end of the housing includes a groove that extends around the perimeter of the open end of the housing, the groove defined by a lower wall, an outer wall and an inner wall, the inner wall including at least one slot configured to allow fluid to drain from the outer wall to the center of the housing; and wherein the lower wall extends from the outer wall to the inner wall at a downward angle between about 1° to about 10° toward the center of the housing.

The present disclosure also provides for a filter vessel assembly wherein the groove is configured to house a gasketing material; wherein the cover member is configured to create a sealing surface with the gasketing material housed in the groove of the open end of the housing when the cover member is mounted with respect to the open end of the housing; and wherein internal pressure forces the gasketing material toward the outer wall when the cover member is mounted with respect to the open end of the housing.

The present disclosure also provides for a filter vessel assembly wherein the housing includes first and second fluid inlets, first and second fluid outlets, at least one fluid inlet boss, and first and second fluid outlet bosses; wherein the first fluid inlet includes a removable cap that fluidically seals the first fluid inlet and the first fluid outlet includes a removable cap that fluidically seals the first fluid outlet; and wherein the second fluid inlet includes a hollow connector member and the second fluid outlet includes a hollow connector member. The present disclosure also provides for a filter vessel assembly wherein the first and second fluid inlets and the at least one fluid inlet boss are positioned at an upper end of the housing; wherein the first and second fluid outlets and the first and second fluid outlet bosses are positioned at a lower end of the housing; wherein the at least one fluid inlet boss is positioned about 90° from the first and second fluid inlets on the housing; and wherein the first and second fluid outlet bosses are positioned about 90° from the first and second fluid outlets on the housing.

The present disclosure also provides for a filter vessel assembly wherein the supporting assembly includes an open end having a collar member; wherein the collar member is substantially annular and extends outwardly from and around the perimeter of the open end of the supporting assembly; and wherein at least a portion of the collar member is configured to mount with respect to at least a portion of the first securing member.

The present disclosure also provides for a filter vessel assembly wherein the filter member is a removable filter bag that includes an open end and a sealing member; wherein the sealing member of the filter member is positioned proximal the open end of the filter member; and wherein at least a portion of the sealing member is sized to rest upon at least a portion of the first securing member.

The present disclosure also provides for a filter vessel assembly wherein the interior surface of the housing includes at least one inner protrusion that is configured to guidingly engage the supporting assembly toward the center of the housing when the supporting assembly is disposed within the housing. The present disclosure also provides for a filter vessel assembly wherein the interior surface of the housing includes at least three inner protrusions positioned in a lower end of the housing, the at least three inner protrusions: (i) spaced substantially equidistantly apart from each adjacent inner protrusion, (ii) tapering inwardly from a top portion to a bottom portion of each protrusion toward the center of the housing, and (iii) configured to guidingly engage the supporting assembly toward the center of the housing when the supporting assembly is disposed within the housing.

The present disclosure also provides for a filter vessel assembly wherein the sealing member is a substantially annular member, the substantially annular member selected from the group consisting of a sewn-in member, a welded member, a fusion bonded member, a molded member, an adhered member, a folded member and a rolled member.

The present disclosure also provides for a filter vessel assembly wherein the housing defines a central vertical axis; and wherein the interior surface of the housing includes an intermediate interior surface that extends inwardly toward the center of the housing at an angle from about 15° to about 90° relative to the central vertical axis of the housing.

The present disclosure also provides for a filter vessel assembly wherein the second securing member includes an upper surface, the upper surface having a plurality of pairs of recessed portions disposed thereon; wherein each pair includes a first recessed portion and a second recessed portion, the first and second recessed portions positioned about 180° from one another about the upper surface of the second securing member; and wherein each pair includes a different recessed portion depth as compared to the depth of the other pairs of recessed portions.

The present disclosure also provides for a filter vessel assembly wherein the first securing member includes an upper surface having a first notch and a second notch; wherein the second securing member includes an upper surface having a first protuberance and a second protuberance extending therefrom; and wherein at least a portion of the first protuberance is configured to be positioned within the first notch and at least a portion of the second protuberance is configured to be positioned within the second notch.

The present disclosure also provides for a filter vessel assembly wherein first and second post members extend from the upper surface of the first securing member; and wherein each notch is positioned about 90° from each post member about the upper surface of the first securing member. The present disclosure also provides for a filter vessel assembly wherein the first securing member includes an upper surface, an intermediate surface, a lower surface, and an outer surface; wherein the second securing member includes an upper surface and a lower surface; and wherein the locking member extends from a first end to a second end.

The present disclosure also provides for a filter vessel assembly wherein the locking member is movably secured with respect to the upper surface of the first securing member, thereby allowing the user to move the locking member to a desired position; wherein at least a portion of the outer surface of the first securing member is sized to rest upon at least a portion of the interior surface of the housing; wherein at least a portion of the filter member is sized to rest upon at least a portion of the intermediate surface of the first securing member; and wherein at least a portion of the lower surface of the second securing member is configured to be positioned above at least a portion of the filter member resting upon the intermediate surface of the first securing member.

The present disclosure also provides for a filter vessel assembly wherein the movably secured locking member is configured to allow the user to move the locking member to engage at least a portion of at least one of the first and second end of the locking member with at least a portion of the upper surface of at least one of the first and second securing member to releasably secure the filter member to at least one of the first and second securing member.

The present disclosure also provides for a filter vessel assembly wherein the movably secured locking member is configured to allow the user to move the locking member to engage at least a portion of at least one of the first and second end of the locking member with at least a portion of the upper surface of at least one of the first and second securing member to releasably secure the filter member to at least one of the first and second securing member.

The present disclosure also provides for a filter vessel assembly wherein a first camming member extends from the first end of the locking member and a second camming member extends from the second end of the locking member; and wherein the movably secured locking member is configured to allow the user to move the locking member to engage at least a portion of at least one of the first and second camming member with at least a portion of the upper surface of at least one of the first and second securing member to releasably secure the filter member to at least one of the first and second securing member.

The present disclosure also provides for a filter vessel assembly wherein first and second post members extend from the upper surface of the first securing member; and wherein the first end of the locking member is movably secured with respect to the first post member and the second end of the locking member is movably secured with respect to the second post member.

The present disclosure also provides for a filter vessel assembly wherein the first post member includes a first receiving portion and the second post member includes a second receiving portion; wherein the locking member includes first and second mating members; and wherein the first mating member is configured to be movably secured with respect to the first receiving portion and the second mating member is configured to be movably secured with respect to the second receiving portion.

The present disclosure also provides for a filter vessel assembly wherein the first and second receiving portions are selected from the group consisting of apertures and recesses, and wherein the first and second mating members are selected from the group consisting of knobs and protrusions. The present disclosure also provides for a filter vessel assembly wherein the first and second receiving portions are selected from the group consisting of knobs and protrusions, and wherein the first and second mating members are selected from the group consisting of apertures and recesses.

The present disclosure also provides for a filter vessel assembly wherein the first securing member is a hollow, substantially ring-like basket member; and wherein the lower surface of the first securing member tapers inwardly toward the center of the first securing member. The present disclosure also provides for a filter vessel assembly wherein the intermediate surface of the first securing member extends inwardly to define a substantially planar shelf surface.

The present disclosure also provides for a filter vessel assembly wherein the outer surface of the first securing member extends inwardly toward the center of the first securing member; and wherein the outer surface of the first securing member includes a groove configured to house a gasketing material that forms a seal between the first securing member and the interior surface of the housing. The present disclosure also provides for a filter vessel assembly wherein the upper surfaces of the first and second securing members include a recessed portion disposed substantially adjacent to each post member. The present disclosure also provides for a filter vessel assembly wherein a first camming member extends from the first end of the locking member and a second camming member extends from the second end of the locking member; and wherein the movably secured locking member is configured to allow the user to move the locking member to engage at least a portion of at least one of the first and second camming member with at least at portion of the recessed portion of at least one of the first and second securing member to releasably secure the filter member to at least one of the first and second securing member.

The present disclosure also provides for a filter vessel assembly wherein the housing includes an open end and at least one fluid inlet; wherein the interior surface of the housing includes an intermediate interior surface that extends inwardly toward the center of the housing to define a substantially planar shelf surface; wherein at least a portion of the outer surface of the first securing member is sized to rest upon at least a portion of the intermediate interior surface of the housing; and wherein the intermediate interior surface of the housing is positioned below the at least one fluid inlet relative to the open end of the housing.

The present disclosure also provides for a filter vessel assembly wherein the second securing member is a hollow, substantially ring-like member; and wherein the lower surface of the second securing member includes a downwardly extending lip portion depending therefrom.

The present disclosure also provides for a filter vessel assembly wherein the locking member is a substantially C-shaped locking handle; and wherein the first mating member is positioned proximal the first end of the locking member and the second mating member is positioned proximal the second end of the locking member.

The present disclosure also provides for a filter vessel assembly wherein the filter member is a removable filter bag that includes an open end and a sealing member; wherein the sealing member of the filter member is substantially annular and is positioned proximal the open end of the filter member; wherein at least a portion of the sealing member is sized to rest upon at least a portion of the intermediate surface of the first securing member; and wherein the intermediate surface of the first securing member extends inwardly to define a substantially planar shelf surface. The present disclosure also provides for a filter vessel assembly wherein the first securing member further includes an interior surface; and wherein the second securing member further includes an outer surface having a groove configured to house a gasketing material, the gasketing material forming a seal with the interior surface of the first securing member when the filter member is releasably secured to the locking assembly.

The present disclosure also provides for a filter vessel assembly wherein the interior surface of the housing includes an intermediate interior surface that extends inwardly toward the center of the housing; and wherein the gasketing material housed in the groove of the outer surface of the first securing member forms a face seal between the first securing member and the intermediate interior surface of the housing.

The present disclosure also provides for a filter vessel assembly wherein the supporting assembly includes a first rib member that extends from an upper end of the supporting assembly to a position along the length of the supporting assembly; wherein the first securing member includes a lower surface having a first slot; and wherein at least a portion of the first rib member is configured to travel within the first slot to a position where the upper end of the supporting assembly rests upon at least a portion of the lower surface of the first securing member.

The present disclosure also provides for a filter vessel assembly wherein after the upper end of the supporting assembly rests upon at least a portion of the lower surface of the first securing member, the first securing member is configured to allow the user to rotate the first securing member to a position where the first slot is not aligned with the first rib member, thereby preventing the first rib member from traveling within the first slot.

The present disclosure also provides for a filter vessel assembly wherein at least one of the upper end of the first rib member and the first slot includes a camming surface; and wherein after the first securing member is rotated to a position where the first slot is not aligned with the first rib member, the camming surface releasably secures the first securing member to the supporting assembly. The present disclosure also provides for a filter vessel assembly wherein the supporting assembly includes a first supporting member and a second supporting member, the first and second supporting members configured to be releasably secured together to form the supporting assembly.

The present disclosure also provides for a filter vessel assembly wherein the first supporting member includes a first receiving rod, a first receiving opening and a first fastening member; wherein the second supporting member includes a second receiving rod, a second receiving opening and a second fastening member; and wherein at least a portion of the first fastening member is positioned around the second receiving rod and within at least a portion of the second receiving opening, and at least a portion of the second fastening member is positioned around the first receiving rod and within at least a portion of the first receiving opening to releasably secure the first and second supporting members together to form the supporting assembly.

The present disclosure also provides for a filter vessel assembly wherein the first supporting member includes a first receiving rod, first and second receiving openings and first and second fastening members; wherein the second supporting member includes a second receiving rod, third and fourth receiving openings and third and fourth fastening members; wherein when the first and second supporting members are releasably secured together to form the supporting assembly: (i) at least a portion of the first fastening member is positioned around the second receiving rod and within at least a portion of the third receiving opening, (ii) at least a portion of the second fastening member is positioned around the second receiving rod and within at least a portion of the fourth receiving opening, (iii) at least a portion of the third fastening member is positioned around the first receiving rod and within at least a portion of the first receiving opening, and (iv) at least a portion of the fourth fastening member is positioned around the first receiving rod and within at least a portion of the second receiving opening; and wherein the first and second fastening members are selected from the group consisting of U-shaped and C-shaped fastening members.

The present disclosure also provides for a filter vessel assembly wherein the supporting assembly is integrally mounted with respect to the first securing member.

The present disclosure also provides for a filter vessel assembly wherein the first supporting member includes a first extending portion and a first recessed portion; wherein the second supporting member includes a second extending portion and a second recessed portion; wherein when the first and second supporting members are releasably secured together to form the supporting assembly, at least a portion of the first extending portion is housed within the second recessed portion, and at least a portion of the second extending portion is housed within the first recessed portion; and wherein the first and second extending portions and the first and second recessed portions are substantially triangular in shape.

The present disclosure also provides for a filter vessel assembly wherein the first supporting member includes a first leg member and the second supporting member includes a second leg member; and wherein when the first and second supporting members are releasably secured together to form the supporting assembly, the first and second leg members are configured to allow the user to rest the supporting assembly on a surface via the first and second leg members.

The present disclosure also provides for a filter vessel assembly wherein the first supporting member includes a first rib member that extends from an upper end of the first supporting member to a position along the length of the first supporting member; wherein the second supporting member includes a second rib member that extends from an upper end of the second supporting member to a position along the length of the second supporting member; wherein the first securing member includes a lower surface having a first slot and a second slot; and wherein at least a portion of the first rib member is configured to travel within the first slot and at least a portion of the second rib member is configured to travel within the second slot to a position where the upper end of the supporting assembly rests upon at least a portion of the lower surface of the first securing member.

The present disclosure also provides for a filter vessel assembly wherein after the upper end of the supporting assembly rests upon at least a portion of the lower surface of the first securing member, the first securing member is configured to allow the user to rotate the first securing member to a position where the first and second slot are not aligned with the first and second rib members, thereby preventing the first and second rib members from traveling within the first and second slots.

The present disclosure also provides for a filter vessel assembly wherein the first supporting member includes a first plurality of rib members extending from an upper end of the first supporting member to a position along the length of the first supporting member; wherein the second supporting member includes a second plurality of rib members extending from an upper end of the second supporting member to a position along the length of the second supporting member; wherein when the first and second supporting members are releasably secured together to form the supporting assembly, each rib member of the first and second plurality is spaced substantially equidistantly apart from each adjacent rib member around the assembled supporting assembly; wherein the first securing member includes a lower surface having a plurality of slots; and wherein each rib member is configured to travel within one of the slots to a position where the upper end of the supporting assembly rests upon at least a portion of the lower surface of the first securing member.

The present disclosure also provides for a filter vessel assembly wherein the first rib member is positioned along an outer edge of the first supporting member, the first rib member extending a distance past the outer edge of the first supporting member; and wherein when the first and second supporting members are releasably secured together to form the supporting assembly, the first rib member substantially prevents lateral motion of the first and second supporting members.

The present disclosure also provides for a filter vessel assembly wherein the first supporting member includes at least a first receiving member at a lower end of the first supporting member, the first receiving member configured to receive at least a first portion of an elongated member; wherein the second supporting member includes at least a second receiving member at a lower end of the second supporting member, the second receiving member configured to receive at least a second portion of the elongated member; and wherein at least the first portion of the elongated member is positioned within the first receiving member and at least the second portion of the elongated member is positioned within the second receiving member to hingedly secure the first and second supporting members together.

The present disclosure also provides for a filter vessel assembly wherein the first supporting member includes a first plurality of receiving members configured to receive at least a portion of an elongated rod member, each receiving member of the first plurality having an aperture therethrough; wherein the second supporting member includes a second plurality of receiving members configured to receive at least a portion of the elongated rod member, each receiving member of the second plurality having an aperture therethrough; and wherein the first and second supporting members are hingedly secured together when: (i) each receiving member of the first plurality is positioned adjacent to a receiving member of the second plurality, and (ii) at least a portion of the elongated rod member is positioned within the apertures of the first and second plurality of receiving members.

The present disclosure also provides for a filter vessel assembly wherein the first supporting member includes a first rib member that extends from an upper end of the first supporting member to a position along the length of the first securing member; wherein the second supporting member includes a second rib member that extends from an upper end of the second supporting member to a position along the length of the second securing member; wherein the first rib member is positioned along an outer edge of the first supporting member, the first rib member extending a distance past the outer edge of the first supporting member; wherein the second rib member is positioned along an outer edge of the second supporting member, the second rib member extending a distance past the outer edge of the second supporting member; and wherein at least a first securement member is positioned around the first rib member and around at least a portion of the second supporting member, and at least a second securement member is positioned around the second rib member and around at least a portion of the first supporting member to releasably secure the first and second supporting members together to form the supporting assembly.

The present disclosure also provides for a filter vessel assembly wherein a first plurality of securement members are positioned around the first rib member and around at least a portion of the second supporting member, and a second plurality of securement members are positioned around the second rib member and around at least a portion of the first supporting member to releasably secure the first and second supporting members together to form the supporting assembly; and wherein each securement member of the first and second plurality is a substantially continuous ring member having a slot.

The present disclosure also provides for a filter vessel assembly wherein the first supporting member includes at least a first receiving member positioned along a first outer edge of the first supporting member, and at least a second receiving member positioned along a second outer edge of the first supporting member; wherein the second supporting member includes at least a third receiving member positioned along a first outer edge of the second supporting member, and at least a fourth receiving member positioned along a second outer edge of the second supporting member; wherein at least a portion of a first elongated member is positioned within the first and third receiving members, and at least a portion of a second elongated member is positioned within the second and fourth receiving members to releasably secure the first and second supporting members together to form the supporting assembly.

The present disclosure also provides for a filter vessel assembly wherein the supporting assembly includes an upper end, a lower end, and a plurality of extending portions; and wherein a slit extends between each extending portion, each slit extending from the upper end to a position along the length of the supporting assembly.

The present disclosure also provides for a filter vessel assembly wherein the supporting assembly includes four extending portions, each extending portion extending from the upper end to the lower end; and wherein each slit extends from the upper end to the lower end.

The present disclosure also provides for a filter vessel assembly wherein when the supporting assembly is mounted with respect to at least a portion of the first securing member, the upper end of each extending portion is compressively engaged with the first securing member. The present disclosure also provides for a filter vessel assembly wherein the supporting assembly includes two extending portions; and wherein the lower end of the supporting assembly includes at least one hinge member that is hingedly attached to each extending portion.

The present disclosure also provides for a filter vessel assembly wherein the supporting assembly includes a first supporting member, a second supporting member and a third supporting member, the first, second and third supporting members configured to be releasably secured together to form the supporting assembly.

The present disclosure also provides for a filter vessel assembly wherein the first and second supporting members each taper outwardly from an intermediate section to define an upper tapered section and a lower tapered section, each upper tapered section having an upper end and each lower tapered section having a lower end; wherein the third supporting member is a substantially half-spherical member, the third supporting member including an interior surface having a groove; and wherein at least a portion of each lower end of each lower tapered section is positioned within the groove to releasably secure the first, second and third supporting members together to form the supporting assembly.

The present disclosure also provides for a filter vessel assembly wherein the first and second supporting members each include at least one outer projection and at least one inner projection positioned along and extending a distance past an outer edge of each supporting member; and wherein when the first, second and third supporting members are releasably secured together to form the supporting assembly, each outer and inner projection substantially prevents lateral motion of the first and second supporting members.

The present disclosure also provides for a filter vessel assembly wherein when the supporting assembly is mounted with respect to at least a portion of the first securing member, the upper end of each upper tapered section is compressively engaged with the first securing member; and wherein the first securing member is configured to rest upon at least one outer projection when the upper end of each upper tapered section is compressively disengaged from the first securing member.

The present disclosure also provides for a filter vessel assembly wherein the cover member includes an inner surface having a protruding section that is configured to create a sealing surface with the gasketing material housed in the groove of the open end of the housing when the cover member is mounted with respect to the open end of the housing. The present disclosure also provides for a filter vessel assembly wherein the cover member includes a downwardly extending member that is configured to displace the fluid in the housing as the cover member is removably secured to the open end of the housing.

The present disclosure also provides for a filter locking assembly including a supporting assembly having an open end; a removable filter member configured to be at least partially disposed within the supporting assembly; a first securing member, a second securing member and a locking member, at least a portion of the supporting assembly configured to mount with respect to at least a portion of the first securing member; wherein the locking member is movably secured with respect to the first securing member, thereby allowing a user to move the locking member to a desired position; wherein at least a portion of the filter member is sized to rest upon at least a portion of the first securing member; wherein at least a portion of the second securing member is configured to be positioned above at least a portion of the filter member resting upon the first securing member; and wherein the movably secured locking member is configured to allow the user to move the locking member to engage at least a portion of the locking member with at least a portion of at least one of the first and second securing member to releasably secure the filter member to at least one of the first and second securing member.

The present disclosure also provides for a filter vessel assembly including an elongated housing having an interior surface, an open end, at least one fluid inlet and at least one fluid outlet; a cover member removably mounted with respect to the open end of the housing; a removable supporting assembly configured to be disposed within the housing, the supporting assembly including: (i) an open end having a collar member, and (ii) a plurality of apertures configured to allow fluid to pass therethrough; a removable filter member configured to be at least partially disposed within the supporting assembly; a locking assembly including a first securing member, a second securing member and a locking member disposed within the housing, the first securing member having: (i) an upper surface, (ii) an intermediate surface, (iii) a lower surface and (iv) an outer surface, the second securing member having: (i) an upper surface, and (ii) a lower surface, and the locking member extending from a first end to a second end, a first camming member extending from the first end and a second camming member extending from the second end; wherein the locking member is movably secured with respect to the upper surface of the first securing member, thereby allowing a user to move the locking member to a desired position; wherein at least a portion of the outer surface of the first securing member is sized to rest upon at least a portion of the interior surface of the housing; wherein at least a portion of the collar member of the supporting assembly is configured to mount with respect to at least a portion of the lower surface of the first securing member; wherein at least a portion of the filter member is sized to rest upon at least a portion of the intermediate surface of the first securing member; wherein at least a portion of the lower surface of the second securing member is configured to be positioned above at least a portion of the filter member resting upon the intermediate surface of the first securing member; and wherein the movably secured locking member is configured to allow the user to move the locking member to engage the first and second caroming members with the upper surfaces of the first and second securing members to releasably secure the filter member to the first and second securing members.

The present disclosure also provides for a filter vessel assembly including an elongated housing having an interior surface and an open end; a removable filter member configured to be at least partially disposed within the housing; a cover member removably mounted with respect to the open end of the housing; and wherein the cover member fluidically seals the open end of the housing when the cover member is removably mounted with respect to the open end of the housing; wherein the open end of the housing includes a groove that extends around the perimeter of the open end of the housing, the groove defined by a lower wall, an outer wall and an inner wall; wherein the lower wall extends from the outer wall to the inner wall at a downward angle between about 1° to about 10° toward the center of the housing; wherein the groove is configured to house a gasketing material; wherein the cover member is configured to create a sealing surface with the gasketing material housed in the groove of the open end of the housing when the cover member is mounted with respect to the open end of the housing; and wherein internal pressure forces the gasketing material toward the outer wall when the cover member is mounted with respect to the open end of the housing.

The present disclosure also provides for a filter vessel assembly wherein the cover member includes an inner surface having a protruding section that is configured to create a sealing surface with the gasketing material housed in the groove of the open end of the housing when the cover member is mounted with respect to the open end of the housing.

The present disclosure also provides for a filter vessel assembly wherein the housing includes first and second fluid inlets, first and second fluid outlets, at least one fluid inlet boss, and first and second fluid outlet bosses; wherein the first fluid inlet includes a removable cap that fluidically seals the first fluid inlet and the first fluid outlet includes a removable cap that fluidically seals the first fluid outlet; and wherein the second fluid inlet includes a hollow connector member and the second fluid outlet includes a hollow connector member.

The present disclosure also provides for a filter vessel assembly wherein the interior surface of the housing includes at least three inner protrusions positioned in a lower end of the housing, the at least three inner protrusions: (i) spaced substantially equidistantly apart from each adjacent inner protrusion, (ii) tapering inwardly from a top portion to a bottom portion of each protrusion toward the center of the housing, and (iii) configured to removably secure the removable filter member in the housing when the removable filter member is disposed within the housing.

The present disclosure also provides for a filter vessel assembly wherein the open end of the housing includes external threads, the external threads having a non-threaded section that is configured to allow fluid to escape from the housing via the non-threaded section when the cover member is mounted with respect to the open end of the housing, and at least one of: (i) the housing is over-pressurized, (ii) the user is attempting to remove the cover member from the open end of the housing without de-pressurizing the housing, and (iii) the user has not fully secured the cover member to the housing and is attempting to pressurize the housing.

The present disclosure also provides for a filter vessel assembly wherein the first and second fluid inlets and the at least one fluid inlet boss are positioned at an upper end of the housing; wherein the first and second fluid outlets and the first and second fluid outlet bosses are positioned at a lower end of the housing; wherein the at least one fluid inlet boss is positioned about 90° from the first and second fluid inlets on the housing; and wherein the first and second fluid outlet bosses are positioned about 90° from the first and second fluid outlets on the housing.

The present disclosure also provides for a filter vessel assembly wherein the removable filter member is a filter cartridge. The present disclosure also provides for a filter vessel assembly wherein the cover member includes a downwardly extending member that is configured to displace the fluid in the housing as the cover member is removably secured to the open end of the housing. The present disclosure also provides for a filter vessel assembly wherein the inner wall includes at least one slot configured to allow fluid to drain from the outer wall to the center of the housing.

Additional advantageous features, functions and applications of the disclosed systems, assemblies and methods of the present disclosure will be apparent from the description which follows, particularly when read in conjunction with the appended figures.

BRIEF DESCRIPTION OF THE DRAWINGS

Exemplary embodiments of the present disclosure are further described with reference to the appended figures. It is to be noted that the various features and combinations of features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein:

FIG. 14 is a front perspective view of a supporting assembly and locking assembly for a filter vessel assembly in accordance with an exemplary embodiment of the present disclosure;

FIG. 15 is a partial exploded back perspective view of the supporting assembly of FIG. 14;

FIGS. 21-23 are cross-sectional views of an assembled filter vessel assembly in accordance with an exemplary embodiment of the present disclosure, with filter member removed;

FIG. 24 is a partial exploded view of the assembled filter vessel assembly of FIGS. 21-23, with filter member removed;

FIG. 38 is a side perspective view of a supporting assembly for a filter vessel assembly in accordance with another exemplary embodiment of the present disclosure;

FIG. 48 is a bottom perspective view of the supporting assembly and first securing member of FIG. 45;

FIG. 49 is a bottom view of the supporting assembly and first securing member of FIG. 45;

FIGS. 61-62 are side perspective views of a supporting assembly and a locking assembly for a filter vessel assembly in accordance with another exemplary embodiment of the present disclosure;

FIG. 63 is a side cross-sectional view of a supporting assembly and a first securing member for a filter vessel assembly in accordance with another exemplary embodiment of the present disclosure;

DETAILED DESCRIPTION

Figure 1:
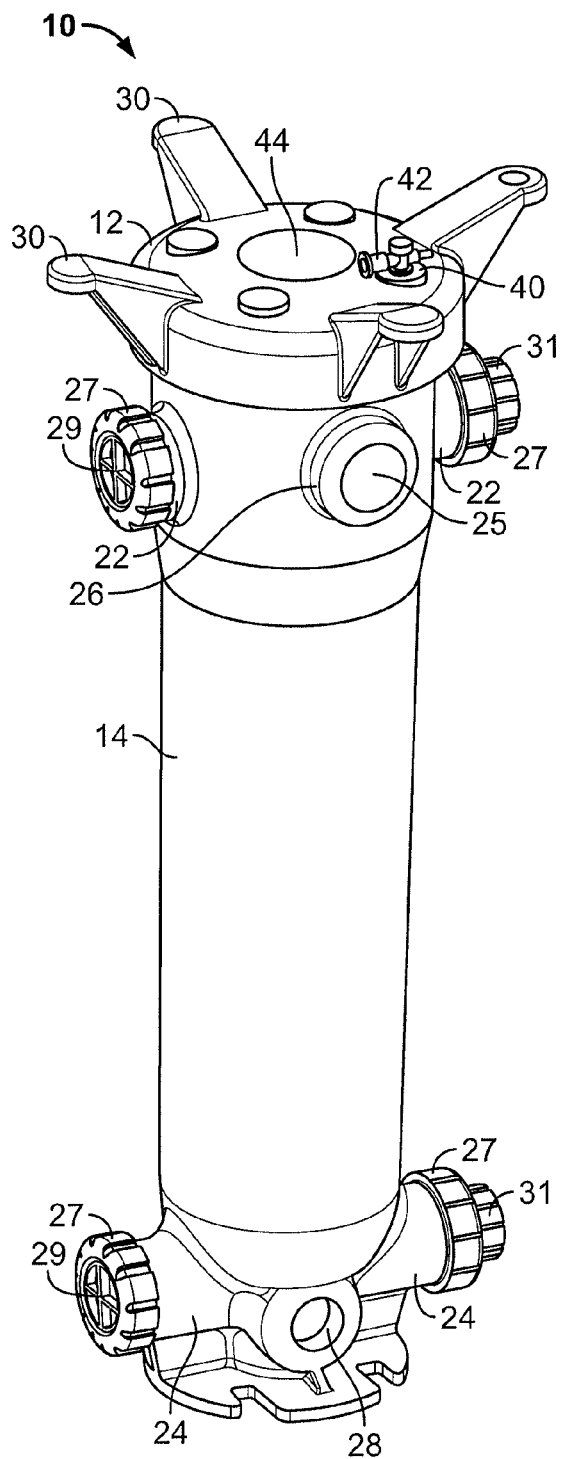
FIG. 1 is a front perspective view of a filter vessel assembly in accordance with an exemplary embodiment of the present disclosure.

In the description which follows, like parts are marked throughout the specification and drawings with the same reference numerals, respectively. Drawing figures are not necessarily to scale and in certain views, parts may have been exaggerated for purposes of clarity.

The present disclosure provides for advantageous filter vessel assemblies for filtering fluids in fluid systems (e.g., industrial and/or commercial systems). More particularly, the present disclosure provides for improved, convenient, low-cost and/or effective systems and methods for easily securing and/or unsecuring a removable filter member to or from a filter vessel assembly by utilizing an advantageous locking assembly of the filter vessel assembly. In exemplary embodiments, the present disclosure provides for improved systems/designs for easily securing and/or unsecuring removable filter members to or from a locking assembly associated with a supporting assembly or basket assembly of a filter vessel assembly.

In exemplary embodiments, the present disclosure provides for convenient, low-cost and effective systems/designs for easily securing and/or unsecuring removable filter members to or from a filter vessel assembly (e.g., to or from a locking assembly associated with a supporting assembly or basket assembly of a filter vessel assembly), thereby providing a significant manufacturing and commercial advantage as a result.

Referring now to the drawings, there is illustrated an exemplary fluid filter vessel assembly 10. As shown in FIGS. 1-9, filter vessel assembly 10 typically includes a cover member 12 and a body or housing 14. In general, housing 14 is configured and dimensioned to house or contain a supporting assembly/member or basket assembly/member 16 disposed therein (FIGS. 14-25), which, in turn, supports and/or positions a filter member 18 (e.g., a removable filter bag or the like—FIGS. 13 and 25) within the housing 14. It is to be noted that filter vessel assembly 10 can be operated without supporting assembly 16, e.g., if filter member 18 takes the form of a filter cartridge or the like, as further discussed below.

In exemplary embodiments and as shown in FIGS. 1-9, housing 14 typically includes an open end 20, at least one fluid inlet port 22 (e.g., true union inlet port) and at least one fluid outlet port 24 (e.g., true union outlet port). Exemplary housing 14 takes the form of a substantially cylindrical, substantially hollow plastic (e.g., polypropylene) housing, although the present disclosure is not limited thereto. Rather, housing 14 may take a variety of forms.

Figure 2:
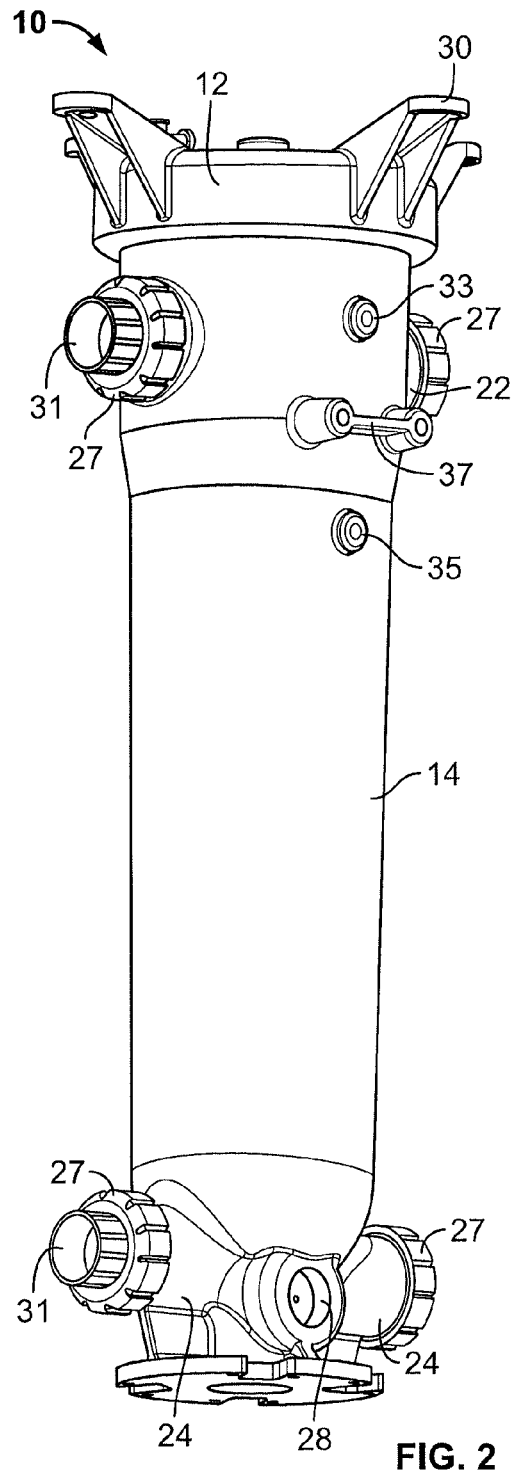
FIG. 2 is a back perspective view of the filter vessel assembly of FIG. 1.
Figure 3:
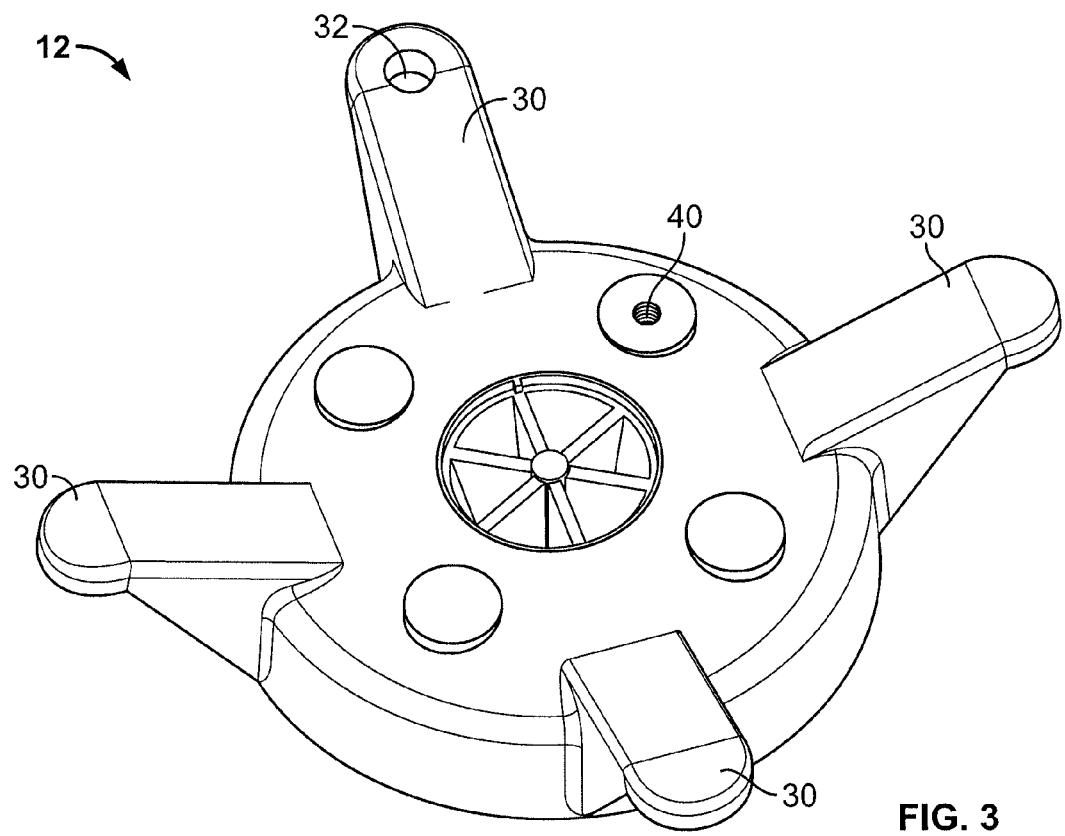
FIG. 3 is a top perspective view of a cover member for a filter vessel assembly in accordance with an exemplary embodiment of the present disclosure.

In one embodiment and as depicted in FIGS. 1-2, 6-9 and 96, housing 14 includes two fluid inlet ports 22 and two fluid outlet ports 24. In exemplary embodiments, ports 22, 24 are true union inlet or outlet ports 22, 24 that can be provided in threaded, socket, flanged or spigot configurations. Housing 14 typically includes at least one fluid inlet boss 26 positioned at an upper end of housing 14 and at least one fluid outlet boss 28 positioned at a lower end of housing 14. As shown in FIGS. 1-2, exemplary housing 14 includes two fluid outlet bosses 28 positioned at a lower end of housing 14, with each boss 28 positioned about 90° from each fluid outlet port 24 on housing 14. As such, exemplary housing 14 with multiple fluid inlet ports 22, fluid outlet ports 24 and/or multiple bosses 26, 28 provides users with a variety of choices for various installations/connections, as desired/required. Ports 22, 24 typically include external (e.g., male) threads or the like, while bosses 26, 28 typically do not include external threads, although the present disclosure is not limited thereto. Fluid inlet boss 26 typically includes bezel member 25, and is typically positioned about 90° from each fluid inlet port 22 on housing 14. In general, bosses 26, 28 allow or provide for the drilling and/or tapping of threaded inlets and/or outlets for users that wish to connect pipe directly to housing 14 of filter vessel assembly 10.

Figure 96:
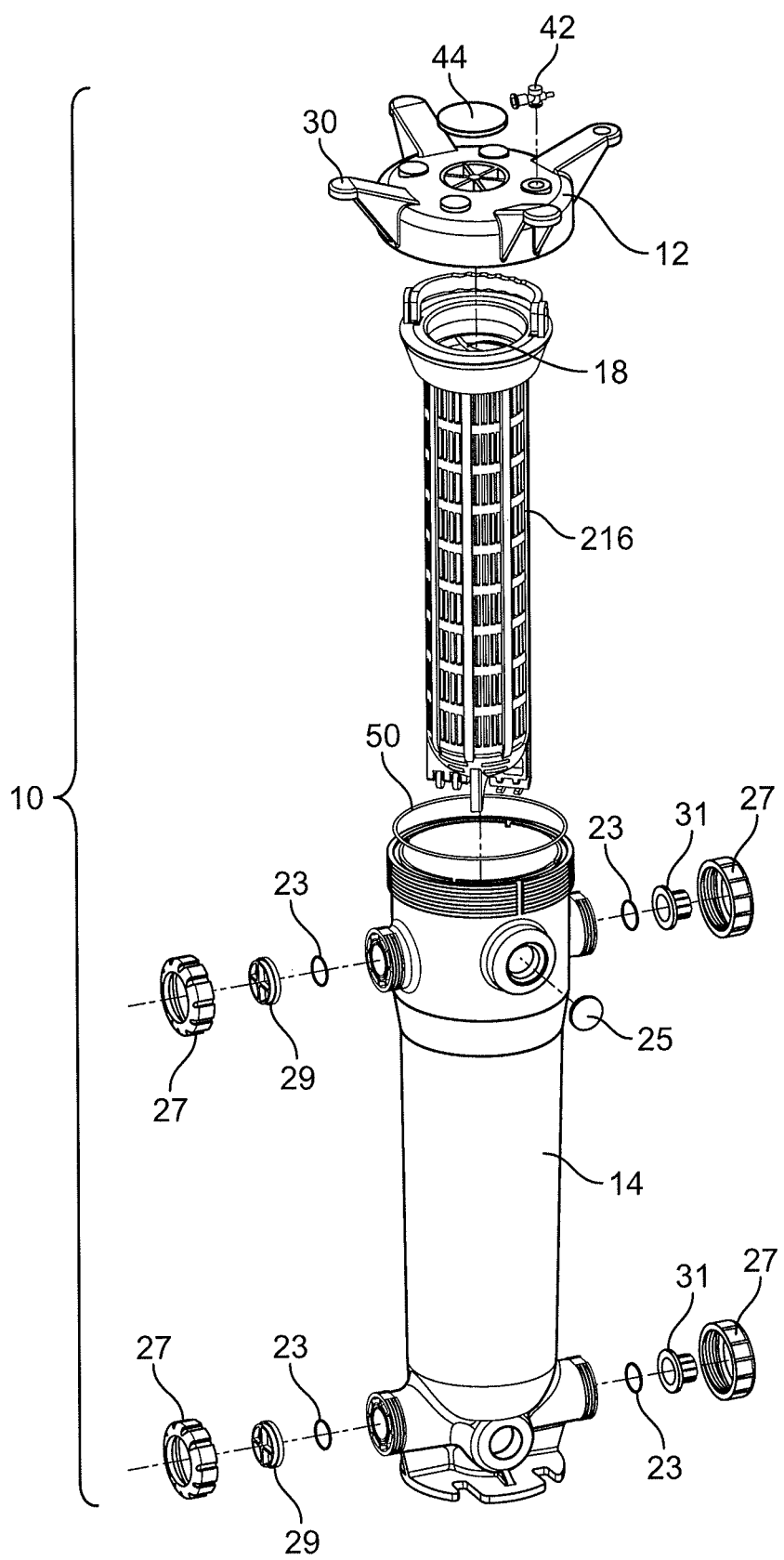
FIG. 96 is an exploded view of a filter vessel assembly in accordance with an exemplary embodiment of the present disclosure, prior to assembly.

In exemplary use and as shown in FIGS. 1-2 and 96, each fluid inlet port 22 and each fluid outlet port 24 typically includes a nut member 27 positioned/secured (e.g., threadably engaged) thereon. One fluid inlet port 22 typically includes a removable cap member 29 to thereby seal this respective fluid inlet port, while the other fluid inlet port 22 typically includes an open/hollow end connector member 31 or the like that is configured and dimensioned to connect to piping or the like (e.g., via threading, welding, heat-fusion, solvent cementing, etc.) to thereby allow fluid to be filtered to enter filter vessel assembly 10. Cap members 29 and end connector members 31 are typically fluidically sealed to ports 22, 24 via O-rings 23 or the like (FIG. 96).

Similarly, one fluid outlet port 24 typically includes a removable cap member 29 to thereby seal this respective fluid outlet port, while the other fluid outlet port 24 typically includes an open end connector member 31 or the like that is configured and dimensioned to connect to piping or the like to thereby allow fluid that has been filtered to exit filter vessel assembly 10. Cap member 29 on fluid outlet port 24 is configured to be removed from fluid outlet port 24 to allow filter vessel assembly 10 to be drained. Alternatively, fluid outlet port 24 may not include cap member 29 and may instead include an end connector member 31 that is associated with a valve, thereby allowing a user to drain filter vessel assembly 10 by opening the valve when desired/required. In another alternative embodiment, fluid outlet port 24 (and/or drilled/tapped boss 28) may not include cap member 29 and may instead include a plug member or the like inserted/positioned into a drainage opening associated with fluid outlet port 24 (and/or with drilled/tapped boss 28), thereby allowing a user to drain filter vessel assembly 10 by removing the plug member when desired/required.

In exemplary embodiments and as depicted in FIG. 2, housing 14 typically includes an upstream pressure port 33 and a downstream pressure port 35. Upstream pressure port 33 allows the fluid inlet pressure of vessel assembly 10 to be measured (e.g., via a gauge or the like). Similarly, downstream pressure port 35 allows the fluid outlet pressure of vessel assembly 10 to be measured. In exemplary embodiments, housing 14 includes a mounting protrusion 37 that is configured and dimensioned to have a gauge (e.g., differential pressure gauge) mounted thereon.

Figure 10:
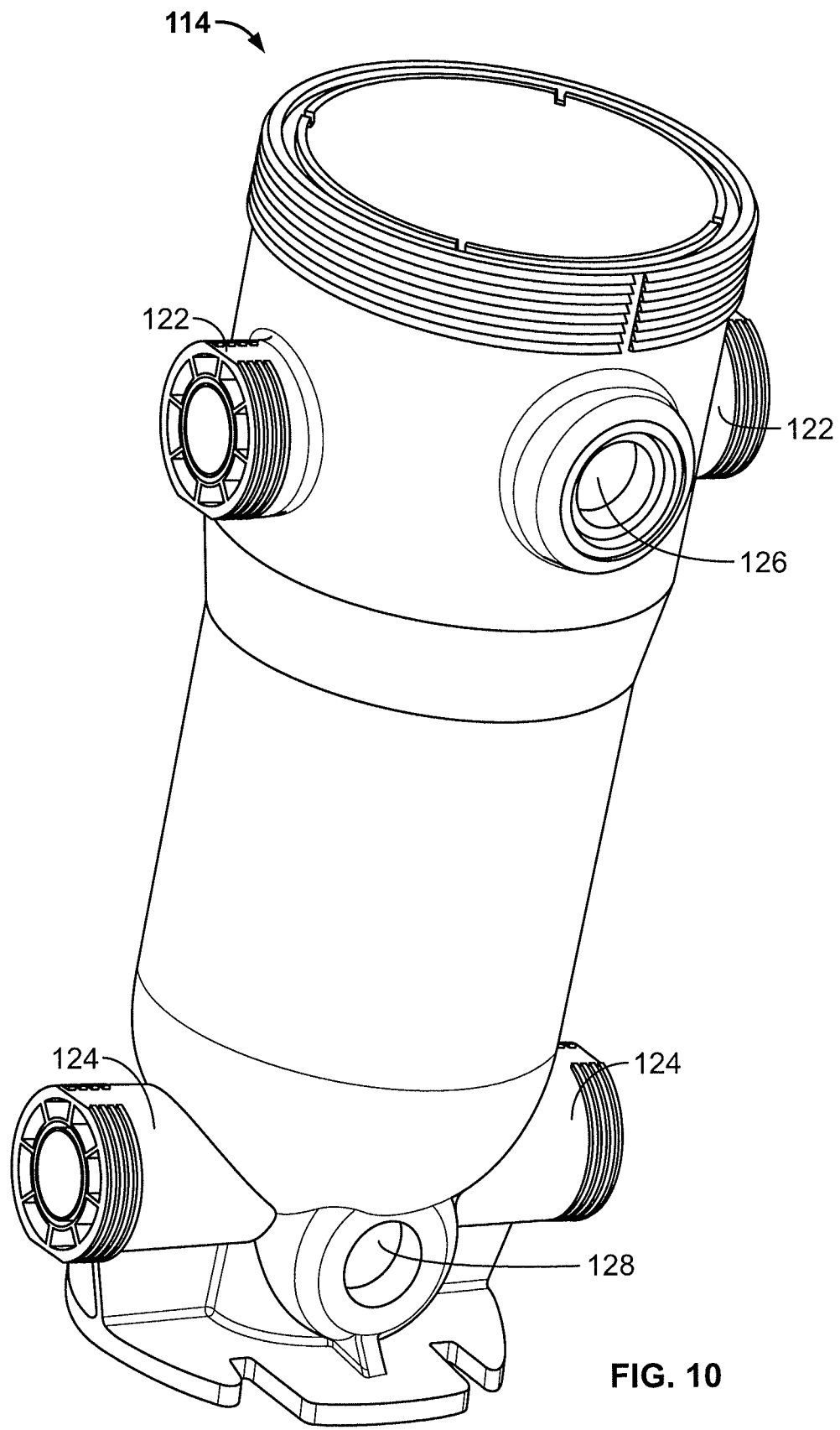
FIG. 10 is a front perspective view of a housing for a filter vessel assembly in accordance with another exemplary embodiment of the present disclosure.
Figure 11:
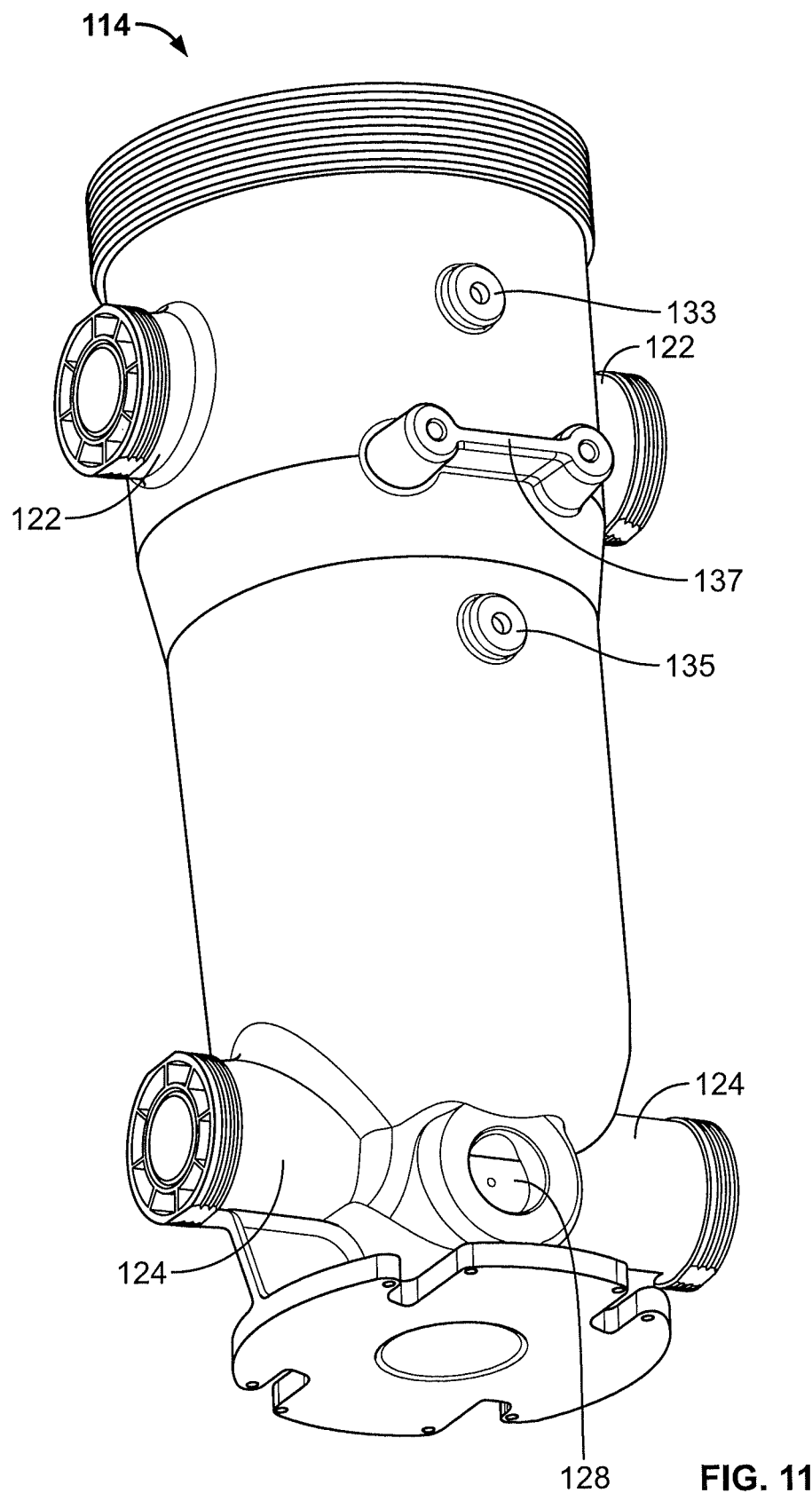
FIG. 11 is a back perspective view of the filter vessel assembly of FIG. 10.
Figure 12:
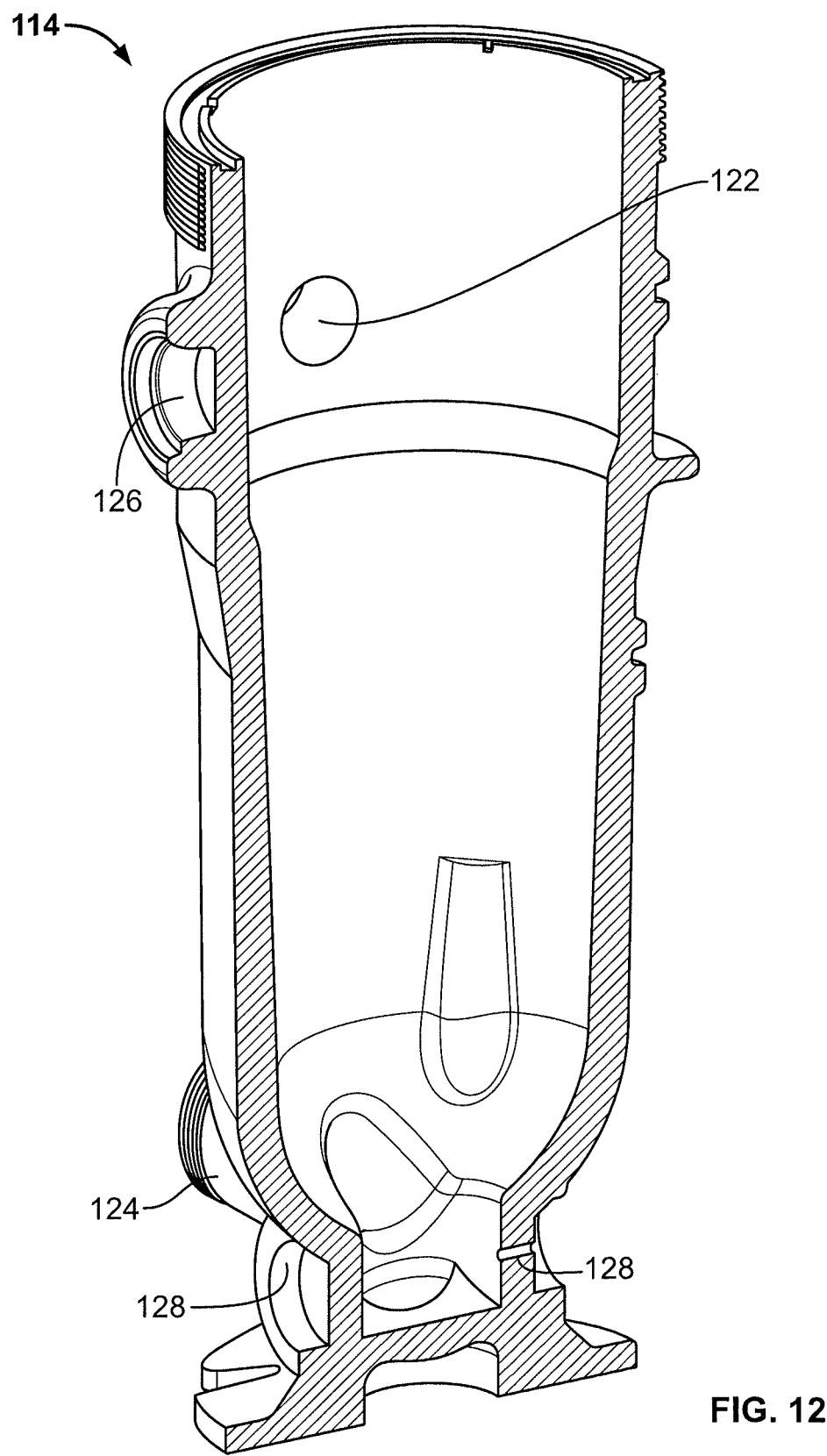
FIG. 12 is a side perspective cross-sectional view of the housing of FIG. 10.

In an alternative embodiment, FIGS. 10-12 depict housing 114 for use with another filter vessel assembly of the present disclosure, with housing 114 having a different height as compared to housing 14. Similar to housing 14, housing 114 includes an open end 120, two fluid inlet ports 122, two fluid outlet ports 124, one fluid inlet boss 126, two fluid outlet bosses 128, an upstream pressure port 133, a downstream pressure port 135 and a mounting protrusion 137. It is noted that housing 114 is configured and dimensioned to function similarly to housing 14, as further discussed below.

In general and as shown in FIGS. 1-5, cover member 12 of vessel assembly 10 is configured and dimensioned to be removably secured or positioned on or around open end 20 of housing 14 to fluidically seal housing 14 (or housing 114). Stated another way, cover member 12 is typically adapted to be removably mounted with respect to open end 20 of housing 14. In exemplary embodiments, once cover member 12 is secured on open end 20 of housing 14 to fluidically seal housing 14, filter vessel assembly 10 may be pressurized up to about 150 psi. As shown in FIGS. 1 and 96, cover member 12 typically includes bezel member 44.

In general, cover member 12 is fabricated from plastic and includes a plurality of handle members 30 to facilitate securement or unsecurement from open end 20 of housing 14. In exemplary embodiments, at least one handle member 30 of cover member 12 includes an aperture 32 to allow a user to position the cover member 12 on a holder (e.g., on a hook or the like) when/if desired.

In exemplary embodiments, cover member 12 includes threads 34 (e.g., interior threads) that are configured and dimensioned to threadably engage with threads 36 (e.g., exterior threads) positioned on the upper end of housing 14. For example, threads 34, 36 can be continuous or non-continuous threads. Cover member 12 typically includes a downwardly extending member 38 that is configured to displace the fluid in housing 14 as cover member 12 is removably secured to open end 20 of housing 14. In general, cover member 12 includes at least one port 40 that is configured and dimensioned to have a valve 42 or the like mounted thereon (FIG. 1). For example, valve 42 may be a vent valve such as a needle valve that is configured to purge substantially all of the air out of the housing 14 after cover member 12 is removably secured to open end 20 of housing

14. Valve 42 typically is configured to have a pressure gauge or the like (e.g., a conventional pressure gauge) mounted thereon to measure the pressure of filter vessel assembly 10 during use/operation.

Figure 6:
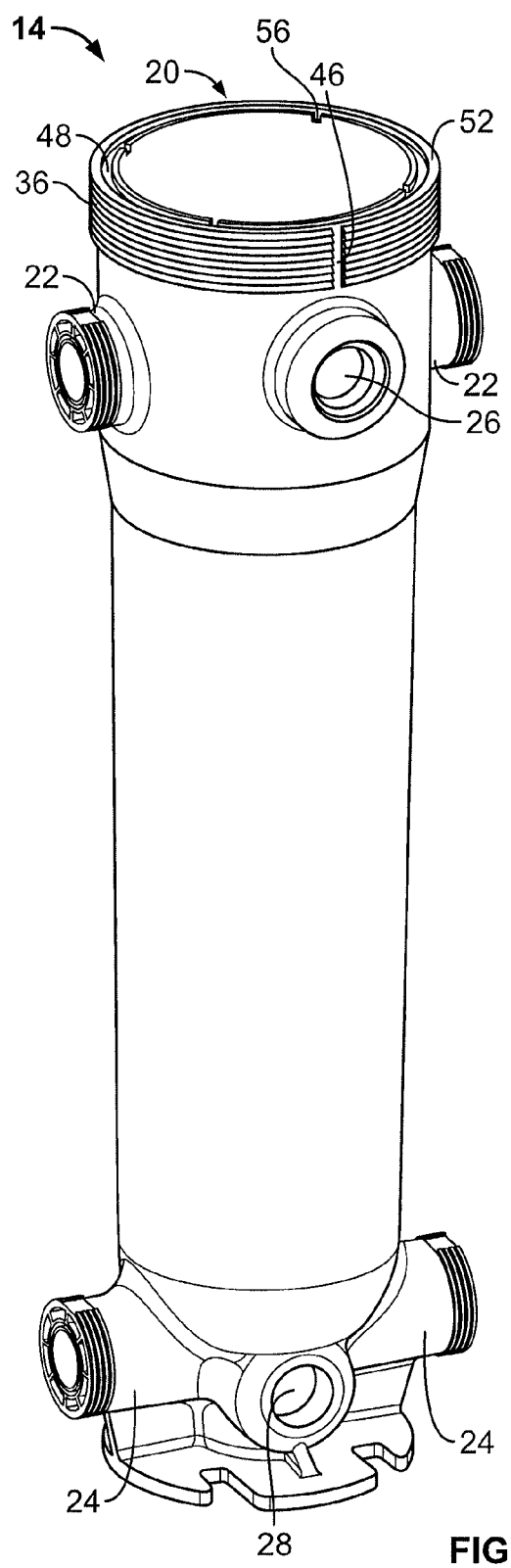
FIG. 6 is a front perspective view of a housing for a filter vessel assembly in accordance with an exemplary embodiment of the present disclosure.
Figure 7:
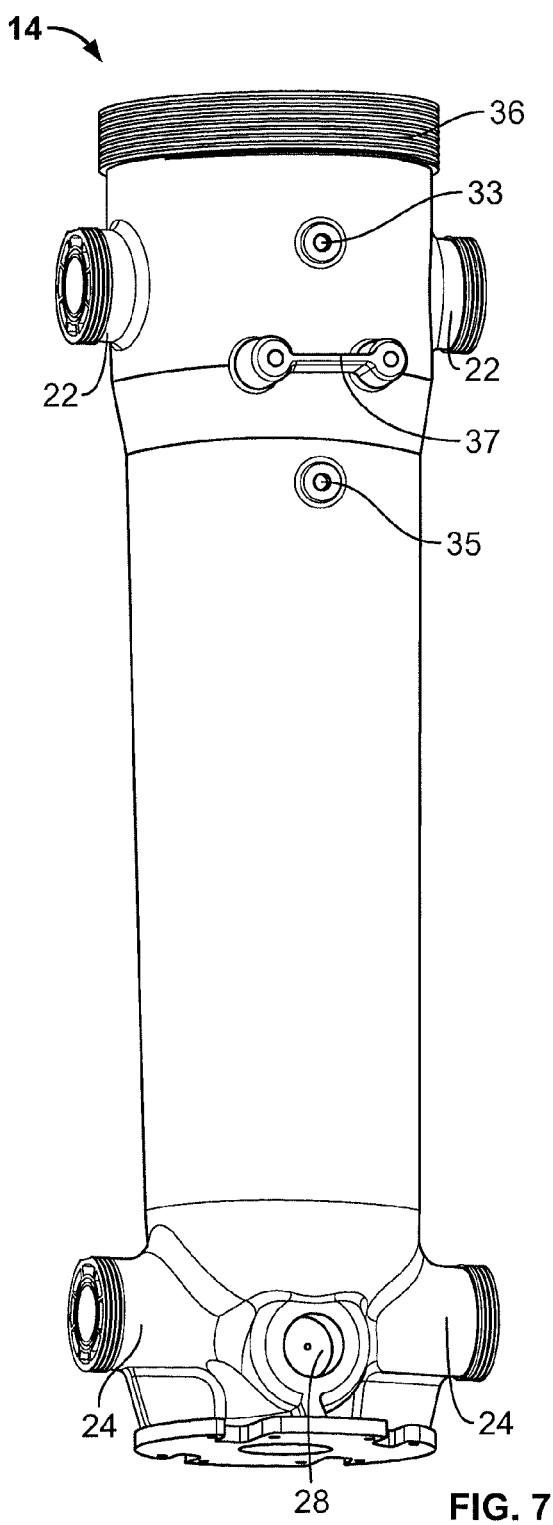
FIG. 7 is a back perspective view of the housing of FIG. 6.
Figure 9:
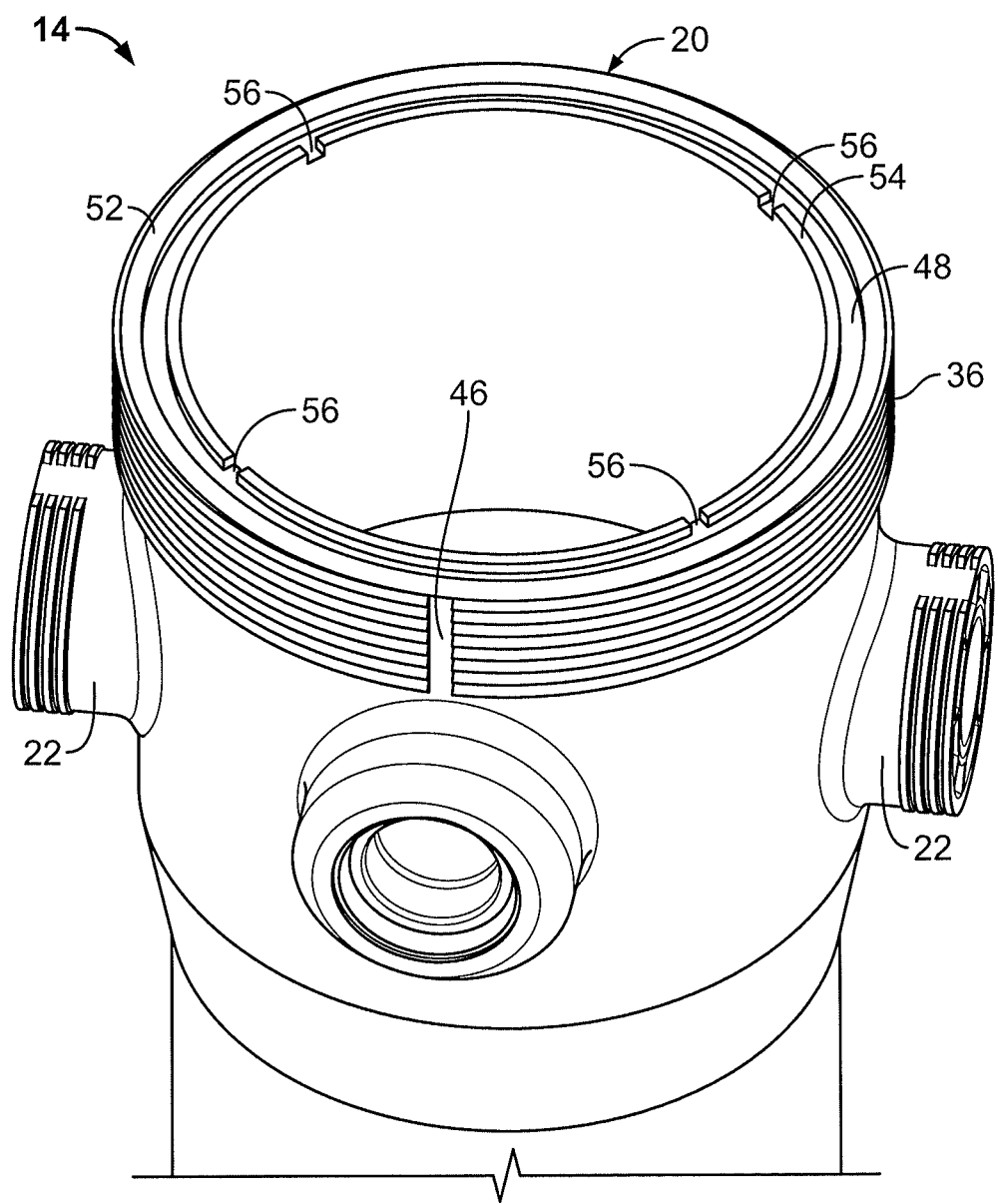
FIG. 9 is a partial exploded view of the housing of FIG. 6.

In one embodiment and as shown in FIGS. 6 and 9, threads 36 of upper end of housing 14 include a break (e.g., non-threaded section) or slot 46 (e.g., vertical slot/break). In general, slot or break 46 acts as a warning system to allow a user to detect a potentially problematic condition of filter vessel assembly 10. For example, when cover member 12 is secured on open end 20 of housing 14 to fluidically seal housing 14, slot or break 46 allows some fluid from housing 14 to be directed toward slot/break 46 and escape from housing 14 via slot/break 46 when/if fluid vessel assembly has been over-pressurized, or if a user is attempting to remove cover member 12 without first properly de-pressurizing fluid vessel assembly 10, or if a user is attempting to pressurize fluid vessel assembly 10 without first properly fully installing/securing cover member 12. Such escape of fluid from housing 14/cover member 12 via slot/break 46 is intended to warn users that a potentially problematic condition of filter vessel assembly 10 exists (e.g., over-pressurization of assembly 10, or attempted removal of cover member 12 without properly de-pressurizing assembly 10).

Figure 4:
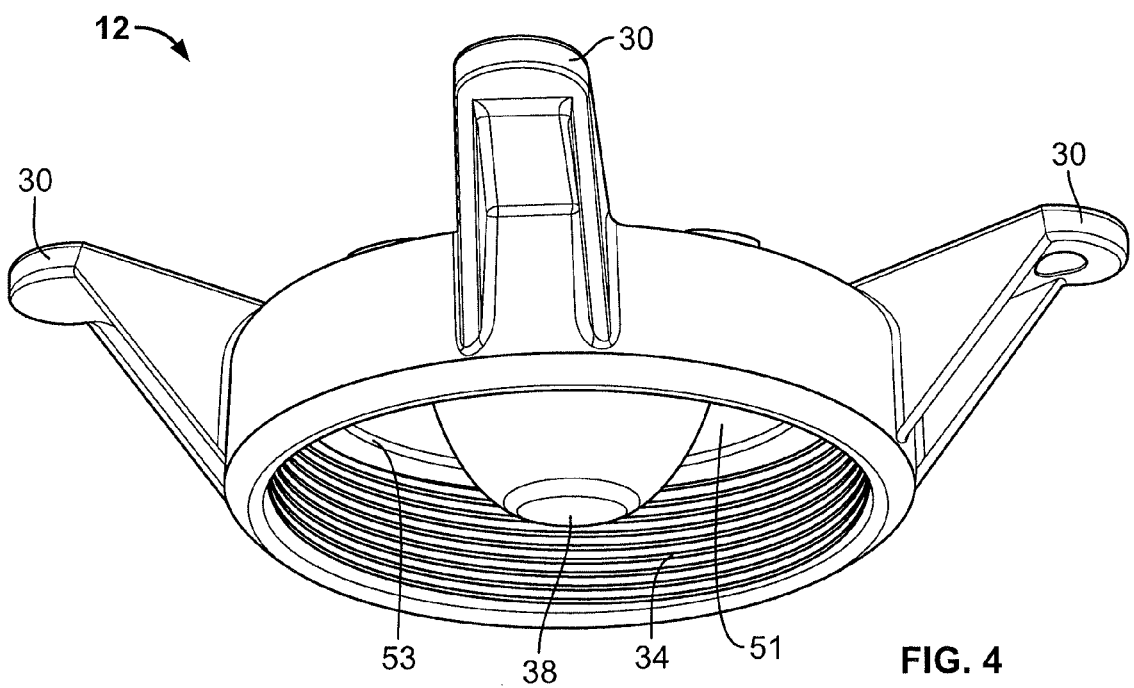
FIG. 4 is a bottom perspective view of the cover member of FIG. 3.
Figure 5:
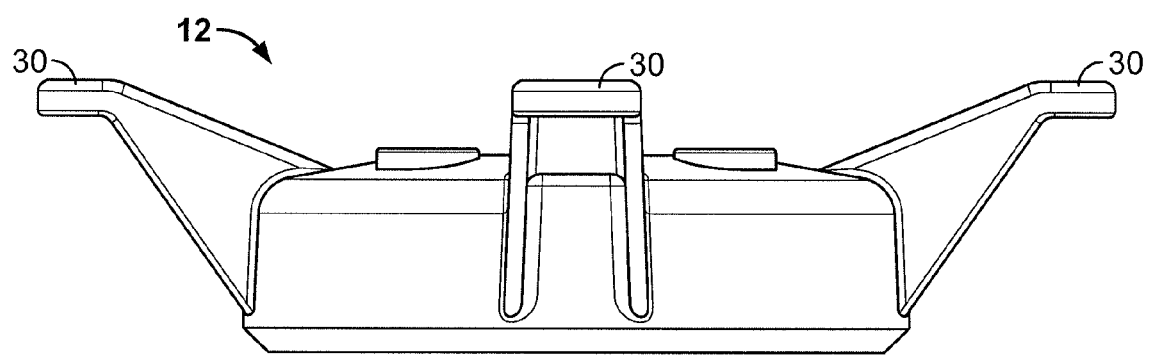
FIG. 5 is a side view of the cover member of FIG. 3.
Figures 8, 8A:
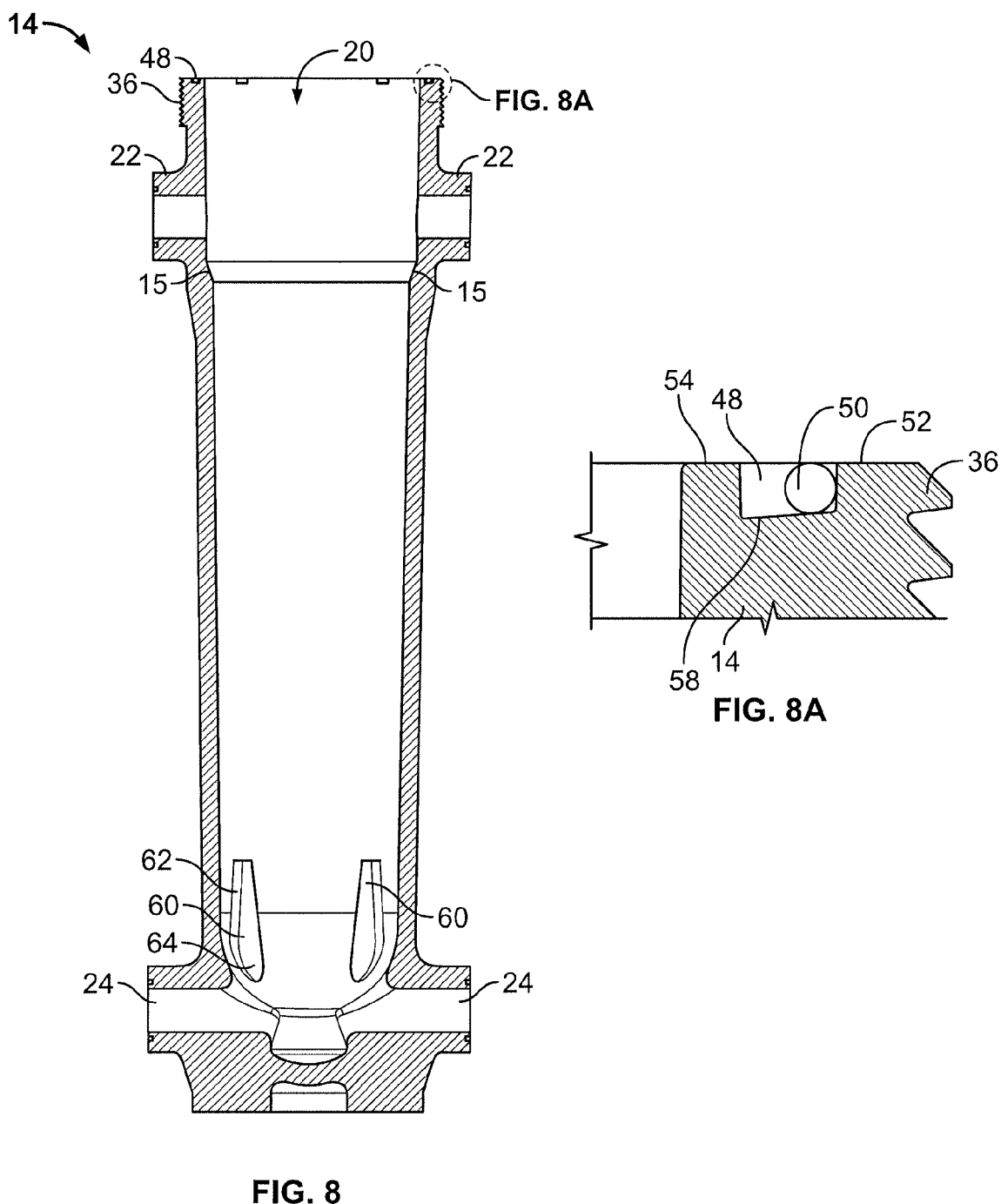
FIG. 8 is a cross-sectional view of the housing of FIG. 6.
FIG. 8A is a partial exploded view of the housing of FIG. 8.

As shown in FIGS. 6, 8, 8A and 9, upper threaded end 36 of housing 14 typically includes a groove 48 that is configured and dimensioned to at least partially house or contain a gasketing material 50 (FIGS. 8A and 96). In exemplary embodiments, gasketing material 50 is an O-ring or the like. In general, when the cover member 12 is assembled onto housing 14 of the filter vessel assembly 10, the gasketing material 50 forms a fluid-tight seal between the cover member 12 and the housing 14 to make the assembly 10 substantially leak tight after assembly. In one embodiment and as shown in FIG. 4, a portion of the inner surface 51 of cover member 12 includes an annular protruding section 53. In general, annular section 53 protrudes downwardly from the inner surface 51 adjacent to threaded section 34 to define the downwardly extending, substantially annular protruding section 53 that is configured and dimensioned to create a sealing surface with gasketing material 50 of groove 48 once the cover member 12 is assembled onto housing 14 of the filter vessel assembly 10.

In one embodiment, groove 48 is an annular groove that extends around the perimeter of open end 20 of housing 20. In general, groove 48 is defined by outer wall 52 and inner wall 54, with inner wall 54 typically including at least one slot or notch 56. In exemplary embodiments and as shown in FIGS. 6 and 9, inner wall 54 includes four notches 56. As shown in FIG. 8A, the lower surface 58 of groove 48 typically extends from the outer wall 52 to the inner wall 54 downwardly at a slight angle/taper (e.g., between about 1° to about 10°) toward the center/bottom of housing 14. Such a downward angle or slope of lower surface 58 of groove 48 advantageously allows fluid to be forced/drained toward inner wall 54 and out notch or notches 56 of groove 48 and toward the center of housing 14. This thereby ensures that substantially all of the fluid that enters assembly 10 via fluid inlet port 22 passes through filter member 18 for filtering purposes before exiting assembly 10 via fluid outlet port 24, as further discussed below. It is also noted that the lower surface 58 and the at least one notch 56 provide that substantially all of the fluid in groove 48 drains toward inner wall 54 and out the at least one notch 56 when cover member 12 has been removed from assembly 10 (e.g., when supporting assembly 16 is removed from or inserted into housing 14).

Additionally, the downward angle or slope of lower surface 58 of groove 48 provides that as pressure from the inner surface 51 of cover member 12 (e.g., via protruding section 53) forces the gasketing material 50 towards the outer wall 52, this thereby forces the gasketing material 50 into a smaller area of groove 48 (FIG. 8A), which thereby provides greater compression and increased sealing force onto gasketing material 50. Moreover, as the internal pressure of vessel 10 increases, the gasketing material 50 will also push towards the outer wall 52. As noted above, as the gasketing material 50 is pushed outward, it is pushed into a gradually decreasing gap or area of groove 48 and the compression on the gasketing material 50 will increase, thereby enhancing the seal between the housing 14 and the cover member 12. Such an increased and advantageous fluid-tight seal of gasketing material 50 in groove 48 having downwardly sloping lower surface 58 ensures that substantially all of the fluid that enters assembly 10 via fluid inlet port 22 passes through filter member 18 for filtering purposes before exiting assembly 10 via fluid outlet port 24.

In exemplary embodiments and as depicted in FIGS. 8 and 23, housing 14 of filter vessel assembly 10 typically includes at least one inner protrusion or shoulder 60. In general, the at least one inner protrusion 60 is located/positioned in the lower end of housing 14. In one embodiment, housing 14 includes four inner protrusions 60 that are spaced apart from one another around the inner perimeter of the lower end of housing 14. For example, each of the four inner protrusions 60 may be spaced substantially equidistantly apart from each adjacent inner protrusion 60, although the present disclosure is not limited thereto. It is noted that housing 14 can include any appropriate number (e.g., three, five, etc.) of inner protrusions/shoulders 60.

In one embodiment and as shown in FIG. 23, each inner protrusion 60 is configured and dimensioned to guidingly engage or bump against a lower portion of a supporting assembly or basket assembly 16 that is being or has been inserted into housing 14 of assembly 10. In this regard, each inner protrusion 60 typically slopes or tapers inwardly from a top portion 62 to a bottom portion 64 of protrusion 60 toward the center of the housing 14, thereby guiding/steering supporting assembly 16 that is being or has been inserted into housing 14 to the substantial center/central portion of housing 14. In other words, each inner protrusion 60 helps to facilitate the alignment (e.g., substantially central alignment) of supporting assembly 16 within housing 14 during assembly/insertion of supporting assembly 16 within housing 14. In one embodiment, each inner protrusion 60 guides/steers the supporting assembly 16 so that the central vertical axis of the supporting assembly 16 is substantially aligned with the central vertical axis of the housing 14.

In an alternative embodiment and as noted above, filter vessel assembly 10 can be operated without supporting assembly 16, e.g., if filter member 18 takes the form of a filter cartridge or the like. In this regard and in exemplary embodiments, at least a portion of each inner protrusion 60 of housing 14 is also configured and dimensioned to provide an engagement portion (e.g., stop shoulder or the like) that engages/secures a portion of the filter cartridge and/or filter cartridge retainer once the filter cartridge/retainer is inserted into housing 14 to thereby removably secure the filter cartridge/retainer within housing 14.

As noted above and in certain embodiments of the present disclosure, housing 14 of filter vessel assembly 10 is configured and dimensioned to house or contain a suppoiting/basket assembly 16 (FIGS. 14-25), which, in turn, supports and/or positions a filter member 18 (e.g., a removable filter bag or the like—FIGS. 13 and 25) within the housing 14. In general, filter member 18 is positioned within housing 14 of filter vessel assembly 10 so that substantially all of the fluid that enters assembly 10 via open fluid inlet port 22 passes through filter member 18 for filtering purposes before exiting assembly 10 via open fluid outlet port 24. It has been noted that filter member 18 may take a variety of forms (e.g., filter bag, cartridge filter, etc.).

Figure 13:
FIG. 13 is a front perspective view of a filter member for a filter vessel assembly in accordance with an exemplary embodiment of the present disclosure.
Figure 16:
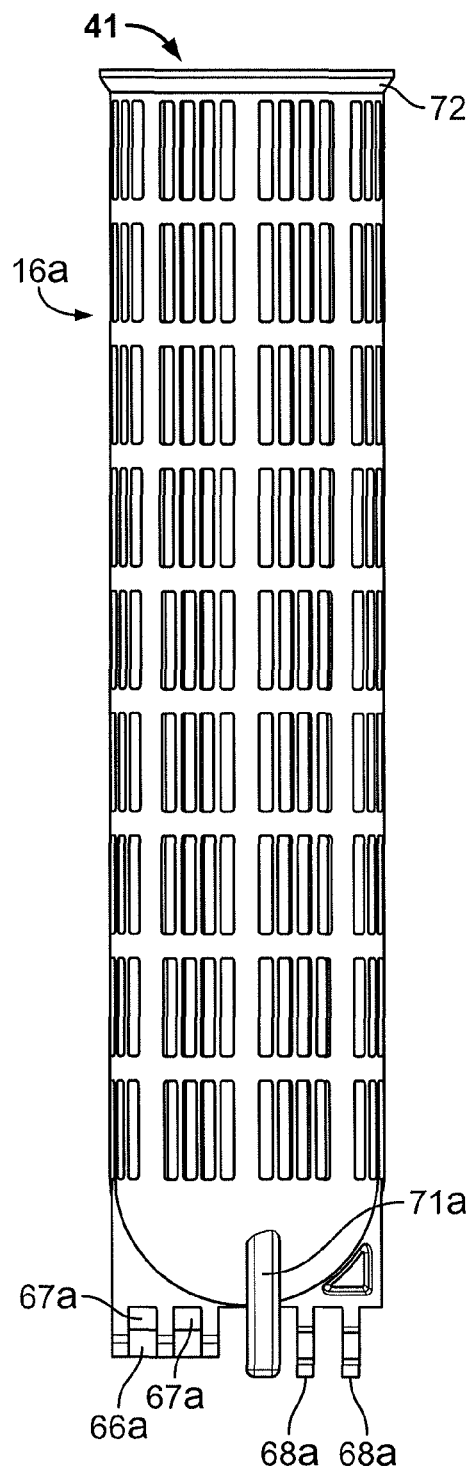
FIG. 16 is a partial front view of the supporting assembly of FIG. 14.
Figure 17:
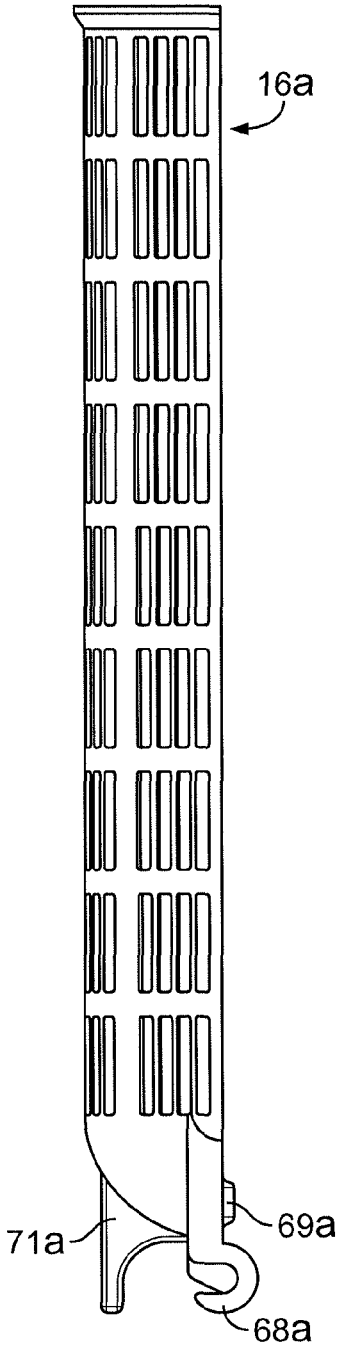
FIGS. 17-18 are partial side views of the supporting assembly of FIG. 14.
Figure 18:
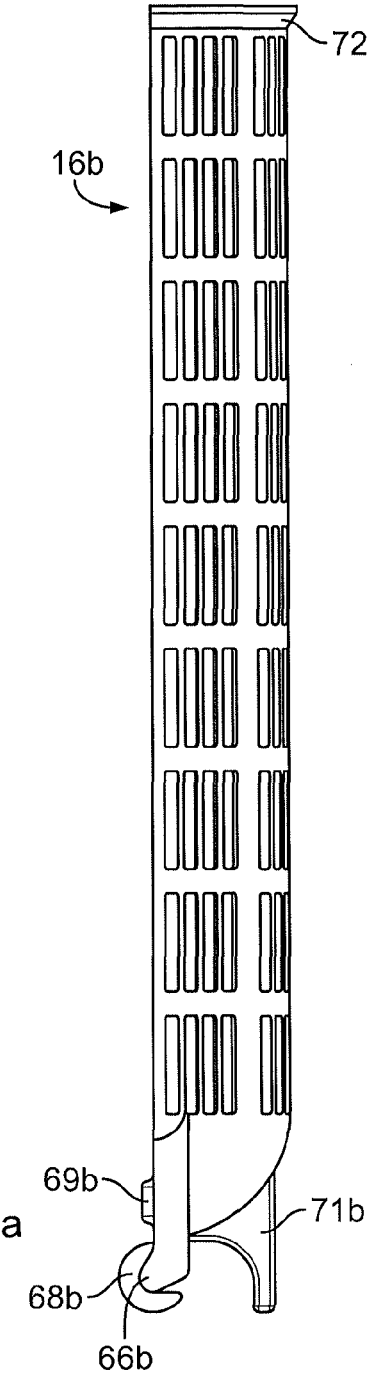
Figure 19:
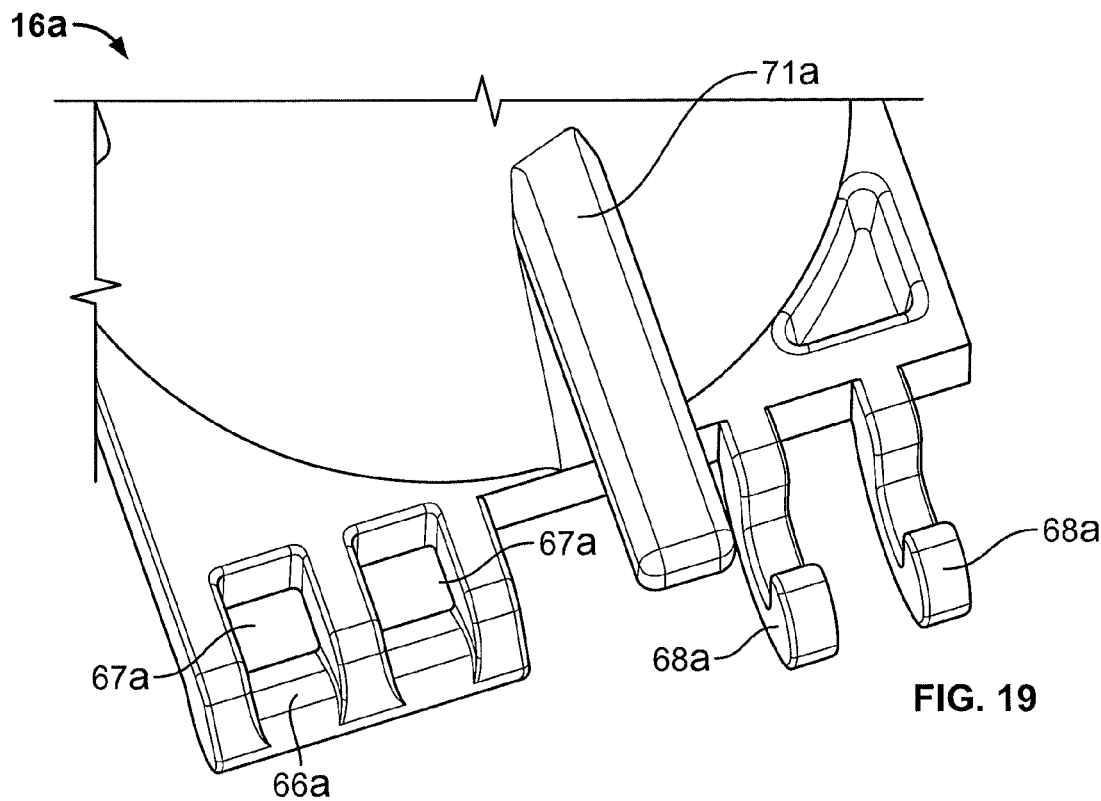
FIG. 19 is a partial exploded back perspective view of the supporting assembly of FIG. 14.
Figure 20:
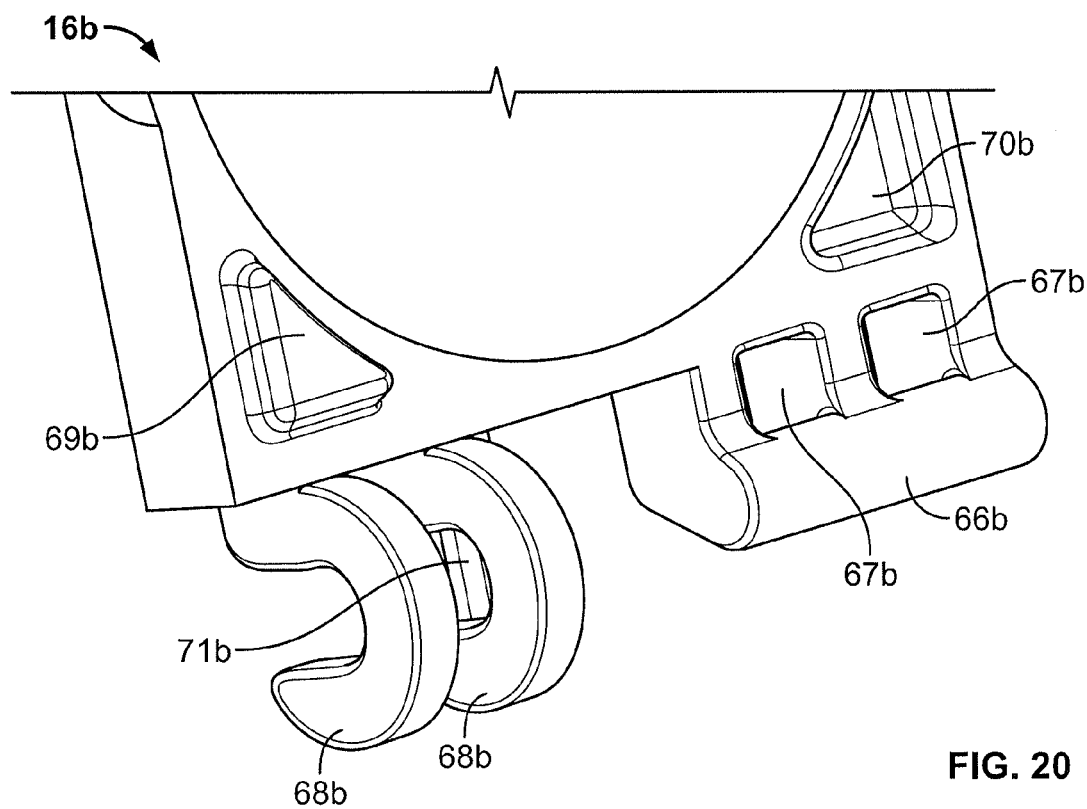
FIG. 20 is a partial exploded front perspective view of the supporting assembly of FIG. 14.
Figure 25:
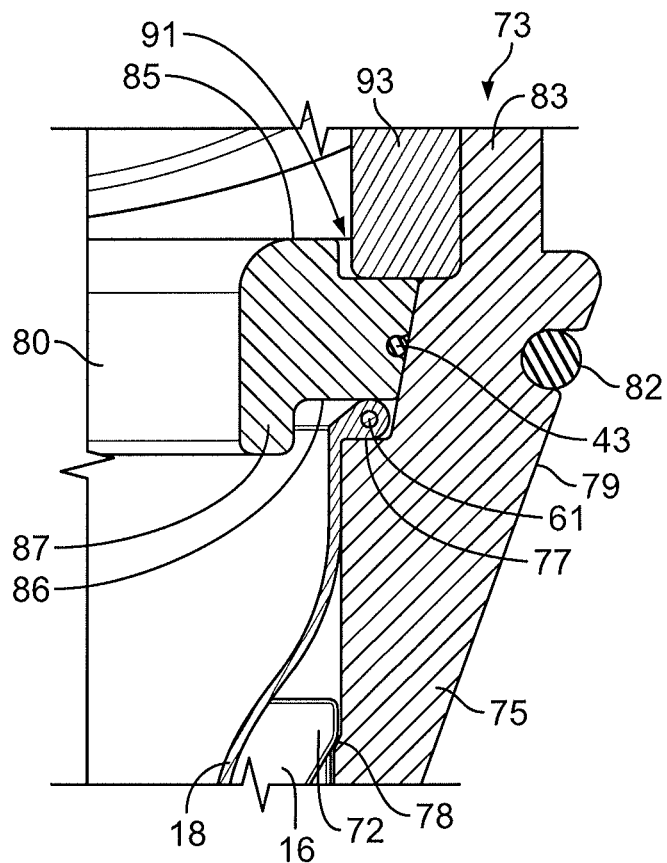
FIG. 25 is a partial exploded view of the assembled filter vessel assembly of FIGS. 21-23, with filter member secured.
Figure 26:
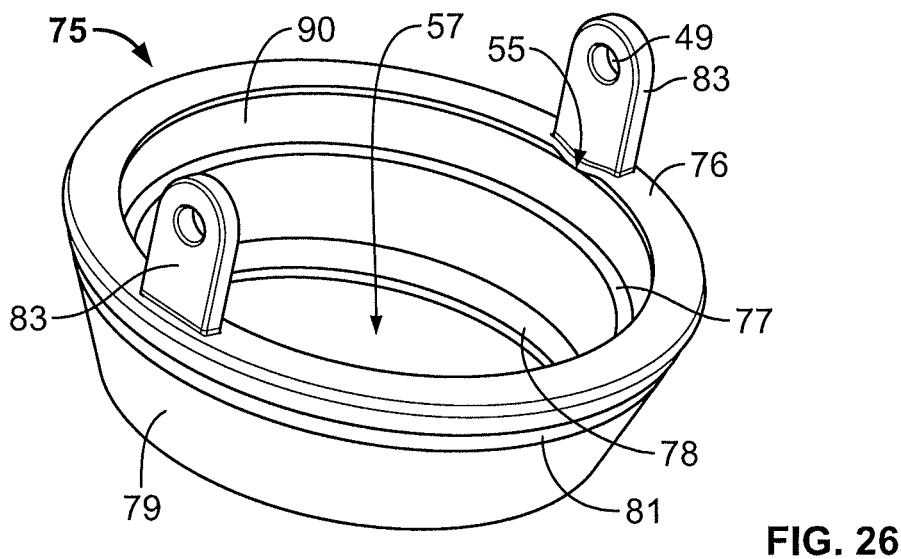
FIG. 26 is a top perspective view of a first securing member for a filter vessel assembly in accordance with an exemplary embodiment of the present disclosure.
Figure 27:
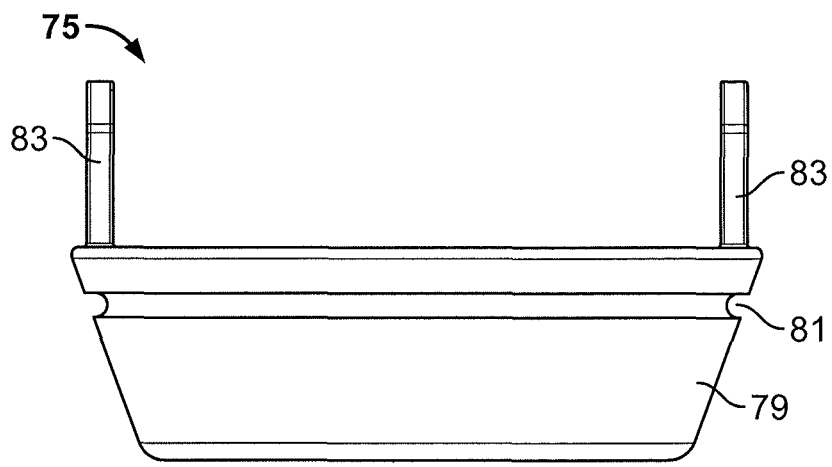
FIG. 27-28 are side views of the first securing member of FIG. 26.
Figure 28:
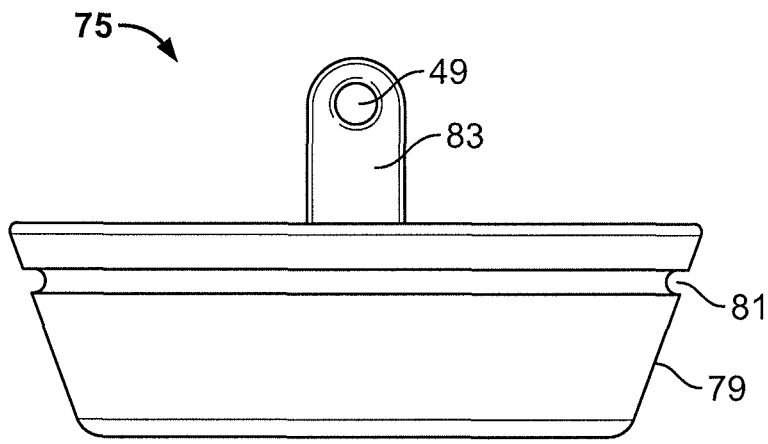
Figure 29:
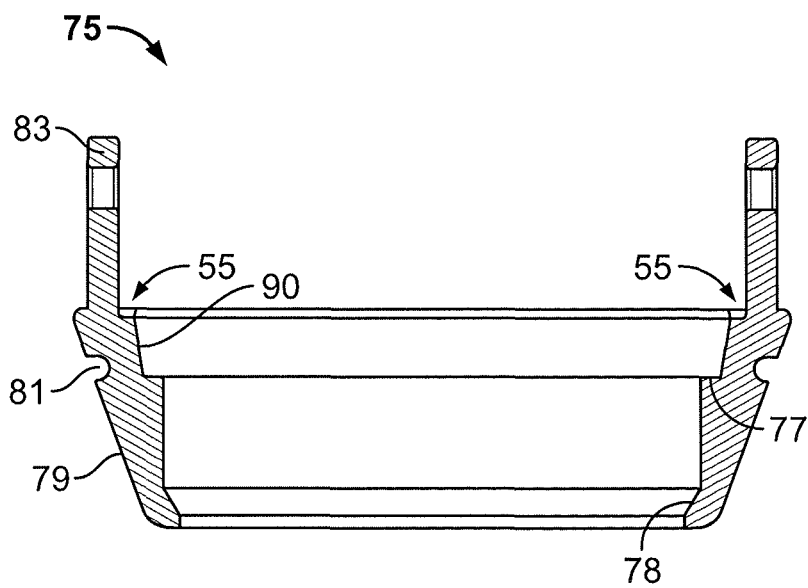
FIG. 29 is a cross-sectional side view of the first securing member of FIG. 26.

In exemplary embodiments and as shown in FIGS. 13 and 25, filter member 18 takes the form of a removable filter bag or the like. When filter member 18 takes the form of a removable filter bag, the filter member 18 typically includes a sealing member 61. In exemplary embodiments and as shown in FIGS. 13 and 25, sealing member 61 is substantially annular, with the annular sealing member 61 typically being positioned or located at or near (e.g., proximal or adjacent to) the open end 63 of filter member 18. In general, sealing member 61 is configured and dimensioned to allow filter member 18 to be releasably secured to filter vessel assembly 10 to ensure that substantially all of the fluid that enters assembly 10 via fluid inlet port 22 passes through filter member 18 for filtering purposes before exiting assembly 10 via fluid outlet port 24, as discussed further below.

Sealing member 61 of the filter bag may take a variety of forms, as is known in the art. For example, sealing member 61 may include a metal (e.g., stainless steel) or plastic (e.g., polypropylene) ring or toroid that has been sewn-in to the filter bag. Alternatively, sealing member 61 may include a plastic ring (e.g., molded seal ring) that has been welded (e.g., ultrasonically welded) or fusion bonded or the like to the filter bag. It is noted that filter vessel assembly 10 is generally configured and dimensioned to support a large variety of sealing members 61 (e.g., sewn-in, welded, fusion bonded, molded, adhered, folded, rolled, etc.) of various filter bags, with the various filter bags being fabricated from a variety of materials. As shown in FIG. 13, filter member 18 typically includes at least one handle 65 that facilitates removal of filter member 18 from assembly 10. As shown in FIG. 25 and as further discussed below, after sealing member 61 of the filter bag has been releasably secured within housing 14 of assembly 10, a substantial portion of the filter bag is supported by and/or pressed against (e.g., by fluid to be filtered during filtering operations) the interior of the supporting assembly 16.

In exemplary embodiments of the present disclosure and as shown in FIGS. 14-23, supporting assembly 16 includes a first supporting member 16a and a second supporting member 16b. In general, supporting members 16a, 16b are configured and dimensioned to be releasably secured/assembled together to define/form supporting assembly 16 (e.g., substantially cylindrical supporting assembly 16). As noted above, assembled supporting assembly 16 is configured/adapted to be positioned within housing 14 of filter vessel assembly 10 (FIGS. 21-23) and to support and/or position filter member 18 within housing 14.

In one embodiment, supporting members 16a, 16b are substantially similar in dimensions, features and/or design. Each supporting member 16a, 16b typically includes at least one receiving rod or pin 66a or 66b, at least one receiving opening 67a or 67b, and at least one fastening member 68a or 68b, respectively. In an exemplary embodiment and as depicted in FIGS. 14-20, supporting member 16a includes one receiving rod 66a, two receiving openings 67a, and two fastening members 68a. Similarly, supporting member 16b includes one receiving rod 66b, two receiving openings 67b, and two fastening members 68b. Exemplary fastening members 68a, 68b take the form of U-shaped or C-shaped fastening members 68a, 68b (e.g., hooks or talons or the like), although the present disclosure is not limited thereto. Rather, fastening members 68a, 68b may take a variety of forms.

Supporting members 16a, 16b typically include at least one extending portion 69a or 69b and at least one recessed portion 70a or 70b, respectively. In general, extending portions 69a, 69b and recessed portions 70a, 70b are positioned at or near the lower end of the interior portions of supporting members 16a, 16b, although the present disclosure is not limited thereto. As such, extending portions 69a, 69b extend towards the interior of supporting assembly 16 once assembled, and recessed portions 70a, 70b are recessed away from the center of supporting assembly 16 once assembled. Exemplary extending portions 69a, 69b and recessed portions 70a, 70b are substantially triangular in shape/geometry, although the present disclosure is not limited thereto. Rather, extending portions 69a, 69b and recessed portions 70a, 70b may take a variety of shapes/geometries (e.g., round, square, etc.). Supporting members 16a, 16b also typically include at least one leg member 71a or 71b, respectively, with each leg member 71a, 71b configured and dimensioned to allow a user to rest supporting assembly 16 on a surface (e.g., the ground) once supporting members 16a, 16b are assembled together to form supporting assembly 16.

Figure 39:
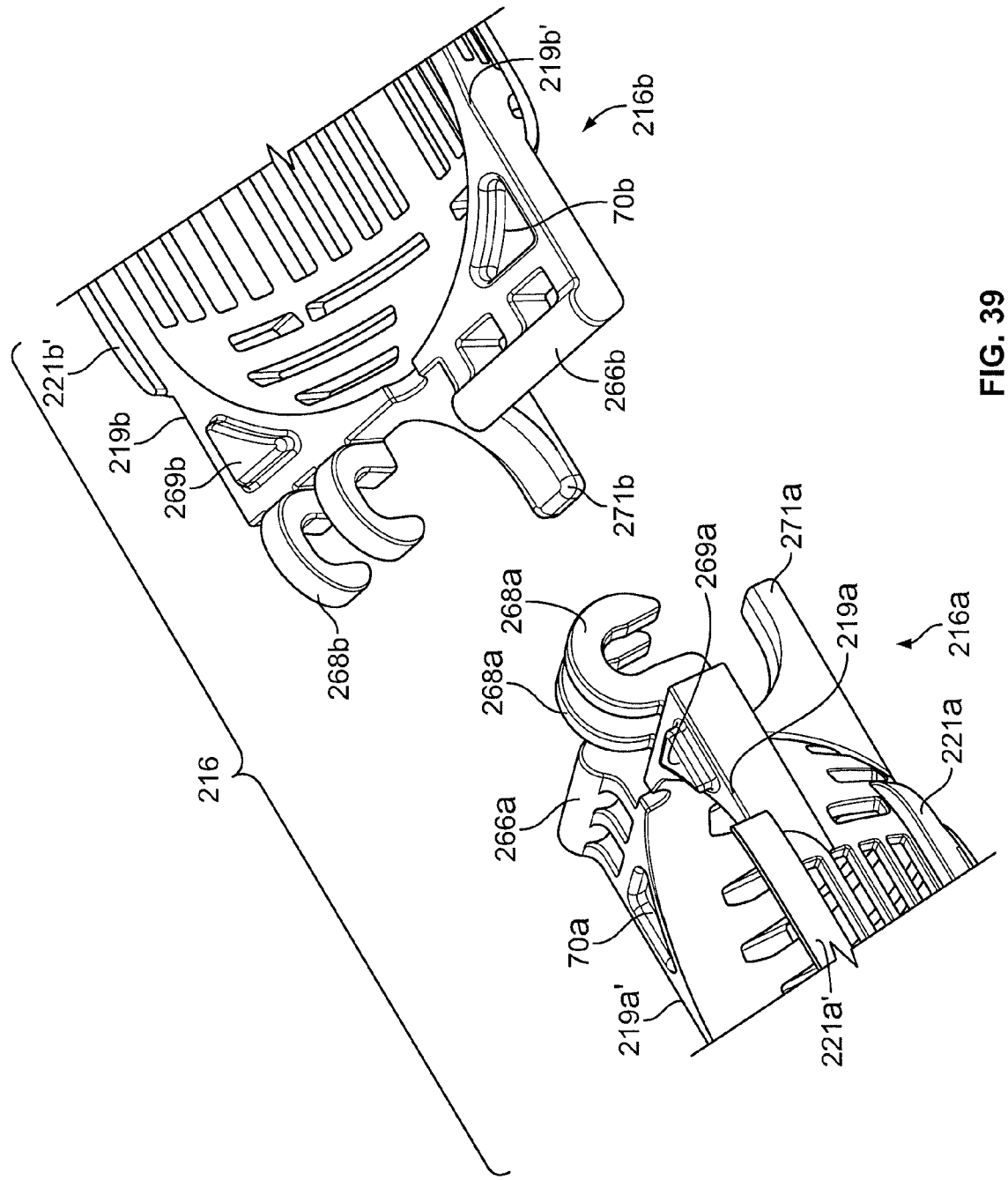
FIG. 39 is a partial exploded view of the supporting assembly of FIG. 38.

The releasable securement of supporting members 16a, 16b together to form assembled supporting assembly 16 is described in part with reference to FIGS. 38-43, which depict a similar, yet alternative, embodiment of a supporting assembly 216 for use with filter vessel assembly 10. Firstly, supporting members 16a, 16b would be positioned next to one another similar to the positions shown in FIGS. 38-39. As such, supporting member 16a would be positioned similar to supporting member 216a as shown in FIGS. 38-39, and supporting member 16b would be positioned similar to supporting member 216b as shown in FIGS. 38-39. In this position (similar to FIGS. 38-39), it is noted that the bottom surface of supporting member 16b is angled (e.g., from about 10° to about 90°, preferably about 45°) relative to the bottom surface of supporting member 16a.

Figure 40:
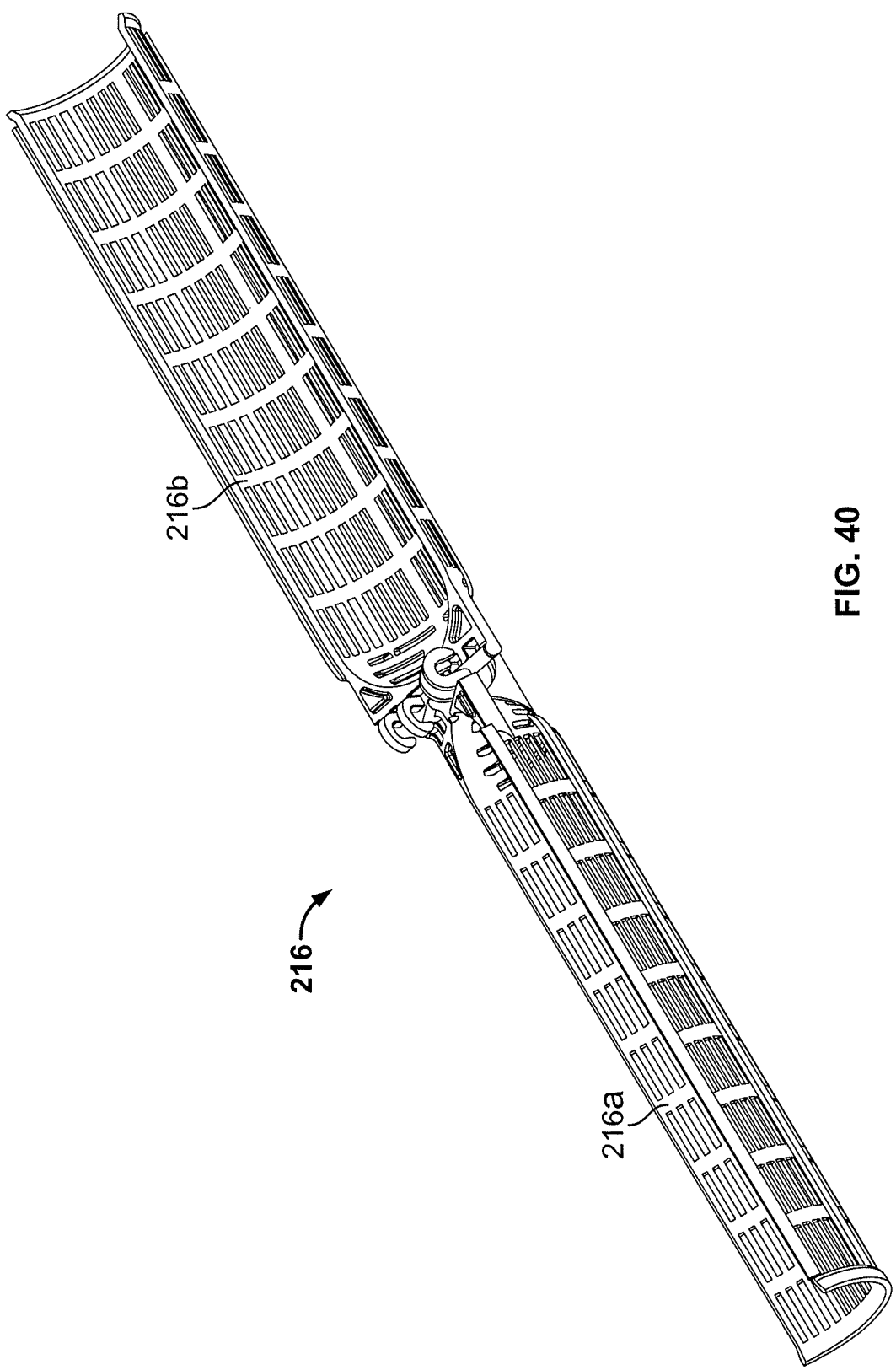
FIG. 40 is a side perspective view of the supporting assembly of FIG. 38.
Figure 41:
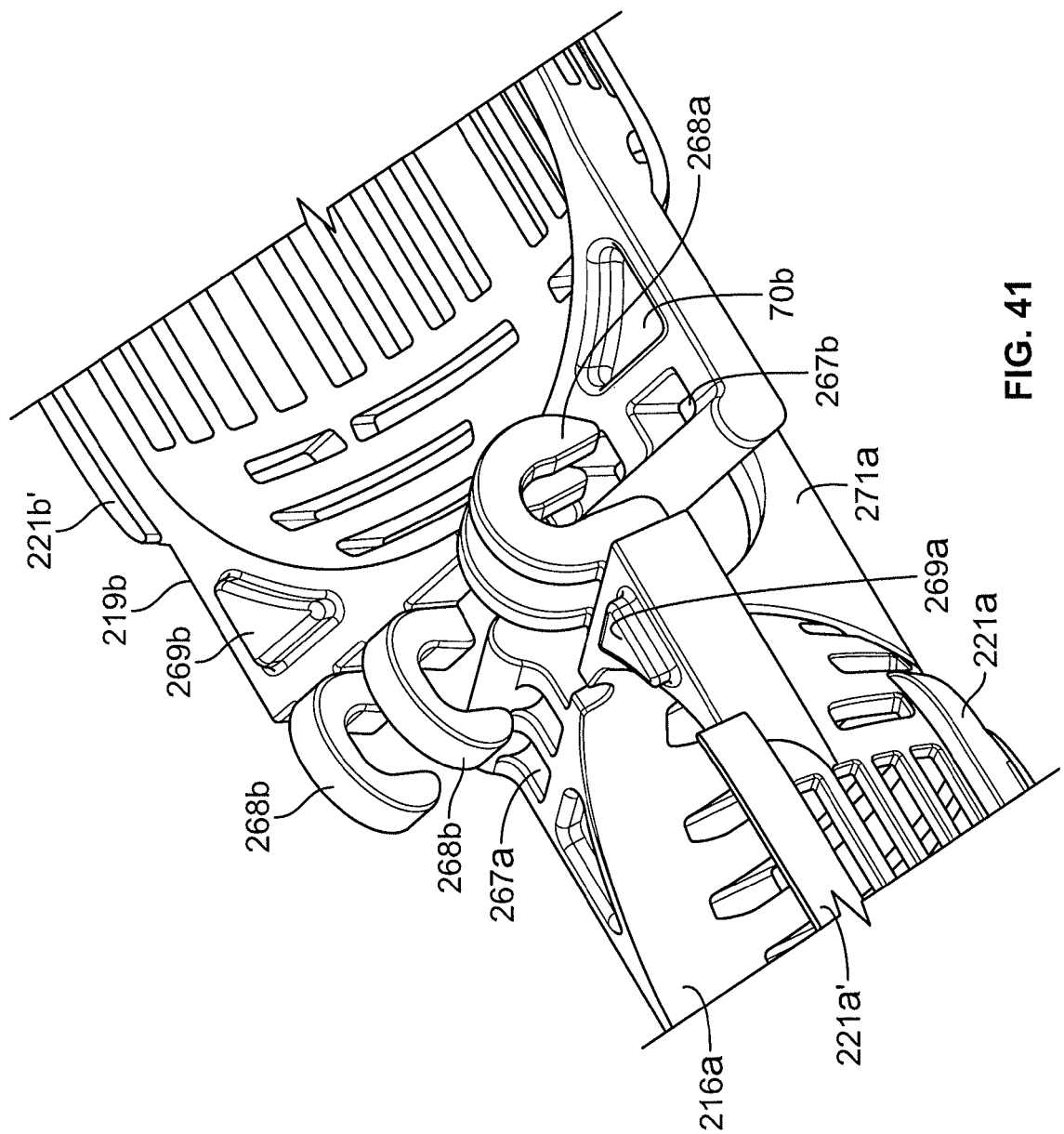
FIG. 41 is a partial exploded view of the supporting assembly of FIG. 40.

Supporting members 16a, 16b would then be positioned/moved adjacent one another similar to the positions of supporting members 216a, 216b as shown in FIGS. 40-41. In this position, it is noted that the two fastening members 68b of supporting member 16b would be positioned above the two receiving openings 67a of supporting member 16a. Similarly, the two fastening members 68a of supporting member 16a would be positioned above the two receiving openings 67b of supporting member 16b.

Figure 42:
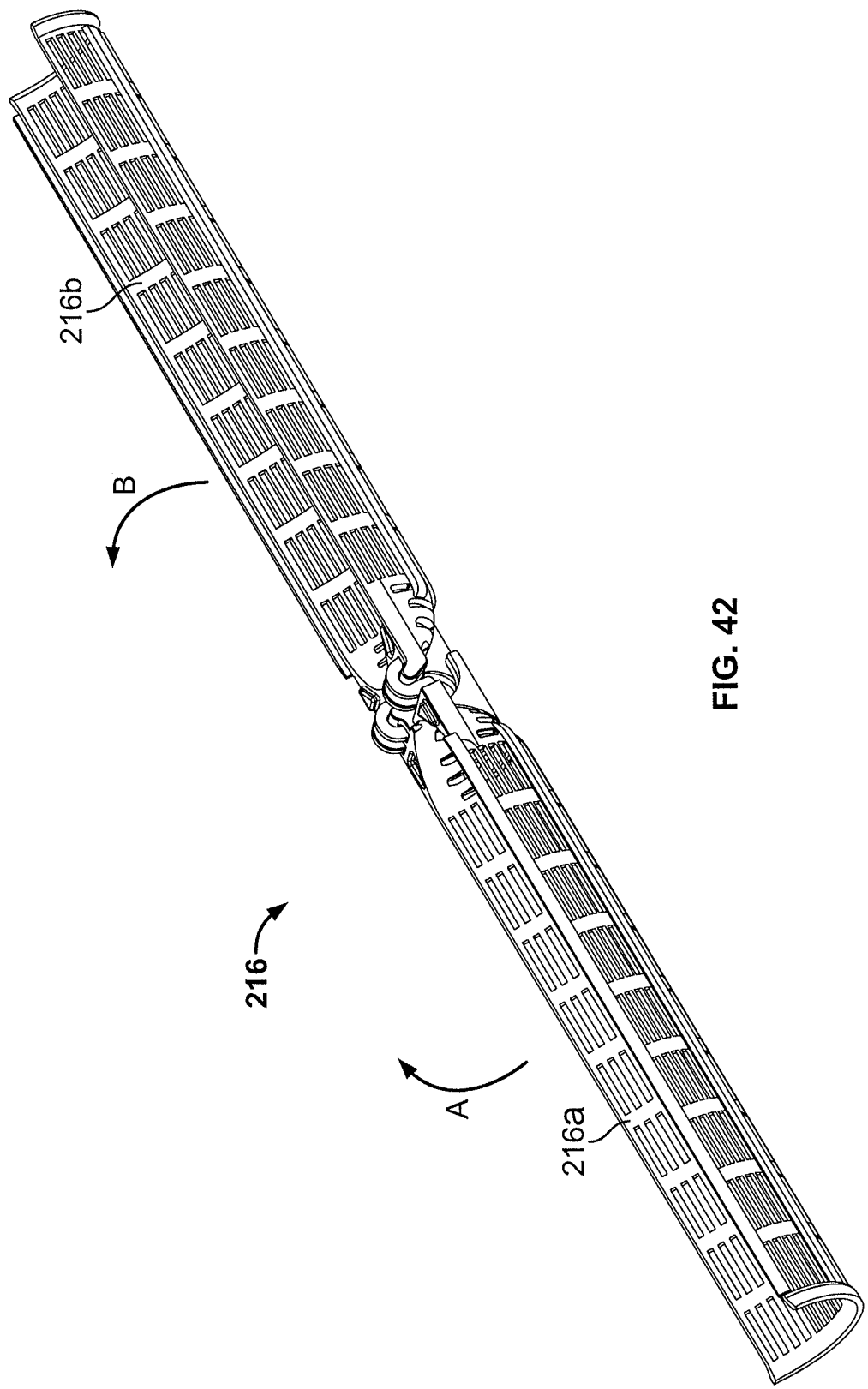
FIG. 42 is a side perspective view of the supporting assembly of FIG. 38.
Figure 43:
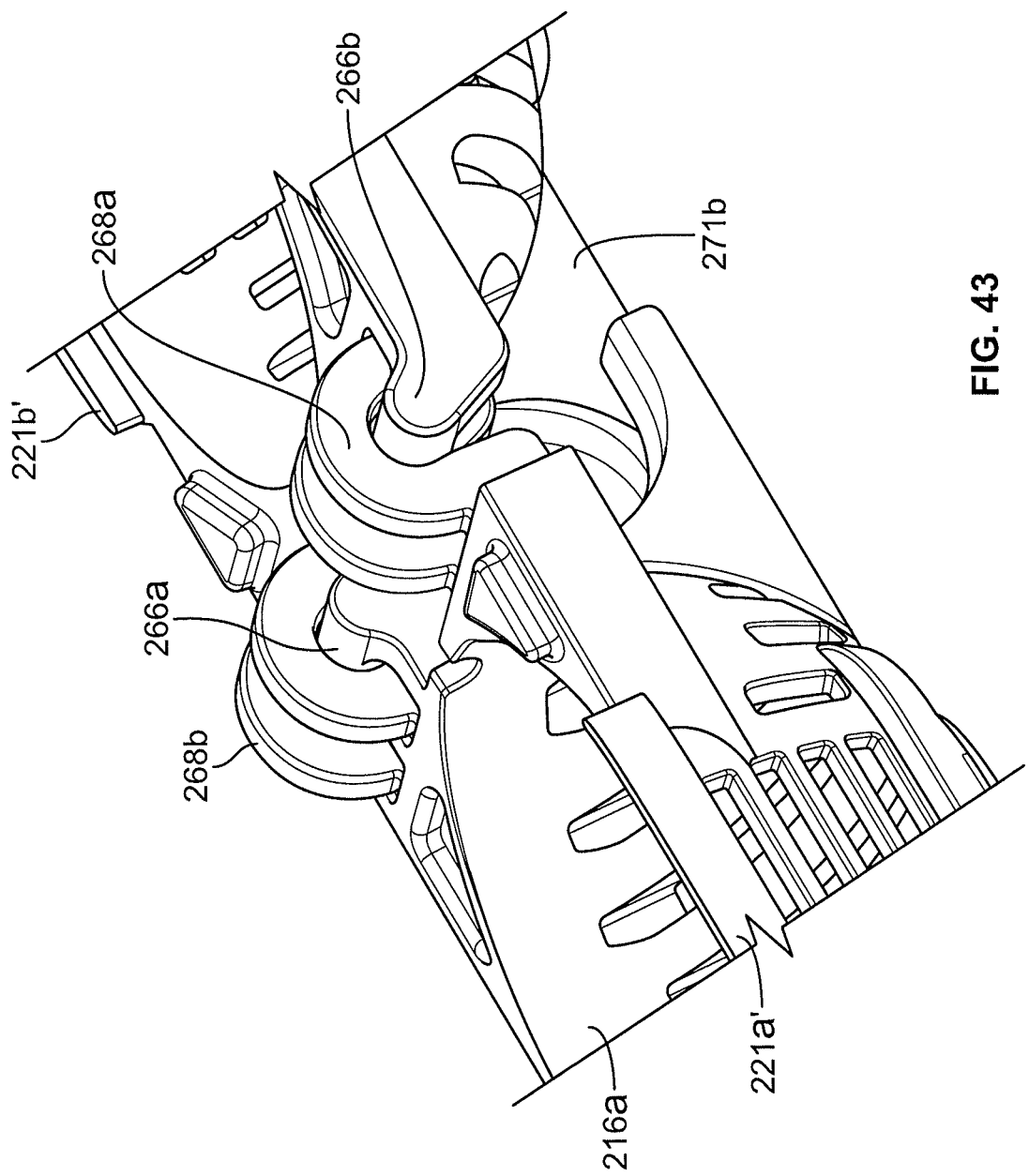
FIG. 43 is a partial exploded view of the supporting assembly of FIG. 42.

Next, the two fastening members 68b of supporting member 16b would be rotated toward the two receiving openings 67a of supporting member 16a (and/or the two fastening members 68a of supporting member 16a would be rotated toward the two receiving openings 67b of supporting member 16b) so that supporting members 16a, 16b would be positioned similar to supporting members 216a, 216b as shown in FIGS. 42-43. As such, at least a portion of each fastening member 68b of supporting member 16b would be positioned around receiving rod 66a and within a receiving opening 67a of supporting member 16a, and at least a portion of each fastening member 68a of supporting member 16a would be positioned around receiving rod 66b and within a receiving opening 67b of supporting member 16b.

A user would then rotate supporting members 16a, 16b towards one another (e.g., with member 16a moving in the direction of Arrow A of FIG. 15 and/or with member 16b moving in the direction of Arrow B of FIG. 15) via fastening members 68a, 68b hingedly rotating about receiving rods 66a, 66b to form the releasably (e.g., hingedly) assembled supporting assembly 16 as depicted in FIGS. 14 and 15 (and excluding the locking assembly 73 of FIG. 14, the securement of which to assembly 16 is discussed further below). In this assembled position, it is noted that at least a portion of extending portion 69a of supporting member 16a is releasably received/housed within recessed portion 70b of supporting assembly 16b, and at least a portion of extending portion 69b of supporting member 16b is releasably received/housed within recessed portion 70a of supporting assembly 16a. Such receipt/housing of extending portions 69a, 69b within recessed portions 70a, 70b substantially prevents relative motion between supporting members 16a, 16b in the general lateral directions of Arrow C and/or Arrow D of FIG. 14 when supporting assembly 16 is in the assembled position as depicted in FIGS. 14 and 15.

As such, to expand or disassemble the hingedly assembled supporting assembly 16, a user would first need to rotate supporting members 16a and 16b away from one another (e.g., with member 16a moving in the direction of Arrow B of FIG. 15 and/or with member 16b moving in the direction of Arrow A of FIG. 15) via fastening members 68a, 68b hingedly rotating about receiving rods 66a, 66b. In order to allow a user to move the supporting members 16a, 16b in the general lateral directions of Arrow C and/or Arrow D of FIG. 14, a user first would be required to rotate supporting members 16a and 16b away from one another so that extending portions 69a, 69b were not received within recessed portions 70a, 70b. It has been found that such lateral movement of members 16a, 16b can assist in the removal or installation of filter member 18 from assembly 10 and/or assembly 16. In addition, such movement is required by a user to disassemble supporting members 16a, 16b apart from one another once the supporting members 16a, 16b had been rotated away from each other the required distance. It has been found that in certain situations, movable supporting members 16a, 16b advantageously allow users to expand supporting assembly 16 (e.g., by rotating supporting members 16a and 16b away from one another via fastening members 68a, 68b hingedly rotating about receiving rods 66a, 66b, and then optionally moving the supporting members 16a, 16b laterally with respect to one another) to thereby assist users in the removal or installation of filter member 18 from/to supporting assembly 16. However, it is to be noted that it is not required that a user expand assembled supporting assembly 16 to remove or install filter member 18 from/to supporting assembly 16. Thus, a user would have the choice whether or not to expand assembled supporting assembly 16 for these purposes. It is also to be noted that complete disassembly of assembled supporting assembly 16 may not be intuitive to a user, which thereby lessens the likelihood that the supporting assembly 16 would be completely disassembled by a user (e.g., in the field).

In exemplary embodiments and as shown in FIGS. 16-18 and 21-25, assembled supporting assembly 16 typically includes an outwardly extending collar member 72 or the like. In general, collar member 72 extends, tapers or slopes outwardly from the upper open end 41 of supporting assembly 16. In one embodiment, collar member 72 defines a substantially annular (e.g., ring-like) collar member 72 that extends outwardly from and around the circumference of upper open end 41 of supporting assembly 16. Supporting assembly 16 typically also includes a plurality of slots, apertures or openings 74 that are configured and dimensioned to allow filtered fluid to pass through the supporting assembly 16 and to fluid outlet port 24 (and/or to drilled/tapped boss 28) after the filtered fluid has passed through filter member 18 housed/positioned within the interior of supporting assembly 16. Assembled supporting assembly 16 (e.g., supporting members 16a, 16b) is typically fabricated from plastic, although the present disclosure is not limited thereto.

In exemplary embodiments and as shown in FIGS. 14 and 21-37, filter vessel assembly 10 typically includes locking assembly 73. Locking assembly 73 typically includes first securing member 75 (FIGS. 26-29), second securing member 80 (FIGS. 30-32) and locking member or locking handle 84 (FIGS. 35-37), each of which is discussed in further detail below. In general, locking assembly 73 is configured and dimensioned to be releasably secured and/or positioned within housing 14 of filter vessel assembly 10, with first securing member 75 of locking assembly 73 being configured/adapted to releasably secure and/or position supporting assembly 16 within housing 14. Once first securing member 75 has releasably secured/positioned supporting assembly 16 within housing 14, second securing member 80 and locking member 84 are configured and dimensioned to releasably secure a filter member 18 (e.g., filter bag) within housing 14, with a substantial portion of the filter member 18 being disposed within the interior of supporting assembly 16.

As shown in FIGS. 26-29, exemplary first securing member 75 of locking assembly 73 takes the form of a substantially ring-like, hollow basket member, although the present disclosure is not limited thereto. First securing member 75 includes an upper surface 76 (e.g., upper annular surface), an intermediate surface 77 (e.g., intermediate annular surface) and a lower surface 78 (e.g., lower annular surface) that tapers/slopes inwardly (e.g., toward the center of housing 14 or the center of member 75). In one embodiment, intermediate surface 77 extends inwardly to form/define a substantially planar intermediate surface (e.g., a substantially horizontal shoulder or shelf), although the present disclosure is not limited thereto. Rather, intermediate surface may taper or slope inwardly (e.g., either upwardly toward arms 83, or downwardly toward lower surface 78).

The outer surface 79 of first securing member 75 also typically tapers/slopes inwardly (e.g., toward the center of member 75), with the outer surface 79 including a groove 81 that is configured and dimensioned to at least partially house or contain a gasketing material 82 (e.g., an elastomeric O-ring or the like—FIGS. 24-25). The interior surface 90 between intermediate surface 77 and upper surface 76 of first securing member 75 typically tapers/slopes inwardly. In exemplary embodiments, first securing member 75 includes two retaining arms or post members 83, with each post member 83 having a receiving portion 49 (e.g., an aperture 49 therethrough or recessed portion 49 therein).

Upper annular surface 76 typically includes at least one recessed portion or depression 55 (e.g., downwardly sloping recessed portion/surface). In exemplary embodiments, upper annular surface 76 includes two recessed portions 55, with one recessed portion 55 being disposed substantially adjacent each post member 83. Stated another way, the upper surface 76 may include a recessed portion 55 disposed/positioned substantially adjacent to each post member 83.

In general, first securing member 75 is configured and dimensioned to be releasably secured and/or positioned with respect to assembled supporting assembly 16 (and with respect to the other alternative supporting assemblies disclosed/discussed below). In this regard, first securing member is typically first positioned beneath the lower end 59

Figure 45:
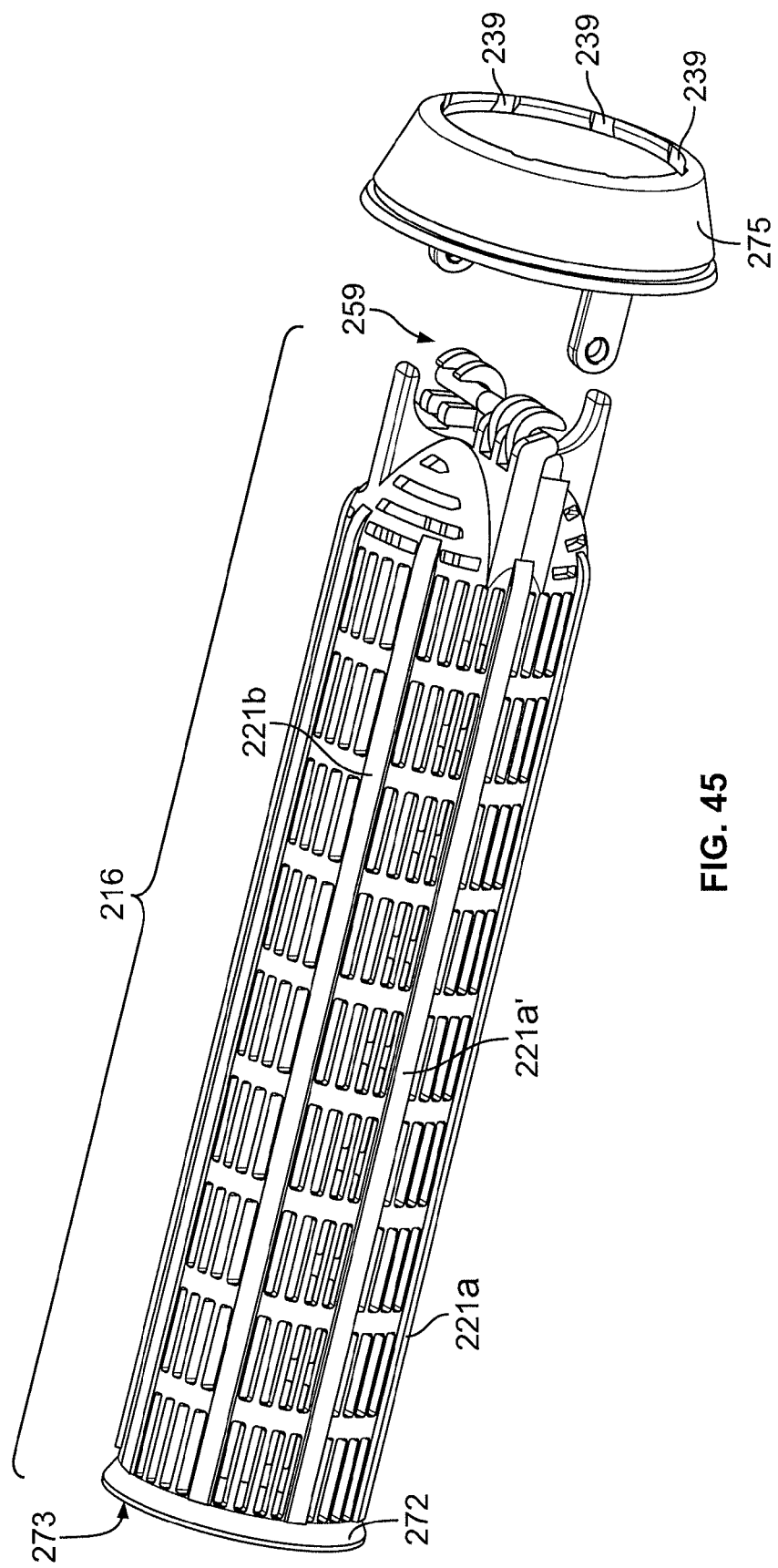
FIG. 45 is a side perspective view of the supporting assembly of FIG. 44, and of a first securing member for a filter vessel assembly in accordance with another exemplary embodiment of the present disclosure.
Figure 46:
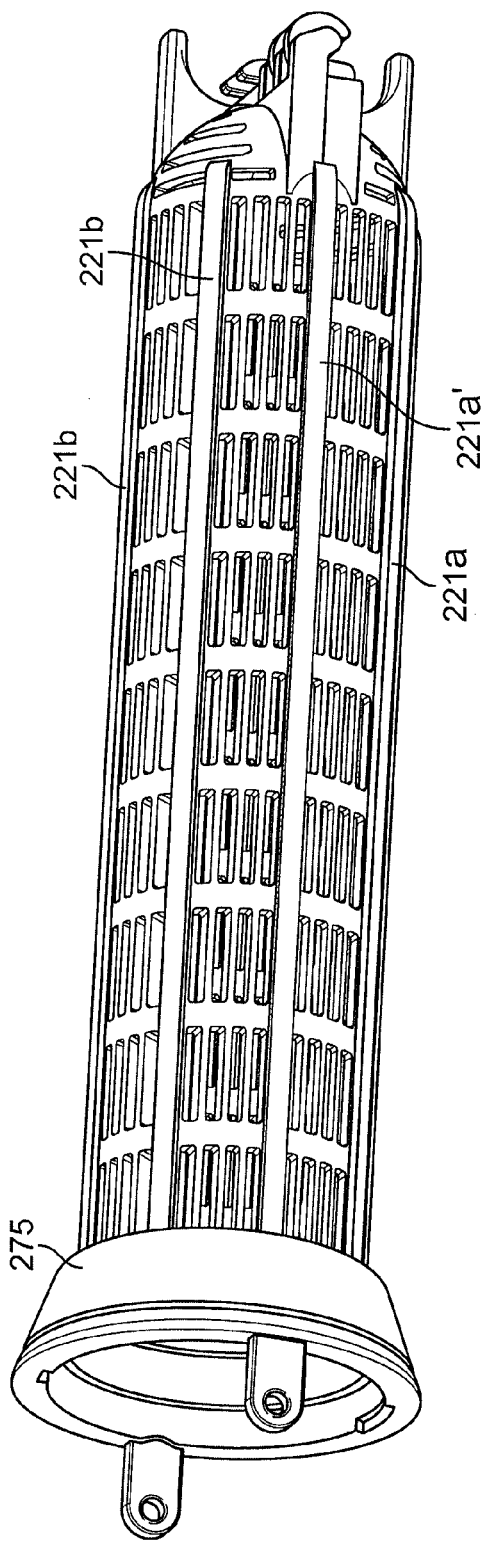
FIG. 46 is a side perspective view of the supporting assembly and first securing member of FIG. 45.
Figure 47:
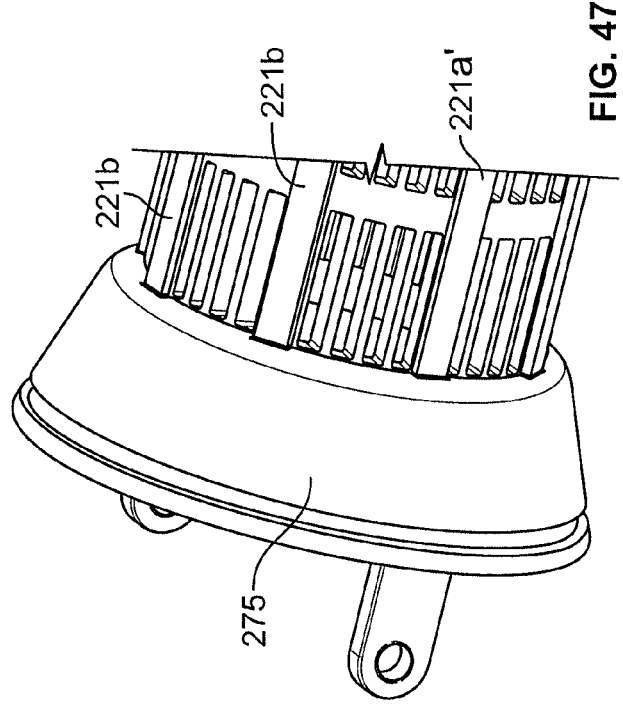
FIG. 47 is a partial exploded view of the supporting assembly and first securing member of FIG. 46.
Figure 50:
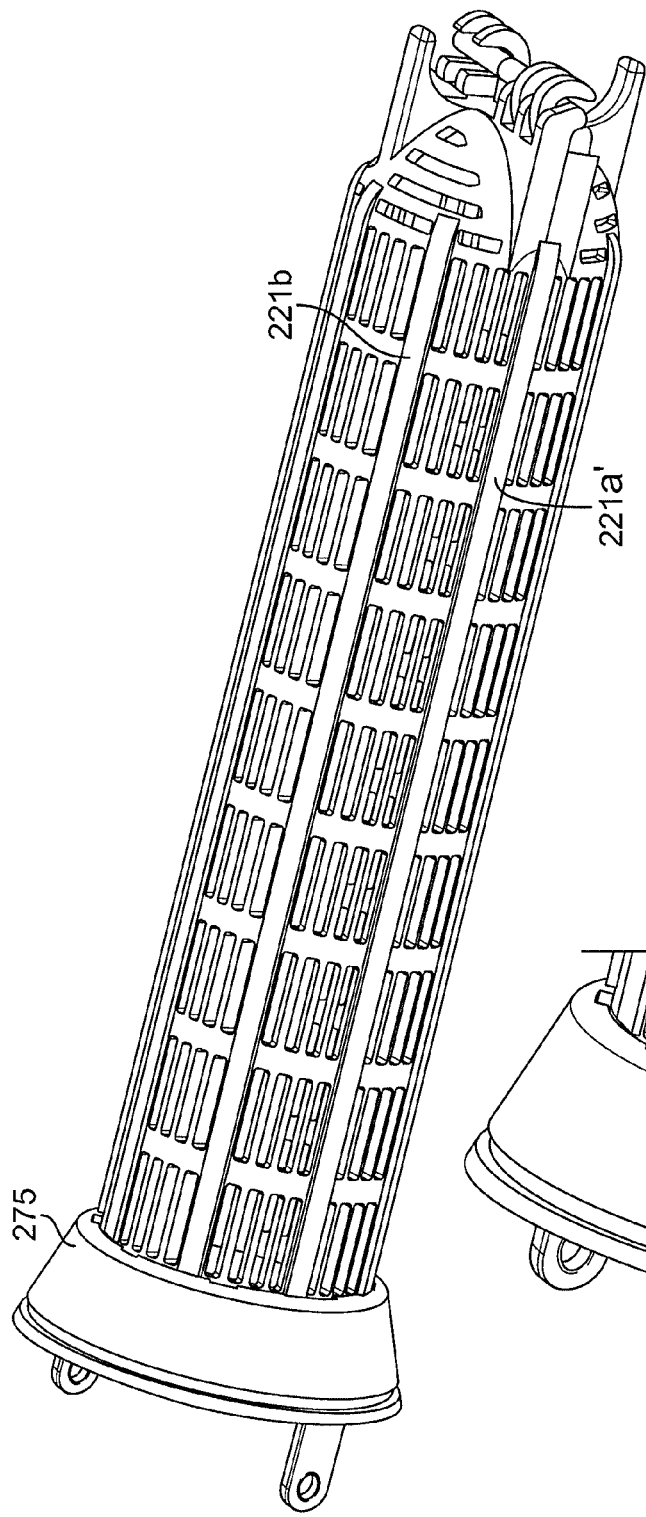
FIG. 50 is a side perspective view of the supporting assembly and first securing member of FIG. 45.
Figure 51:
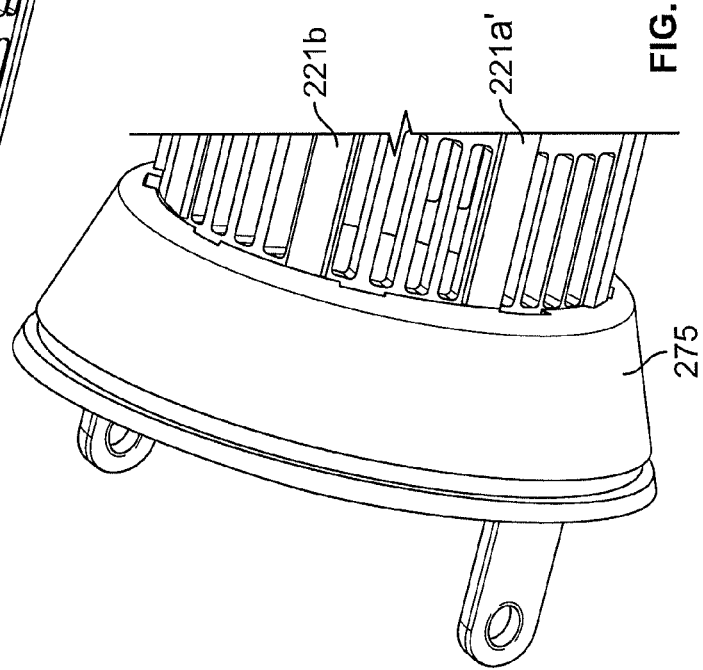
FIG. 51 is a partial exploded view of the supporting assembly and first securing member of FIG. 50.
Figure 52:
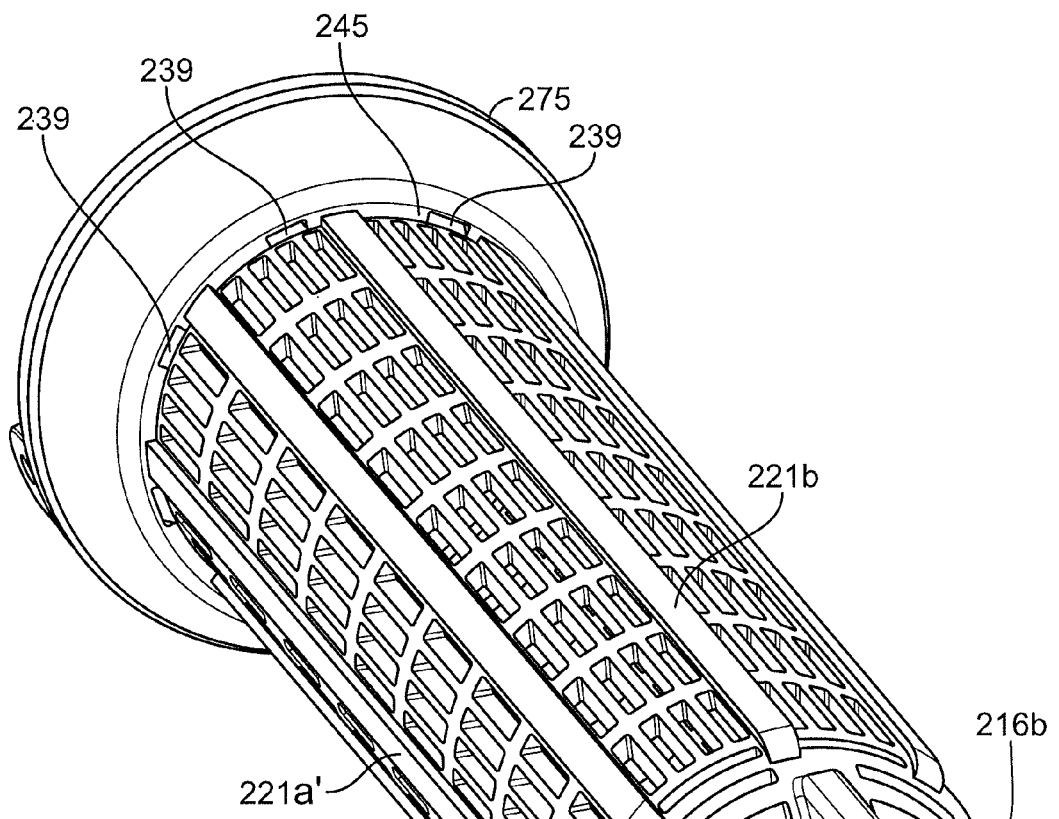
FIG. 52 is a bottom perspective view of the supporting assembly and first securing member of FIG. 45.
Figure 53:
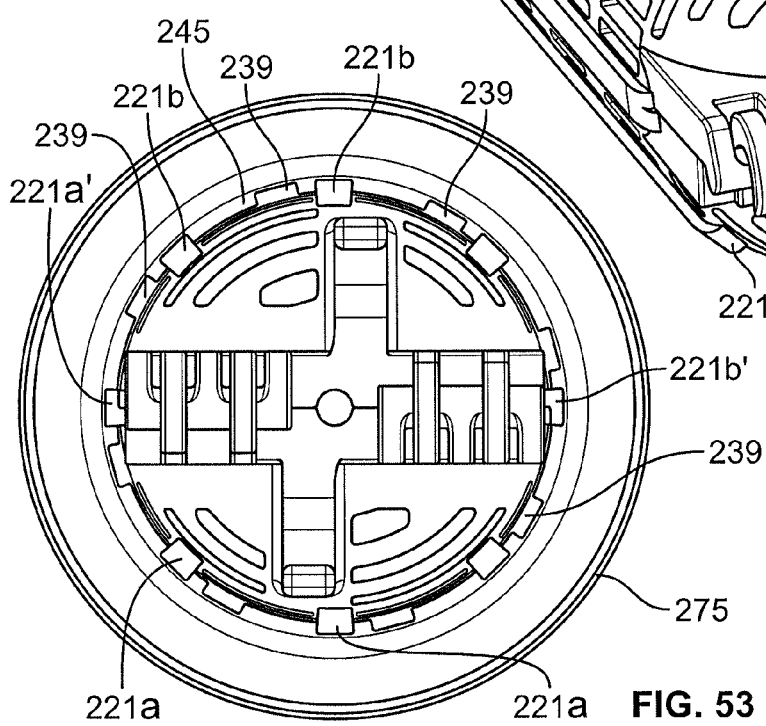
FIG. 53 is a bottom view of the supporting assembly and first securing member of FIG. 45.
Figure 54:
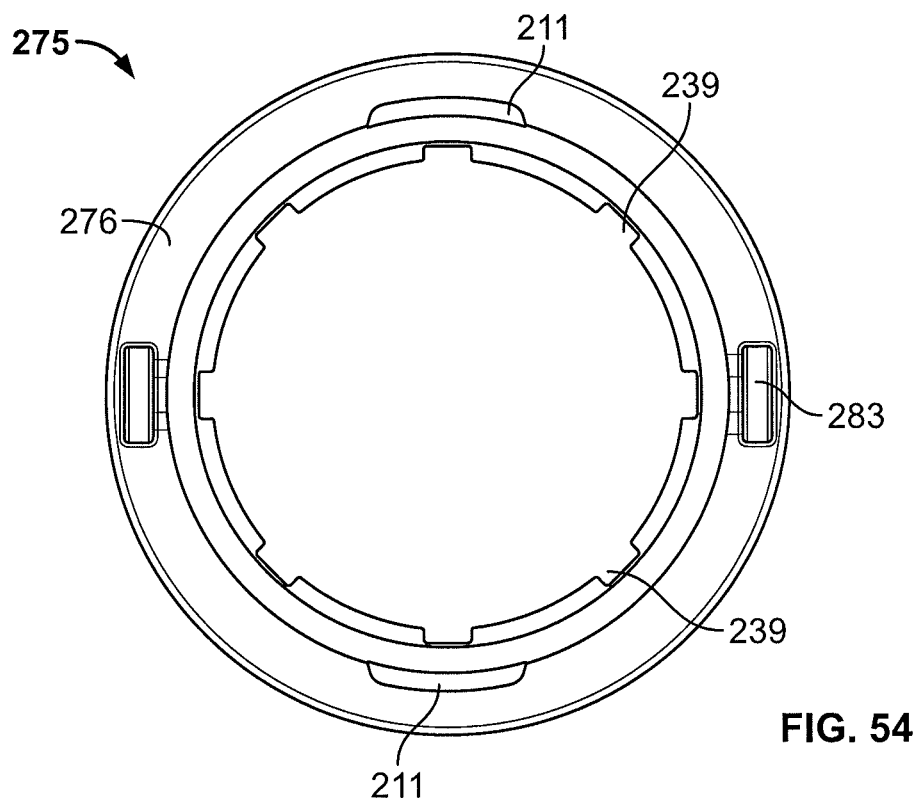
FIG. 54 is a top view of a first securing member for a filter vessel assembly in accordance with another exemplary embodiment of the present disclosure.
Figure 55:
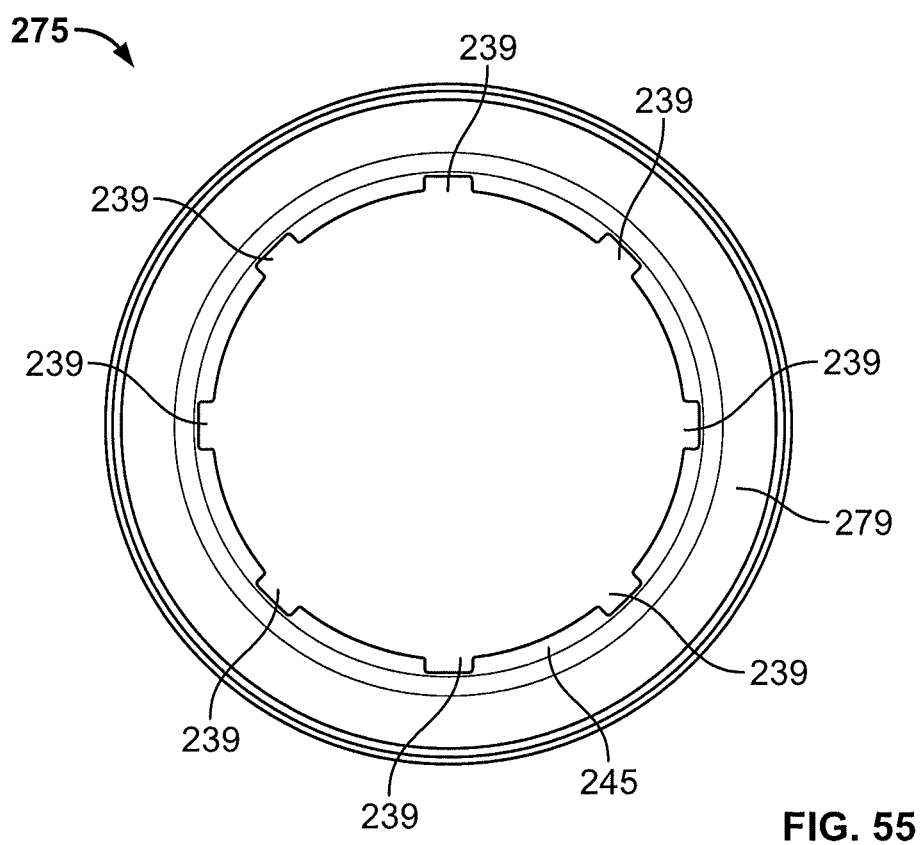
FIG. 55 is a bottom view of the first securing member of FIG. 54.
Figure 56:
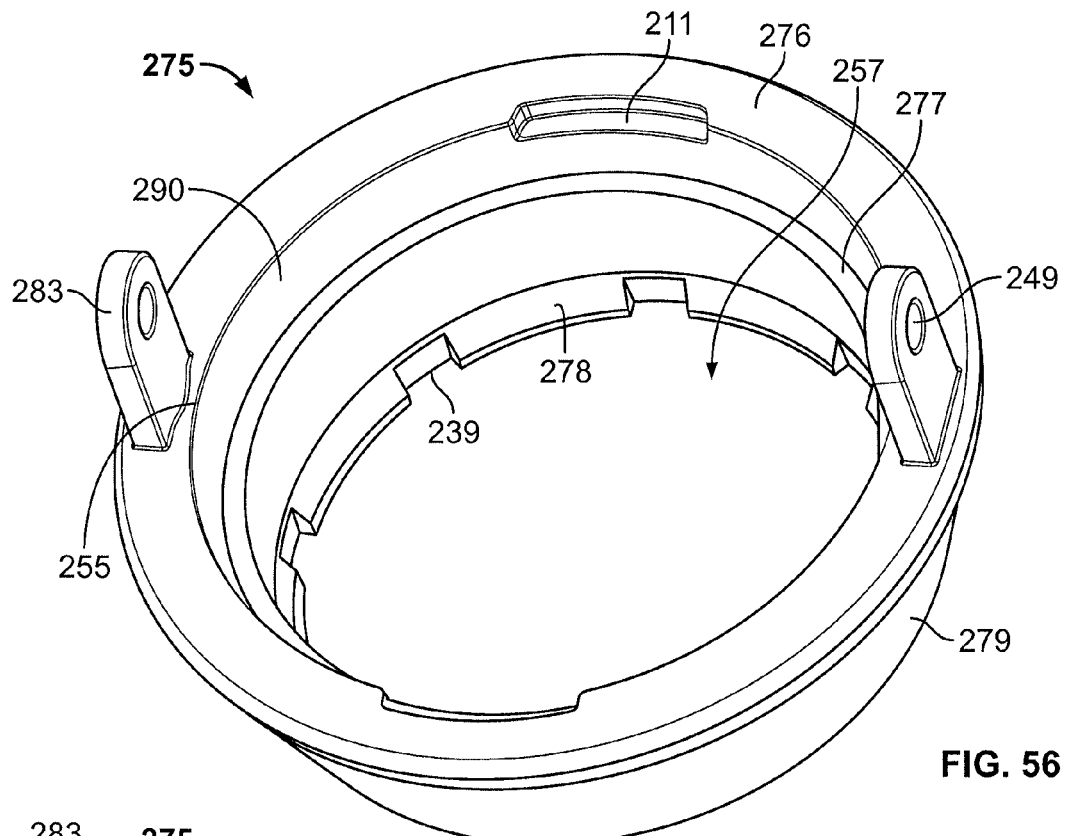
FIG. 56 is a top perspective view of the first securing member of FIG. 54.
Figure 57:
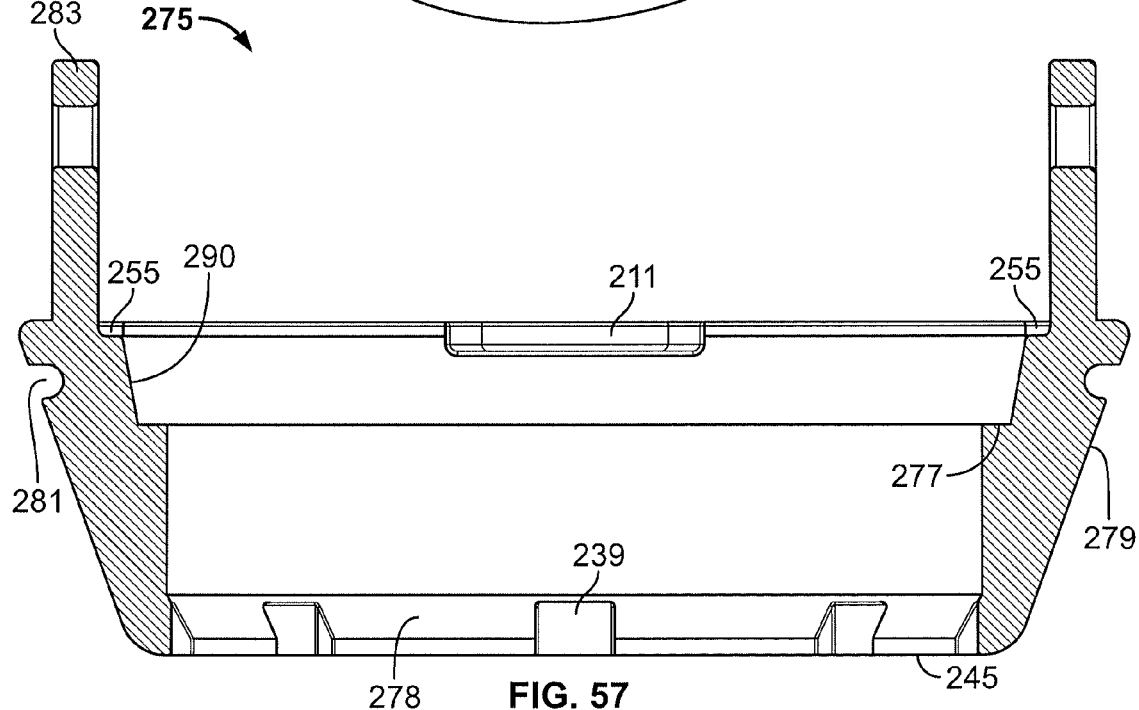
FIG. 57 is a side cross-sectional view of the first securing member of FIG. 54.

(FIGS. 14-15) of assembled supporting assembly 16 (e.g., so that first securing member 75 is positioned similar to securing member 275 as depicted in FIG. 45). A user would then move the lower end 59 of assembly 16 through the central opening 57 of first securing member 75 and move/position the first securing member 75 towards the upper end of the assembly 16 until at least a portion of the collar member 72 of the assembly 16 engaged (e.g., frictionally engaged) and/or rested upon at least a portion of the lower surface 78 of first securing member 75 (FIGS. 14 and 21-25).

In exemplary embodiments, first securing member 75 with supporting assembly 16 positioned thereon and/or engaged therewith could then typically have a filter member 18 (e.g., filter bag) releasably secured thereto via interaction between second securing member 80, locking member 84, filter member 18 (e.g., sealing member 61 of filter member 18) and/or first securing member 75 (FIG. 25). Firstly and with respect to first securing member 75 with supporting assembly 16 positioned thereon and/or engaged therewith, a user could then position and/or rest the sealing member 61 of filter member 18 on intermediate surface 77 of first securing member 75, with a substantial portion of the filter member 18 that downwardly extends from sealing member 61 being supported/positioned within the interior of supporting assembly 16. A user could then position the first securing member 75 with supporting assembly 16 and filter member 18 positioned thereon within housing 14 of filter vessel assembly 10, as further discussed below (e.g., before or after second securing member 80 and/or locking member 84 are positioned and/or engaged in locking assembly 73). In exemplary embodiments, once locking assembly 73 has been releasably secured together as discussed further below (with or without filter member 18 present in locking assembly 73), supporting assembly 16 is not removable from secured locking assembly 73 until locking assembly 73 has been unsecured from the secured position.

It is to be noted that a user may first position first securing member 75 within housing 14 and then position supporting assembly 16 through the central opening 57 of first securing member 75 to thereby rest collar member 72 on lower surface 78. Similarly, the sealing member 61 could then be positioned on intermediate surface 77. As noted above, when supporting assembly 16 is positioned in housing 14, each inner protrusion 60 of housing 14 helps to facilitate the alignment (e.g., substantially central alignment) of supporting assembly 16 within housing 14 during assembly/insertion of supporting assembly 16 within housing 14.

With reference to FIGS. 8-9, the interior of housing 14 typically includes an intermediate interior surface 15 (e.g., intermediate annular surface) that extends, tapers and/or slopes (e.g., slightly) inwardly and/or downwardly toward the center of housing 14. For example and as shown in FIG. 8, intermediate interior surface 15 can taper/slope inwardly and downwardly toward the center of housing 14. In an alternative embodiment, intermediate surface 15 may extend inwardly to form/define a substantially planar (e.g., substantially horizontal) shoulder or shelf of housing 14.

In general, intermediate surface 15 is positioned below fluid inlet ports 22. When first securing member 75 is inserted into open end 20 of housing 14 (with or without supporting assembly 16 positioned thereon), the first securing member 75 will travel downward within housing 14 until the outer surface 79 and/or gasketing material 82 of first securing member 75 engages with intermediate surface 15 of housing 14 (FIGS. 21-24).

It is to be noted that first securing member 75 typically is inserted into housing 14 after supporting assembly 16 is positioned on lower surface 78, and after locking assembly 73 is releasably secured together to releasably secure filter bag 18 to locking assembly 73 (as discussed below), but the present disclosure is not limited thereto. For example, first securing member 75 with supporting assembly 16 and filter bag 18 positioned thereon may first be inserted into housing 14, and then locking assembly 73 may then be releasably secured together to releasably secure filter bag 18 to locking assembly 73. Additionally, a user may wish to first insert/position first securing member 75 within housing 14 (e.g., with outer surface 79 engaging intermediate surface 15) and then insert supporting assembly through opening 57, followed by the placement of sealing member 61 on intermediate surface 77 and then the locking assembly 73 being releasably secured together to releasably secure filter bag 18 to locking assembly 73.

Figure 30:
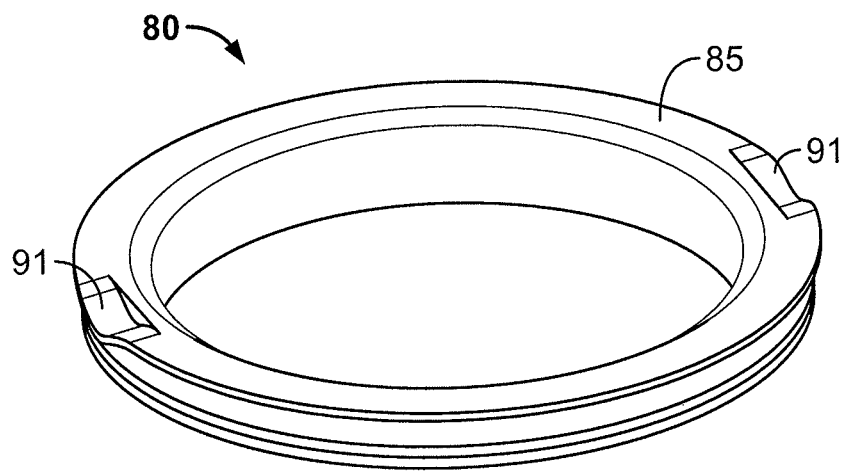
FIG. 30 is a top perspective view of a second securing member for a filter vessel assembly in accordance with an exemplary embodiment of the present disclosure.
Figure 31:
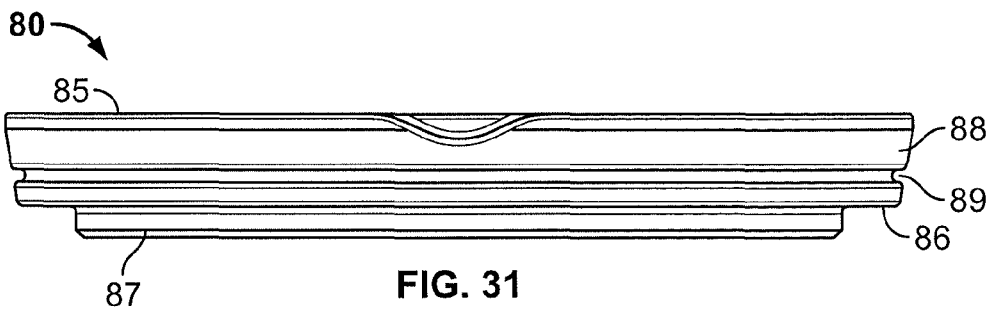
FIG. 31 is a side view of the second securing member of FIG. 30.
Figure 32:
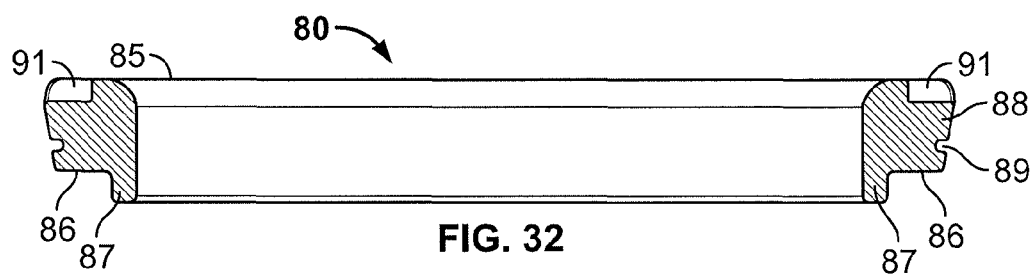
FIG. 32 is a cross-sectional side view of the second securing member of FIG. 30.

As depicted in FIGS. 30-32, exemplary second securing member 80 takes the form of a hollow, substantially ring-like member, although the present disclosure is not limited thereto. Second securing member 80 includes an upper surface 85 (e.g., upper annular surface) and a lower surface 86 (e.g., lower annular surface) that includes a downwardly extending lip portion 87. The outer surface 88 of second securing member 80 typically tapers/slopes inwardly, with the outer surface 88 including a groove 89 that is configured and dimensioned to at least partially house or contain a gasketing material 43 (e.g., an elastomeric O-ring or the like—FIGS. 24-25).

Upper annular surface 85 typically includes at least one recessed portion or depression 91 (e.g., downwardly sloping recessed portion/surface). In exemplary embodiments, upper annular surface 85 includes two recessed portions 91, with one recessed portion 91 being disposed substantially adjacent each post member 83 of first securing member 75 during engagement of locking assembly 73 together, as discussed further below.

Figure 30A:
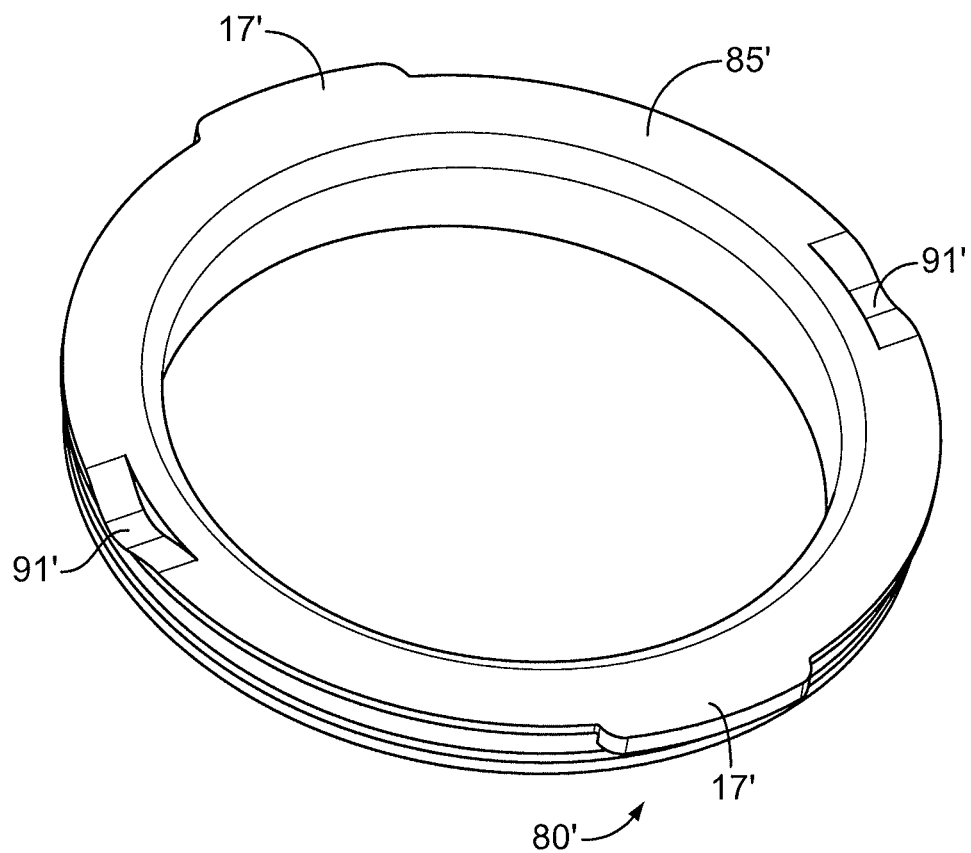
FIG. 30A is a top perspective view of a second securing member for a filter vessel assembly in accordance with another exemplary embodiment of the present disclosure.

In one embodiment and as shown in FIG. 30A, second securing member 80' is generally structurally and functionally similar to second securing member 80, with second securing member 80' typically including two protuberances 17' that extend from upper surface 85'. In general, each protuberance 17' is positioned about 90° from each recessed portion 91', although the present disclosure is not limited thereto. Rather, member 80' can include any number of protuberances 17' (e.g., one, a plurality, etc.) that are positioned at various positions on member 80'.

Figure 33:
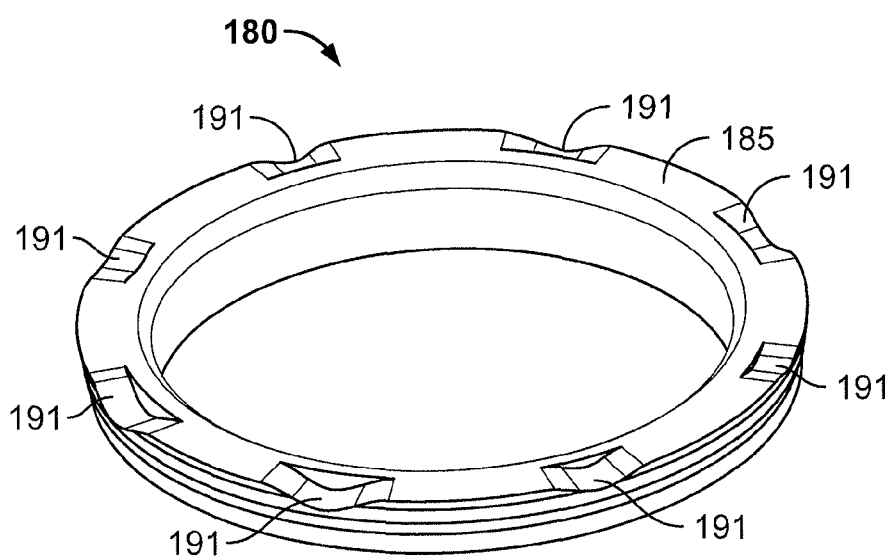
FIG. 33 is a top perspective view of a second securing member for a filter vessel assembly in accordance with another exemplary embodiment of the present disclosure.
Figure 34:
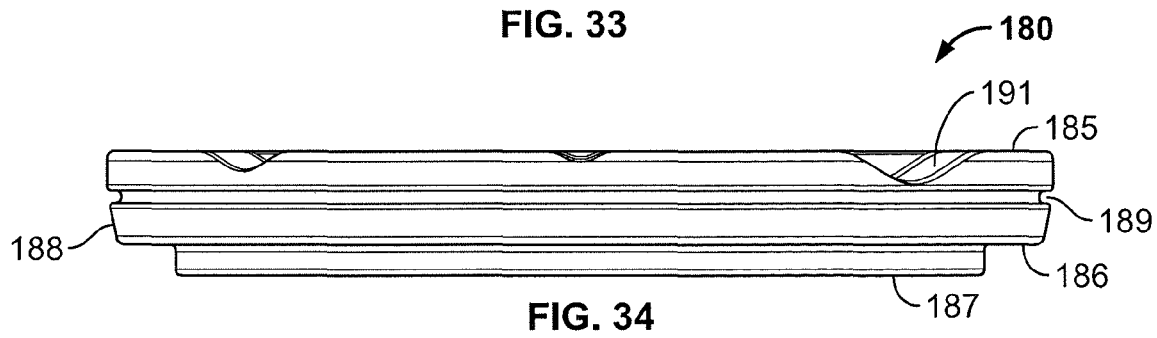
FIG. 34 is a side view of the second securing member of FIG. 33.

In another alternative embodiment and as depicted in FIGS. 33-34, second securing member 180 for use with first securing member 75 (or with first securing member 275—discussed below) and locking member 84 of locking assembly 73 includes a plurality of recessed portions 191 on upper surface 185, as described and explained in further detail below. Similar to member 80, member 180 also a lower surface 186 (e.g., lower annular surface) that includes a downwardly extending lip portion 187. The outer surface 188 of second securing member 180 typically tapers/slopes inwardly, with the outer surface 188 including a groove 189 that is configured and dimensioned to at least partially house or contain a gasketing material 43.

Figure 35:
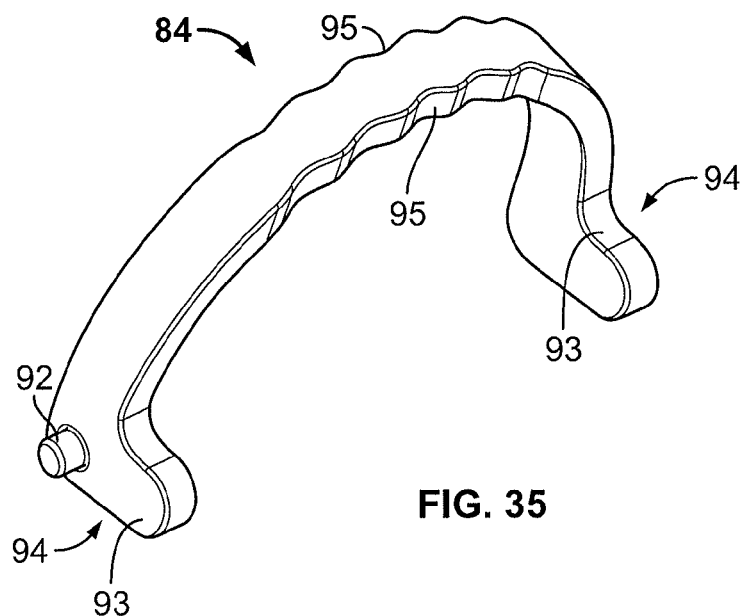
FIG. 35 is a front perspective view of a locking member for a filter vessel assembly in accordance with an exemplary embodiment of the present disclosure.
Figure 37:
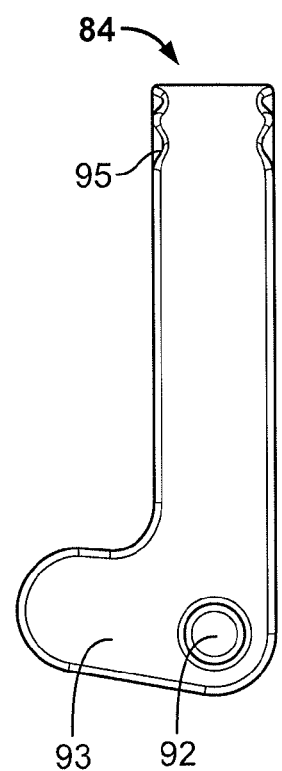
FIG. 37 is a side view of the locking member of FIG. 35.
Figure 36:
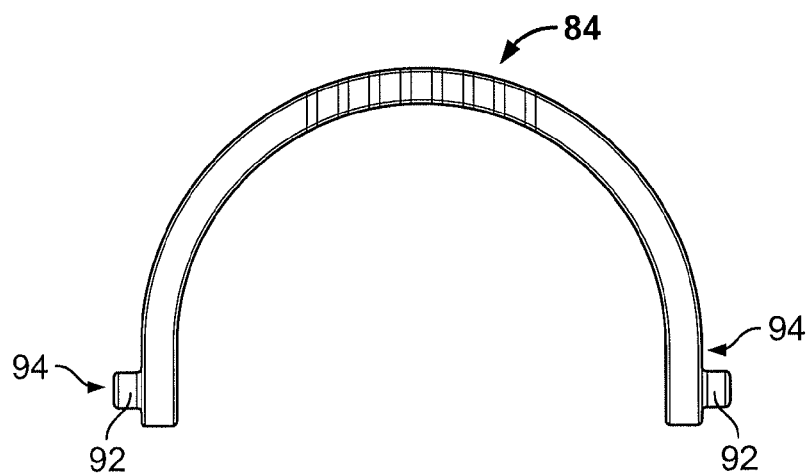
FIG. 36 is a front view of the locking member of FIG. 35.

As shown in FIGS. 35-37, exemplary locking member or locking handle 84 of locking assembly 73 takes the form of a substantially C-shaped or half-circular locking handle, although the present disclosure is not limited thereto. Locking member 84 typically includes a mating member 92 (e.g., a knob or protrusion 92) positioned at or near each outer terminal end 94, with a locking extension member or camming member 93 extending from each terminal end 94.

Locking member 84 also can include grooves 95 or the like to assist in user handling of locking member 84. Locking member 84 typically is fabricated from plastic (e.g., flexible plastic, such as polypropylene or the like). However, it is noted that locking member 84 can be fabricated from a variety of materials.

In general and as shown in FIGS. 14 and 23, each mating member or knob 92 of locking member 84 is configured and dimensioned to be movably and/or rotatably secured within an aperture (or recess) 49 of an arm 83 of first securing member 75 (or within apertures 249 of arms 283 of member 275—discussed below). For example, the terminal ends 94 of locking member 84 can be compressed together so that knobs 92 can be inserted and rotatably secured within apertures 49 of arms 83. In an alternative embodiment, terminal ends 94 of locking member 84 may include an aperture or recess similar to aperture or recess 49 of arms 83, and arms 83 may include a knob or the like similar to knobs 92 of locking member 84. As such, the terminal ends of locking member 84 could similarly be compressed together so that the knobs or the like of arms 83 could be inserted and rotatably secured within apertures/recesses of locking members 84.

Once locking member 84 has been rotatably secured within arms 83, a user is typically free to rotate locking member 84 to a desired user-defined position above first securing member 75 (e.g., a user may rotate locking member 84 about 180° relative to and above upper surface 76 of first securing member 75).

In exemplary embodiments, locking assembly 73 can be releasably secured together by first positioning collar member 72 of supporting assembly 16 on lower surface 78 of first securing member 75 (e.g., either before or after first securing member 75 is positioned within housing 14, as noted above). Next, sealing member 61 of filter member 18 is positioned on intermediate surface 77 of first securing member 75 (again, either before or after first securing member 75 is positioned within housing 14, as noted above). A user could then position second securing member 80 above sealing member 61 so that the lower surface 86 of second securing member 80 was positioned substantially above sealing member 61, and the outer surface 88 and/or gasketing material 43 of second securing member 80 engaged at least a portion of interior section 90 of first securing member. It is noted that in exemplary embodiments, lip portion 87 of second securing member 80 substantially centers and/or positions sealing member 61 and/or a portion of filter member 18 within locking assembly 73 (e.g., on intermediate surface 77 and/or against first securing member 75 and/or against supporting member 16). Additionally, when fluid to be filtered enters filter vessel assembly 10 via open fluid inlet port 22, the lip portion 87 of second securing member 80 advantageously directs fluid flow towards the center of filter member 18.

A user could then rotate the second securing member 80 so that the recessed portions 91 of the second securing member substantially aligned with the recessed portions 55 of first securing member 75. To releasably lock the locking assembly together, a user would then rotate the locking member 84 to the position where the locking extension members 93 were positioned at least partially within the substantially aligned recessed portions 91, 55 of first and second securing members 75, 80, as shown in FIGS. 21-25 (it is noted that filter member 18 has been removed from FIGS. 21-24 for clarity). More particularly and as shown in FIG. 25, once the locking member 84 has been rotated so that the locking extension members 93 are positioned at least partially within the substantially aligned recessed portions 91, 55 of first and second securing members 75, 80, the lower surface 86 is releasably secured against the sealing ring 61 of filter member 18, which is resting on intermediate surface 77 of first securing member 75. It is additionally noted that locking extension member 93 of locking member 84 releasably secures the outer surface 88 and gasketing material 43 of second securing member 80 to the tapered interior surface 90 of first securing member 75. It is noted that gasketing material 43 of second securing member 80 forms a fluid-tight seal (i.e., with the interior surface 90) around the outer periphery of second securing member 80, thereby substantially eliminating fluid flow around the outer edges of the sealing member 61. In this position as shown in FIG. 25, the sealing member 61 of filter member 18 is releasably secured within and/or by locking assembly 73 (e.g., first securing member 75, second securing member 80 and locking member 84), with a substantial portion of the filter member 18 downwardly extending from sealing member 61 being supported/positioned within the interior of supporting assembly 16.

In exemplary embodiments, when the locking member 84 has been rotated so that the locking extension members 93 are positioned at least partially within the substantially aligned recessed portions 91, 55 of first and second securing members 75, 80, substantially a first half of the engaging portion of each locking extension member 93 is positioned above each recessed portion 91, and substantially a second half of the engaging portion of each locking extension member 93 is positioned above each recessed portion 55. Such exemplary configuration ensures a consistent securement of locking assembly 73 (e.g., consistent securement of second securing member 80 to sealing member 61 and/or first securing member 75). However, it is to be noted that it is not required that first securing member 75 include recessed portions 55 and/or that second securing member 80 include recessed portions 91 to releasably secure sealing member 61 of filter member 18 within and/or by locking assembly 73.

As noted above, sealing member 61 of filter member 18 can be releasably secured within and/or by locking assembly 73 before or after first securing member 75 is inserted into housing 14 of filter vessel assembly 10. In the event that sealing member 61 is releasably sealed within locking assembly 73 before first securing member 75 was inserted in housing 14, a user would then position the first securing member 75 within the housing until the outer surface 79 and/or gasketing material 82 of first securing member 75 engages with intermediate surface 15 of housing 14. In exemplary embodiments, gasketing material 82 is utilized as a face seal against intermediate surface 15, as opposed to a piston seal. In general, the interaction of gasketing material 82 as a face seal against intermediate surface 15 is not self-locking (and as discussed further below), with intermediate surface 15 typically extending/tapering/sloping inwardly and/or downwardly towards the center of housing 14 at an angle from about 15° to about 90° (e.g., relative to the central vertical axis of housing 14).

In this regard, the weight of the supporting assembly 16, along with the fluid flow through the assembly 16 and the differential pressure of assembly 10 additively combine to compress the gasketing material 82 against surface 15 while filter vessel assembly is in use. Upon cessation of operation and removal of cover member 12 from open end 20, gasketing material 82 offers substantially little or no resistance to the removal of supporting assembly 16 from housing 14. In contrast, some conventional filtering designs/assemblies utilize a piston seal around the periphery of the supporting assembly or basket, with the housings of these assemblies typically having a slightly tapered body bore. However, the taper of these body bores is generally a function of draft required to accommodate the manufacturing process, and in use, these supporting assemblies/baskets tend to get locked or jammed into the body bore, as under pressure and/or flow, the basket assembly is forced downward further into the tapers of these body bores. Additionally, some piston seals develop a build-up of debris or the like above the piston seals, with such build-up of debris thereby creating resistance to the removal of these basket assemblies from the body bores. However, with the face seals of the present disclosure, it has been found that such debris or the like positioned above the face seals does not create such a resistance (e.g., when removing supporting assembly 16 from housing 14).

After sealing member 61 of filter member 18 is releasably secured within and/or by locking assembly 73 (and after the first securing member 75 is positioned within the housing until the outer surface 79 and/or gasketing material 82 of first securing member 75 engages with intermediate surface 15) the cover member 12 could then be removably secured or positioned on or around open end 20 of housing 14 to fluidically seal housing 14. Assembled filter vessel assembly could then be operated under filtering conditions. More specifically, after cover member 12 is secured on open end 20, fluid could enter filter vessel assembly 10 via the open fluid inlet port 22 discussed above and be forced/filtered through secured filter member 18 positioned/supported within supporting assembly 16. Filtered fluid would then exit filter vessel assembly 10 via the open fluid outlet port 24.

When it is desired/required to remove filter member 18 from filter vessel assembly 10 (and after assembly 10 were de-pressurized and cover member 12 removed), a user would un-secure filter member 18 from locking assembly 73 by first rotating the locking member 84 to a position where the locking extension members 93 were positioned out of recessed portions 55, 91 of first and second securing members 75, 80. A user would then remove second securing member 80 from assembly 73, and then the user would be free to remove filter member 18 from supporting assembly 16 (with supporting assembly 16 being within or outside of housing 14). As noted above, it has been found that in certain situations, movable supporting members 16a, 16b advantageously allow users to expand supporting assembly 16 (e.g., by rotating supporting members 16a and 16b away from one another via fastening members 68a, 68b hingedly rotating about receiving rods 66a, 66b, and then optionally moving the supporting members 16a, 16b laterally with respect to one another) to thereby assist users in the removal or installation of filter member 18 from/to supporting assembly 16. However, it is again to be noted that it is not required that a user expand assembled supporting assembly 16 to remove or install filter member 18 from/to supporting assembly 16. As such, a user would have the choice whether or not to expand assembled supporting assembly 16 for these purposes.

With reference again to FIGS. 33-34, it is noted that alternative second securing member 180 may be utilized in conjunction with first securing member 75 and locking member 84 to releasably secure filter member 18 within housing 14, in lieu of utilizing second securing member 80 as discussed above. In this regard, it is noted that second securing member 180 includes a plurality of recessed portions 191. In general, having multiple recessed portions 191 provides a user with the option of choosing to utilize from several different variations of recessed portions 191. For example, each pair of recessed portions 191 that are positioned about 180° from each other on member 180 could include a differing depth or slope of recessed portion 191. In this regard, a user could then choose to utilize the recessed portions 191 that most closely aligned with the type of sealing member 61 (e.g., sealing members 61 from a large variety of filter bags, where the sealing members 61 had been sewn-in, welded, fusion bonded, molded, adhered, folded, rolled, etc.) that was desired to be secured within and/or by locking assembly 73 (e.g., first securing member 75, second securing member 180, and locking member 84). In other words, if a user rotated the second securing member 180 so that a first pair of recessed portions 191 substantially aligned with the recessed portions 55 of first securing member, the user could then obtain a customized securement of filter member 18 to locking assembly 73. Similarly, if the user later utilized a different filter member 18 that had a different sealing element 61, the user could then rotate the second securing member 180 so that a second pair of recessed portions 191 (e.g., having a different depth or slope of recessed portion 191 as compared to the first pair of recessed portions 191) substantially aligned with the recessed portions 55 of first securing member to obtain the desired securement level of the later-used filter member 18. As such, a user may utilize member 180 to achieve differing levels of securement/compression for different sealing members 61 of a variety of filter bags.

Turning now to FIGS. 38-53, an alternative supporting assembly or basket assembly 216 for use with filter vessel assembly 10 in accordance with embodiments of the present disclosure is shown. The supporting assembly 216 may be structurally and functionally similar to the supporting assembly 16 discussed above with reference to FIGS. 14-25, with some differences. Similar to supporting assembly 16, the supporting assembly 216 includes a first supporting member 216a and a second supporting member 216b. In general, supporting members 216a, 216b are configured and dimensioned to be releasably secured/assembled together to define/form supporting assembly 216 (e.g., substantially cylindrical supporting assembly 216). Similar to supporting assembly 16 as described above, assembled supporting assembly 216 is configured/adapted to be positioned within housing 14 of filter vessel assembly 10 to support and/or position filter member 18 within housing 14.

In one embodiment, supporting members 216a, 216b are substantially similar in dimensions, features and/or design. Each supporting member 216a, 216b typically includes at least one receiving rod or pin 266a or 266b, at least one receiving opening 267a or 267b, and at least one fastening member 268a or 268b, respectively. In an exemplary embodiment and as depicted in FIGS. 38-53, supporting member 216a includes one receiving rod 266a, two receiving openings 267a, and two fastening members 268a. Similarly, supporting member 216b includes one receiving rod 266b, two receiving openings 267b, and two fastening members 268b.

Like supporting assembly 16, supporting members 216a, 216b typically include at least one extending portion 269a or 269b and at least one recessed portion 270a or 270b, respectively. In general, extending portions 269a, 269b and recessed portions 270a, 270b are positioned at or near the lower end of the interior portions of supporting members 216a, 216b. As such, extending portions 269a, 269b extend towards the interior of supporting assembly 216 once assembled, and recessed portions 270a, 270b are recessed away from the center of supporting assembly 16 once assembled. Supporting members 216a, 216b also typically include at least one leg member 271a or 271b, respectively, with each leg member 271a, 271b configured and dimensioned to allow a user to rest assembled supporting assembly 216 on a surface.

In exemplary embodiments and as shown in FIGS. 38-53, supporting members 216a, 216b typically include at least one rib member 221a, 221b, respectively. In one embodiment, supporting member 216a includes four rib members 221a, and supporting member 216b includes four rib members 221b, although the present disclosure is not limited thereto. Rather, supporting members 216a, 216b may include any number of rib members 221a, 221b.

Exemplary rib members 221a, 221b take the form of substantially longitudinal rib members, with each rib member 221a, 221b extending from a position at or near the upper end of supporting members 216a, 216b to a position at or near the lower end of supporting members 216a, 216b. However, it is to be noted that each rib member 221a, 221b need not extend the substantial length of supporting members 216a, 216b. For example, each rib member 221a, 221b may extend from a position at or near the upper end of supporting members 216a, 216b and then terminate at varying positions along the length of supporting members 216a, 216b. In general, each rib member 221a, 221b is positioned at and/or extends from a position at or near the upper end of supporting members 216a, 216b. In exemplary embodiments and as shown in FIGS. 38-53, supporting members 216a, 216b each include a rib member 221a', 221b' that is positioned along a side or outer edge 219a, 219b of supporting members 216a, 216b, where each rib member 221a', 221b' typically extends inwardly (e.g., in the direction of extending portions 269a, 269b) a distance past or beyond the interior surface of side or outer edge 219a, 219b of supporting members 216a, 216b.

The releasable securement of supporting members 216a, 216b together to form assembled supporting assembly 216 is described in part with reference to FIGS. 38-44, which depict an exemplary embodiment of a supporting assembly 216 for use with filter vessel assembly 10. Firstly, supporting members 216a, 216b can be positioned next to one another as shown in FIGS. 38-39. In this position, it is noted that the bottom surface of supporting member 216b is angled (e.g., from about 10° to about 90°, preferably about 45°) relative to the bottom surface of supporting member 216a.

Supporting members 216a, 216b would then be positioned/moved adjacent one another as shown in FIGS. 40-41. In this position, it is noted that the two fastening members 268b of supporting member 216b are positioned above the two receiving openings 267a of supporting member 216a. Similarly, the two fastening members 268a of supporting member 216a are positioned above the two receiving openings 267b of supporting member 216b.

Next, the two fastening members 268b of supporting member 216b would be rotated toward the two receiving openings 267a of supporting member 216a (and/or the two fastening members 268a of supporting member 216a would be rotated toward the two receiving openings 267b of supporting member 216b) so that supporting members 216a, 216b would be positioned as shown in FIGS. 42-43. As such, at least a portion of each fastening member 268b of supporting member 216b would be positioned around receiving rod 266a and within a receiving opening 267a of supporting member 216a, and at least a portion of each fastening member 268a of supporting member 216a would be positioned around receiving rod 266b and within a receiving opening 267b of supporting member 216b.

A user would then rotate supporting members 216a, 216b towards one another (e.g., with member 216a moving in the general direction of Arrow A of FIG. 42 and/or with member 216b moving in the general direction of Arrow B of FIG. 42) via fastening members 268a, 268b hingedly rotating about receiving rods 266a, 266b to form the releasably (e.g., hingedly) assembled supporting assembly 216 as depicted in FIGS. 44-53. In one embodiment and in the assembled position (FIG. 44), each rib member 221a, 221a', 221b and/or 221b' is positioned/spaced substantially equidistantly apart from each adjacent rib member 221a, 221a', 221b and/or 221b' around assembled supporting assembly 216.

In the assembled position (FIG. 44), it is noted that at least a portion of extending portion 269a of supporting member 216a is releasably received within recessed portion 270b of supporting assembly 216b, and at least a portion of extending portion 269b of supporting member 216b is releasably received within recessed portion 270a of supporting assembly 216a. Such receipt of extending portions 269a, 269b within recessed portions 270a, 270b substantially prevents relative motion between supporting members 216a, 216b in the general lateral directions of Arrow C and/or Arrow D of FIG. 44 when supporting assembly 216 is in the assembled position as depicted in FIG. 44.

Figure 44:
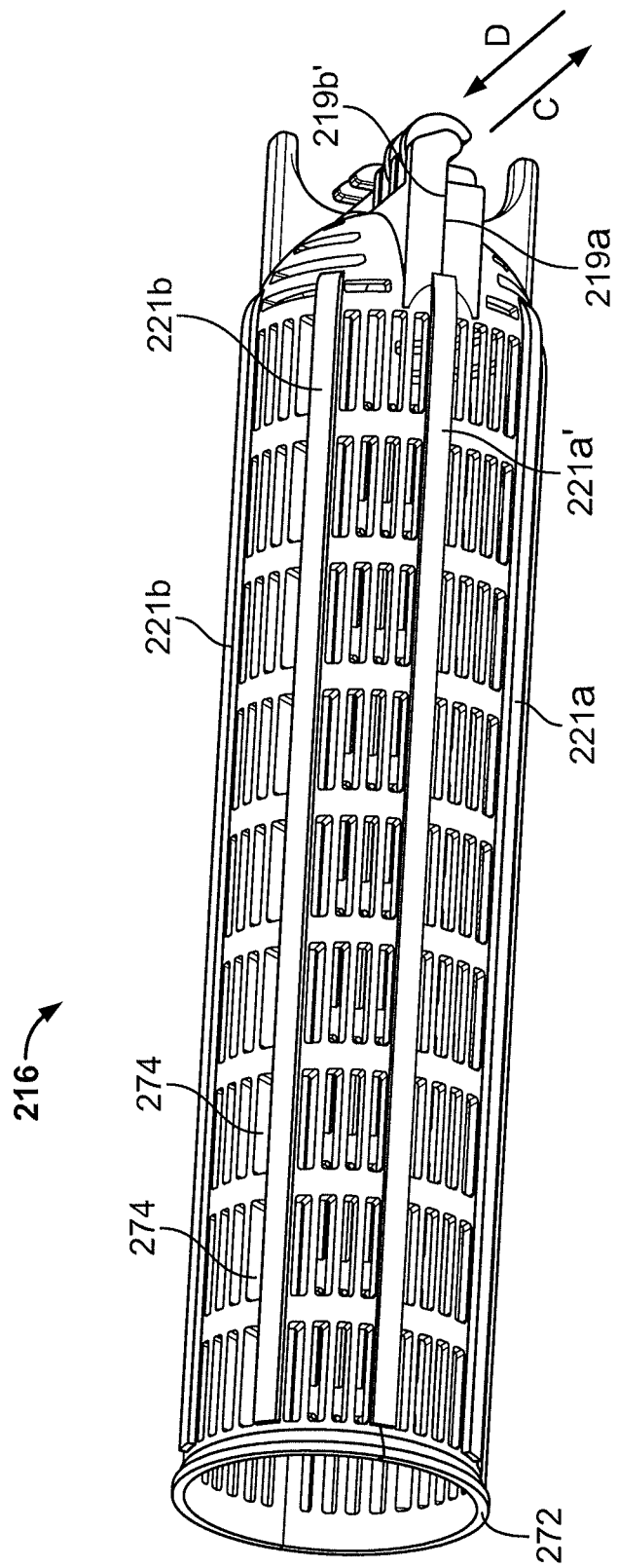
FIG. 44 is a side perspective view of the supporting assembly of FIG. 38.

Moreover, when supporting assembly 216 includes rib member 221a' and/or 221b', the extension of rib member 221a' and/or 221b' past or beyond the interior surface of side or outer edge 219a and/or 219b of supporting members 216a, 216b also prevents relative motion between supporting members 216a, 216b in the general lateral directions of Arrow C and/or Arrow D of FIG. 44 when supporting assembly 216 is in the assembled position. For example, in the assembled position (FIG. 44), rib member 221a' extends past the interior surface of side edge 219a to a position past the side edge 219b' of member 216b (FIG. 39). Similarly, in the assembled position, rib member 221b' extends past the interior surface of side edge 219b to a position past the side edge 219a' of member 216a. Such positioning and/or engagement of ribs 221a', 221b' with edges 219a/219b' and/or 219b/219a' thereby prevents relative motion between supporting members 216a, 216b in the general lateral directions of Arrow C and/or Arrow D of FIG. 44 when supporting assembly 216 is in the assembled position.

As such, to expand or disassemble the hingedly assembled supporting assembly 216, a user would first need to rotate supporting members 216a and 216b away from one another (e.g., with member 216a moving in the direction generally opposite of Arrow A of FIG. 42 and/or with member 216b moving in the direction generally opposite of Arrow B of FIG. 42) via fastening members 268a, 268b hingedly rotating about receiving rods 266a, 266b. In order to allow a user to move the supporting members 216a, 216b in the general lateral directions of Arrow C and/or Arrow D of FIG. 44, a user first would be required to rotate supporting members 216a and 216b away from one another so that extending portions 269a, 269b were not received within recessed portions 270a, 270b, and/or so that the positioning of ribs 221a', 221b' with edges 219a/219b' and/or 219b/219a' would not prevent relative motion between supporting members 216a, 216b.

Such movement is required by a user to disassemble supporting members 216a, 216h apart from one another once the supporting members 216a, 216b had been rotated away from each other the required distance. Similar to supporting assembly 16, it has been found that in certain situations, movable supporting members 216a, 216b advantageously allow users to expand supporting assembly 216

(e.g., by rotating supporting members 216a and 216b away from one another via fastening members 268a, 268b hingedly rotating about receiving rods 266a, 266b) to thereby assist users in the removal or installation of filter member 18 from/to supporting assembly 216. However, it is again to be noted that it is not required that a user expand assembled supporting assembly 216 to remove or install filter member 18 from/to supporting assembly 216. Thus, a user would have the choice whether or not to expand assembled supporting assembly 216 for these purposes. It is also to be noted (similar to assembly 16) that complete disassembly of assembled supporting assembly 216 may not be intuitive to a user, which thereby lessens the likelihood that the supporting assembly 216 would be completely disassembled by a user (e.g., in the field).

In exemplary embodiments and as shown in FIGS. 44-45, assembled supporting assembly 216 typically includes an outwardly extending collar member 272 or the like (e.g., similar to collar member 72 of assembly 16). In general, collar member 272 extends, tapers or slopes outwardly from the upper open end 273 of supporting assembly 216. In one embodiment, collar member 272 defines a substantially annular (e.g., ring-like) collar member 272 that extends outwardly from and around the circumference of upper open end 273 of supporting assembly 216. Supporting assembly 216 typically also includes a plurality of slots, apertures or openings 274 that are configured and dimensioned to allow filtered fluid to pass through the supporting assembly 216 and to fluid outlet port 24 after the filtered fluid has passed through filter member 18 housed/positioned within the interior of supporting assembly 216.

As noted above, filter vessel assembly 10 typically includes locking assembly 73. In alternative embodiments of the present disclosure, it is noted that first securing member 275 (FIGS. 46-57) may be utilized in lieu of first securing member 75. In other words, locking assembly 73 can include first securing member 275, second securing member 80 (or member 180), and locking member or locking handle 84 to releasably secure a filter member 18 (e.g., filter bag) within housing 14.

Similar to member 75, first securing member 275 of locking assembly 73 is configured/adapted to releasably secure and/or position supporting assembly 216 within housing 14. Once first securing member 275 has releasably secured/positioned supporting assembly 216 within housing 14, second securing member 80 and locking member 84 are configured and dimensioned to releasably secure a filter member 18 (e.g., filter bag) within housing 14, with a substantial portion of the filter member 18 being disposed within the interior of supporting assembly 216.

Turning now to FIGS. 54-57, first securing member 275 is structurally and functionally similar to member 75 discussed above, with some differences. Similar to member 75, first securing member 275 takes the form of a substantially ring-like, hollow basket member. First securing member 275 includes an upper surface 276 (e.g., upper annular surface), an intermediate surface 277 (e.g., intermediate annular surface) and a lower surface 278 (e.g., lower annular surface) that tapers/slopes inwardly (e.g., toward the center of housing 14). The outer surface 279 of first securing member 275 also typically tapers/slopes inwardly, with the outer surface 279 including a groove 281 that is configured and dimensioned to at least partially house or contain a gasketing material 82. The interior surface 290 between intermediate surface 277 and upper surface 276 of first securing member 275 typically tapers/slopes inwardly. First securing member 275 typically includes two retaining arms or post members 283, with each post member 283 having an aperture 249 therethrough.

Upper annular surface 276 typically includes at least one recessed portion or depression 255 (e.g., downwardly sloping recessed portion/surface). In exemplary embodiments, upper annular surface 276 includes two recessed portions 255, with one recessed portion 255 being disposed/positioned substantially adjacent each post member 283.

In general, first securing member 275 includes two notches 211 in upper annular surface 276, with each notch typically being positioned about 90° from each post member 283 and/or recessed portion 255. It is to be noted that member 275 can include any number of notches 211 (e.g., one, a plurality, etc.) that are positioned at various positions on member 275. In exemplary embodiments, when first securing member 275 is utilized in conjunction with second securing member 80' (described above with respect to FIG. 30A), the notches 211 of member 275 assist users in properly aligning member 80' with respect to member 275. For example, notches 211 typically are configured and dimensioned to allow a user to place or position at least a portion of a protuberance 17' in each notch 211 so that each recessed portion 91' of second securing member 80' substantially aligns with a recessed portion 255 of first securing member 275.

As shown in FIGS. 54-57, exemplary first securing member 275 typically also includes at least one locking notch or slot 239 in lower surface 278. First securing member 275 can include a plurality of locking notches 239. For example and as shown in FIGS. 54-57, member 275 includes eight locking notches 239 that are spaced apart from one another. In one embodiment, each locking notch 239 is positioned/spaced substantially equidistantly apart from each adjacent locking notch 239 around lower annular surface 278.

In general, first securing member 275 is configured and dimensioned to be releasably secured and/or positioned with respect to assembled supporting assembly 216 (and with respect to other alternative supporting assemblies disclosed/discussed above/below). In this regard, first securing member 275 is typically first positioned beneath the lower end 259 (FIG. 45) of assembled supporting assembly 216 so that each rib member 221a, 221a', 221b and/or 221b' of assembly 216 was substantially aligned with a locking notch 239 of member 275.

A user would then move the lower end 259 of assembly 216 through the central opening 257 of first securing member 275 and move/position the first securing member 275 towards the upper end of the assembly 216 (with at least a portion of each rib member 221a, 221a', 221b and/or 221b' moving/traveling within at least a portion of its respectively aligned locking notch 239) until at least a portion of the collar member 272 of the assembly 216 engaged (e.g., frictionally engaged) and/or rested upon at least a portion of the lower surface 278 of first securing member 275 (FIGS. 46-49). It is noted that at least a portion of each rib member 221a, 221a', 221b and/or 221b' is housed or positioned within at least a portion of its respectively aligned locking notch 239 when member 275 is moved towards the upper end of assembly 216. Once the member 275 has reached a position where each locking notch 239 were positioned above the upper end of its respectively aligned rib member 221a, 221a', 221b and/or 221b'(e.g., when the collar member 272 of the assembly 216 engaged and/or rested upon at least a portion of the lower surface 278-FIGS. 46-49), a user could then rotate the member 275 either clockwise or counter-clockwise to a position where at least a portion of lower side 245 of lower surface 278 of member 275 would rest upon at least a portion of the upper end of rib members 221a, 221a', 221b and/or 221b' (FIGS. 50-53). In this regard, first securing member 275 can be advantageously releasably secured to supporting assembly 216. As such, such releasable securement of member 275 to assembly 216 prevents the member 275 from sliding down assembly 216 until desired (e.g., in the event that the assembly 216 is placed in a free-standing condition on leg members 271a, 271b).

In an alternative embodiment, the upper ends of each rib member 221a, 221a', 221b and/or 221b' may include a ramped or caroming surface, and/or each locking notch 239 may include a ramped or ramming surface. As such, when member 275 is rotated at or near the upper ends of rib members 221a, 221a', 221b and/or 221b' (e.g., either clockwise or counter-clockwise), the upper surface (e.g., the ramped or un-ramped upper surface) of each rib member 221a, 221a', 221b and/or 221b' would engage (e.g., frictionally engage) a corresponding locking notch 239 (e.g., ramped or un-ramped locking notch 239) to thereby releasably secure member 275 to supporting assembly 216.

To unsecure member 275 from assembly 216, a user would then rotate member 275 (e.g., either clockwise or counter-clockwise) until each locking notch 239 were positioned above the upper end of a respectively aligned rib member 221a, 221a', 221b and/or 221b', and then slide/move the member 275 towards the lower end 259 of assembly 216 to reach the position depicted in FIG. 45.

In general, first securing member 275 with supporting assembly 216 positioned thereon and/or releasably secured therewith could then have a filter member 18 (e.g., filter bag) releasably secured thereto via interaction between second securing member 80 (or member 80' or 180), locking member 84, filter member 18 (e.g., sealing member 61 of filter member 18) and first securing member 275 as explained and described above in relation to assembly 16 and member 75 (see, e.g., FIG. 25). In other words and as similarly described above, with respect to first securing member 275 with supporting assembly 216 positioned thereon and/or releasably secured therewith, a user could then position and/or rest the sealing member 61 of filter member 18 on intermediate surface 277 of first securing member 275, with a substantial portion of the filter member 18 that downwardly extends from sealing member 61 being supported/positioned within the interior of supporting assembly 216. A user could then position the first securing member 275 with supporting assembly 216 and filter member 261 positioned thereon within housing 14 of filter vessel assembly 10, as further discussed above (e.g., before or after second securing member 80 and/or locking member 84 are positioned and/or engaged in locking assembly 73).

As noted above with respect to member 75, when supporting assembly 216 is positioned in housing 14, each inner protrusion 60 of housing 14 helps to facilitate the alignment (e.g., substantially central alignment) of supporting assembly 216 within housing 14 during assembly/insertion of supporting assembly 216 within housing 14.

With reference again to FIGS. 8-9, the interior of housing 14 typically includes an intermediate surface 15 that tapers/slopes inwardly toward the center of housing 14. When first securing member 275 is inserted into open end 20 of housing 14, the first securing member 275 will travel downward within housing 14 until the outer surface 279 and/or gasketing material 82 of first securing member 275 engages with intermediate surface 15 of housing 14. It is to be noted that first securing member 275 typically is inserted into housing 14 after supporting assembly 16 is positioned on member 275 and/or releasably secured therewith, and after locking assembly 73 is releasably secured together to releasably secure filter bag 18 to locking assembly 73 (as discussed above), but the present disclosure is not limited thereto. For example, first securing member 275 with supporting assembly 216 and filter bag 18 positioned thereon may first be inserted into housing 14, and then locking assembly 73 may then be releasably secured together to releasably secure filter bag 18 to locking assembly 73.

As similarly noted above, locking assembly 73 (e.g., member 275, member 80 and locking member 84) can be releasably secured together by first positioning collar member 272 of supporting assembly 216 on lower surface 278 of first securing member 275 (and potentially rotating member 275 to releasably secure member 275 to assembly 216 as noted above with respect to FIGS. 45-53). Next, sealing member 61 of filter member 18 is positioned on intermediate surface 277 of first securing member 275. A user could then position second securing member 80 above sealing member 61 so that the lower surface 86 of second securing member 80 was positioned substantially above sealing member 61, and the outer surface 88 and/or gasketing material 43 of second securing member 80 engaged at least a portion of interior section 290 of first securing member.

A user could then rotate the second securing member 80 so that the recessed portions 91 of the second securing member substantially aligned with the recessed portions 255 of first securing member 275. To releasably lock the locking assembly together, a user would then rotate the locking member 84 to the position where the locking extension members 93 were positioned at least partially within the substantially aligned recessed portions 91, 255 of first and second securing members 275, 80. Once the locking member 84 has been rotated so that the locking extension members 93 are positioned at least partially within the substantially aligned recessed portions 91, 255 of first and second securing members 275, 80, the lower surface 86 is releasably secured against the sealing ring 61 of filter member 18, which is resting on intermediate surface 277 of first securing member 275. It is additionally noted that locking extension member 93 of locking member 84 releasably secures the outer surface 88 and gasketing material 43 of second securing member 80 to the tapered interior surface 290 of first securing member 275. In this position, the sealing member 61 of filter member 18 is releasably secured within and/or by locking assembly 73 (e.g., first securing member 275, second securing member 80 and locking member 84), with a substantial portion of the filter member 18 downwardly extending from sealing member 61 being supported/positioned within the interior of supporting assembly 216. However, similar to member 75, it is to be noted that it is not required that first securing member 275 include recessed portions 255 and/or that second securing member 80 include recessed portions 91 to releasably secure sealing member 61 of filter member 18 within and/or by locking assembly 73.

In general, a user would then position the first securing member 275 within the housing 14 until the outer surface 279 and/or gasketing material 82 of first securing member 275 engages with intermediate surface 15 of housing 14. The cover member 12 could then be removably secured or positioned on or around open end 20 of housing 14 to fluidically seal housing 14. Assembled filter vessel assembly 10 could then be operated under filtering conditions. More specifically, after cover member 12 is secured on open end 20, fluid could enter filter vessel assembly 10 via the open fluid inlet port 22 and be forced/filtered through secured filter member 18 positioned/supported within supporting assembly 216. Filtered fluid would then exit filter vessel assembly 10 via the open fluid outlet port 24.

When it is desired/required to remove filter member 18 from filter vessel assembly 10 (and after assembly 10 were de-pressurized and cover member 12 removed), a user would un-secure filter member 18 from locking assembly 73 by first rotating the locking member 84 to a position where the locking extension members 93 were positioned out of recessed portions 255, 91 of first and second securing members 275, 80. A user would then remove second securing member 80 from assembly 73, and then the user would be free to remove filter member 18 from supporting assembly 216. As noted above, it has been found that in certain situations, movable supporting members 216a, 216b advantageously allow users to expand supporting assembly 216 (e.g., by rotating supporting members 216a and 216b away from one another via fastening members 268a, 268b hingedly rotating about receiving rods 266a, 266b, and then optionally moving the supporting members 216a, 216b laterally with respect to one another) to thereby assist users in the removal or installation of filter member 18 from/to supporting assembly 216. However, it is again to be noted that it is not required that a user expand assembled supporting assembly 216 to remove or install filter member 18 from/to supporting assembly 216. As such, a user would have the choice whether or not to expand assembled supporting assembly 216 for these purposes.

Figure 58:
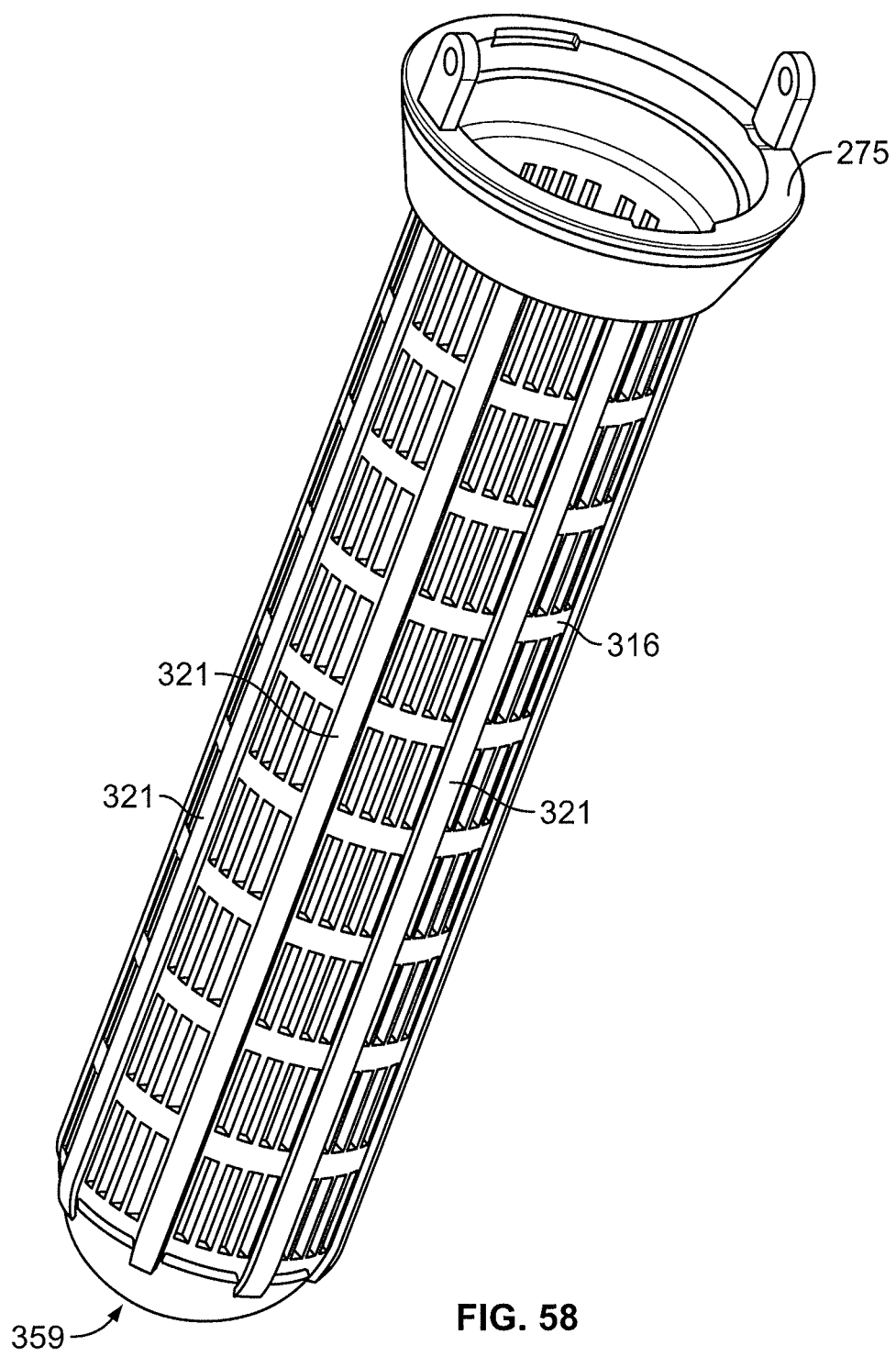
FIG. 58 is a side perspective view of a supporting assembly and a first securing member for a filter vessel assembly in accordance with another exemplary embodiment of the present disclosure.
Figure 59:
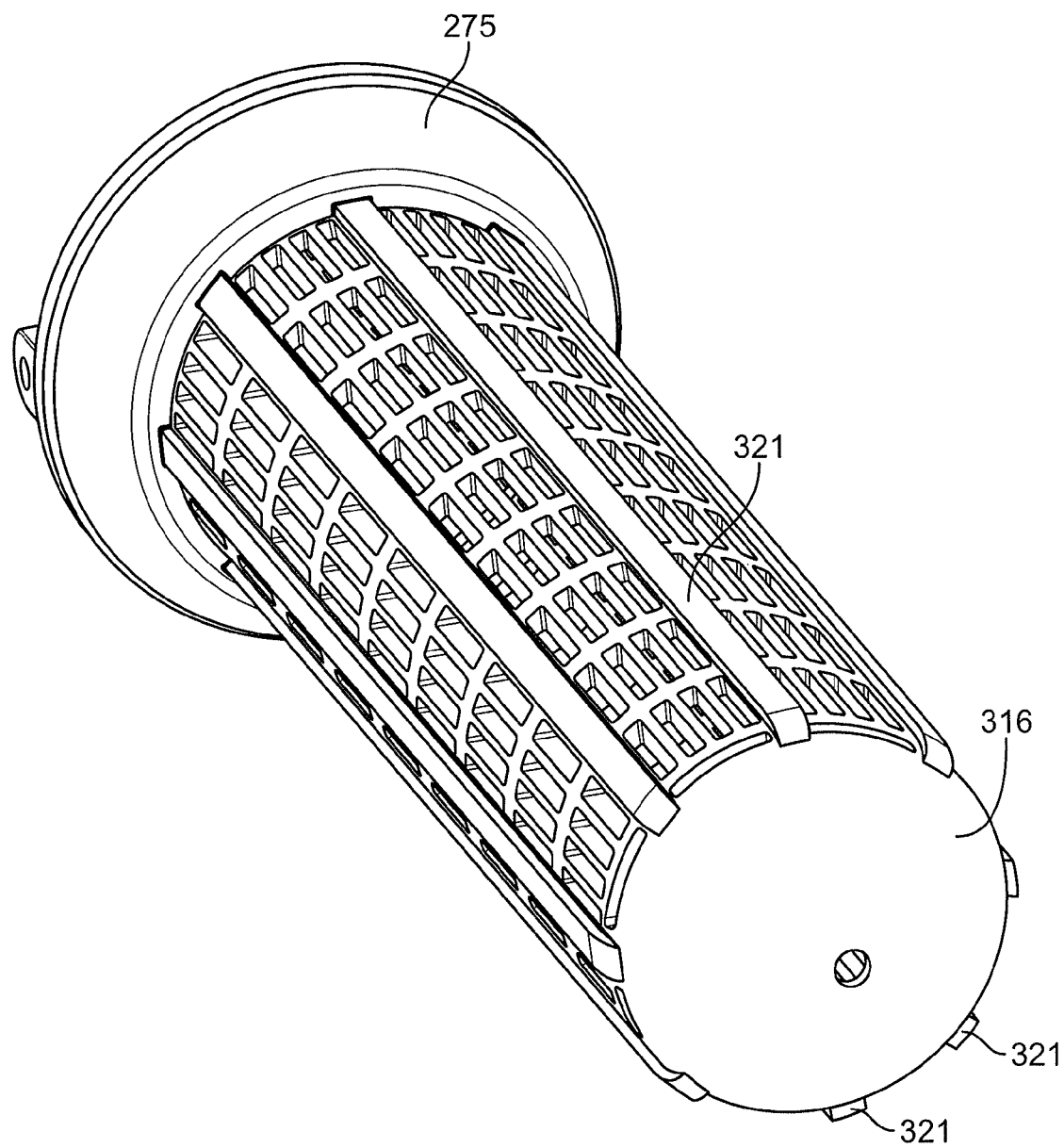
FIG. 59 is a bottom perspective view of the supporting assembly and first securing member of FIG. 58.
Figure 60:
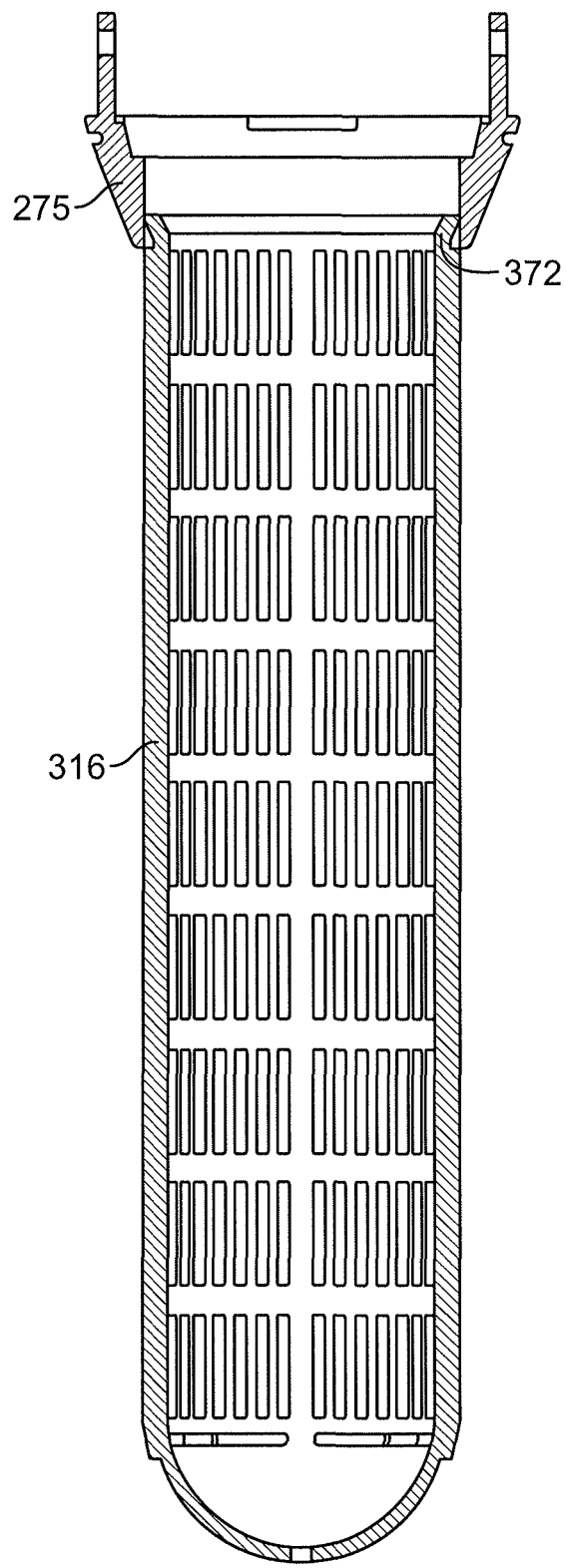
FIG. 60 is a side cross-sectional view of the supporting assembly and first securing member of FIG. 58.

Turning now to FIGS. 58-60, an alternative supporting assembly or basket assembly 316 for use with filter vessel assembly 10 in accordance with embodiments of the present disclosure is shown. The supporting assembly 316 may be structurally and functionally similar to the supporting assembly 16 and/or 216 as discussed above, with some differences. Unlike supporting assembly 216, the supporting assembly 316 does not include first and second supporting members that are configured and dimensioned to be releasably secured/assembled together. Rather, supporting assembly 316 is a one-piece assembly. Similar to supporting assemblies 16 and 216 as described above, supporting assembly 316 is configured/adapted to be positioned within housing 14 of filter vessel assembly 10 to support and/or position filter member 18 within housing 14 (e.g., via locking assembly 73).

Similar to assembly 216, supporting assembly 316 typically includes at least one rib member 321. In one embodiment, supporting assembly 316 includes eight rib members 321, although the present disclosure is not limited thereto. Rather, supporting assembly 316 may include any number of rib members 321. In an exemplary embodiment, the eight rib members 321 are positioned/spaced substantially equidistantly apart from each adjacent rib member 321 around supporting assembly 316.

Figure 61:
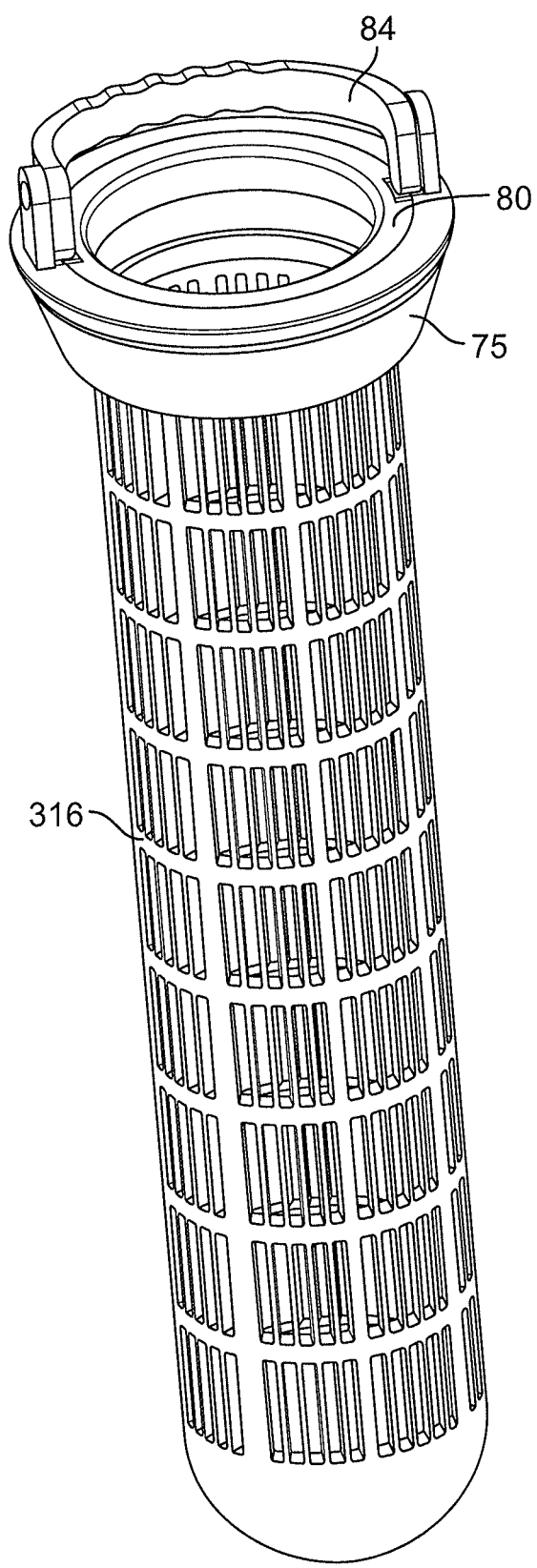

However, it is to be noted that supporting assembly 316 need not include rib members 321, and may be utilized primarily in conjunction with first securing member 75 of locking assembly 73 of filter vessel assembly 10, as shown in FIGS. 61-62. In other words, in this embodiment, single-piece supporting assembly 316 without rib members 321 would typically be utilized in conjunction with member 75, member 80 and locking member 84 to releasably secure filter bag 18 to locking assembly 73 within housing 14 of filter vessel assembly 10 for filtering purposes, as explained and described above with respect to assembly 16.

Returning again to FIGS. 58-60, exemplary rib members 321 take the form of substantially longitudinal rib members, with each rib member 321 extending from a position at or near the upper end of assembly 316 to a position at or near the lower end of assembly 316. However, it is to be noted that each rib member 321 need not extend the substantial length of assembly 316. In general, each rib member 321 is positioned at and/or extends from a position at or near the upper end of assembly 316.

In exemplary embodiments and as shown in FIG. 60, supporting assembly 316 typically includes a plurality of slots, apertures or openings 374 that are configured and dimensioned to allow filtered fluid to pass through the supporting assembly 316 and to fluid outlet port 24 after the filtered fluid has passed through filter member 18 housed/positioned within the interior of supporting assembly 316. In general, supporting assembly 316 typically includes an outwardly extending collar member 372 or the like (e.g., similar to collar member 72 of assembly 16, or collar member 272 of assembly 216). In general, collar member 372 extends, tapers or slopes outwardly from the upper open end 373 of supporting assembly 316.

In an alternative embodiment and as shown in FIG. 63, supporting assembly 316' includes an outwardly extending, substantially annular or ring-like section 372' that is integrally molded, fabricated or mounted with respect to first securing portion/member 275'. In this embodiment, it is noted that first securing portion/member 275' is otherwise structurally and functionally similar to first securing member 275, and supporting assembly 316' is structurally and functionally similar to assembly 316 as described above and below. In other words, in this embodiment, single-piece supporting assembly 316' with integral securing member 275' would typically be utilized in conjunction with member 80 (or member 80' or 180) and locking member 84 to releasably secure filter bag 18 to locking assembly 73 within housing 14 of filter vessel assembly 10 for filtering purposes, as similarly explained and described above.

Returning again to FIGS. 58-60, first securing member 275 of locking assembly 73 is generally configured/adapted to releasably secure and/or position supporting assembly 316 within housing 14. As such, supporting assembly 316 and member 275 would typically be utilized in conjunction with member 80 (or member 80' or 180) and locking member 84 to releasably secure filter bag 18 to locking assembly 73 within housing 14 of filter vessel assembly 10 for filtering purposes, as described above.

Similar to the interaction between member 275 and assembly 216 described above, first securing member 275 is configured/dimensioned to be releasably secured and/or positioned with respect to supporting assembly 316. In this regard, first securing member 275 is typically first positioned beneath the lower end 359 of assembled supporting assembly 316 so that each rib member 321 of assembly 316 was substantially aligned with a locking notch 239 of member 275.

As similarly described above with respect to assembly 216, a user would then typically move the lower end 359 of assembly 316 through the central opening 257 of first securing member 275 and move/position the first securing member 275 towards the upper end of the assembly 316 (with at least a portion of each rib member 321 moving/traveling within at least a portion of its respectively aligned locking notch 239) until at least a portion of the collar member 372 of the assembly 316 engaged and/or rested upon at least a portion of the lower surface 278 of first securing member 275. Once the member 275 has reached a position where each locking notch 239 were positioned above the upper end of its respectively aligned rib member 321, a user could then rotate the member 275 either clockwise or counter-clockwise to a position where at least a portion of lower side 245 of lower surface 278 of member 275 would rest upon at least a portion of the upper end of rib members 321. In this regard, first securing member 275 can be advantageously releasably secured to supporting assembly 316.

In general, first securing member 275 with supporting assembly 316 positioned thereon and/or releasably secured therewith could then have a filter member 18 (e.g., filter bag) releasably secured thereto via interaction between second securing member 80 (or member 80' or 180), locking member 84, filter member 18 (e.g., sealing member 61 of filter member 18) and first securing member 275 as explained and described above.

Figure 64:
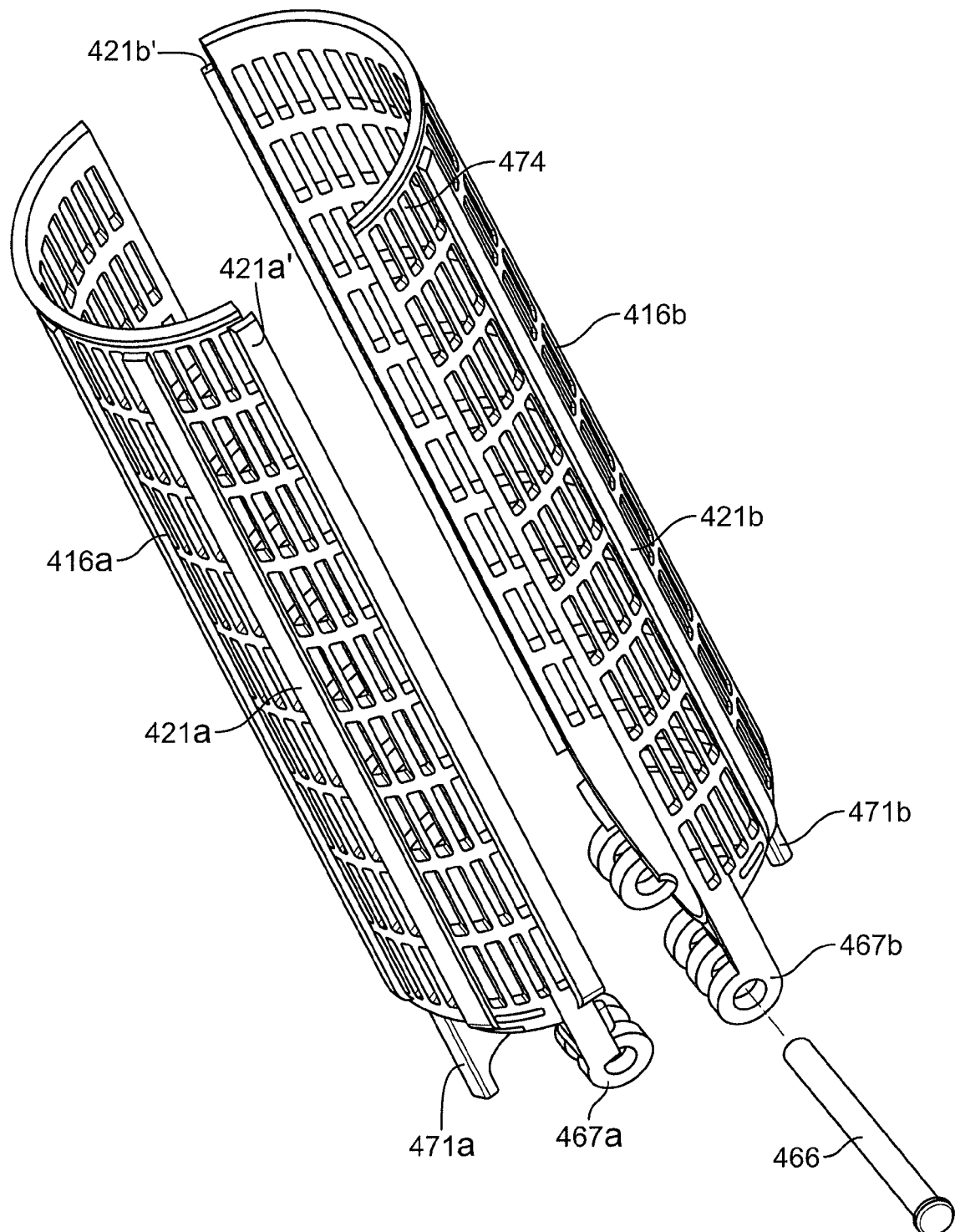
FIGS. 64-66 are side perspective views of a supporting assembly for a filter vessel assembly in accordance with another exemplary embodiment of the present disclosure.
Figure 65:
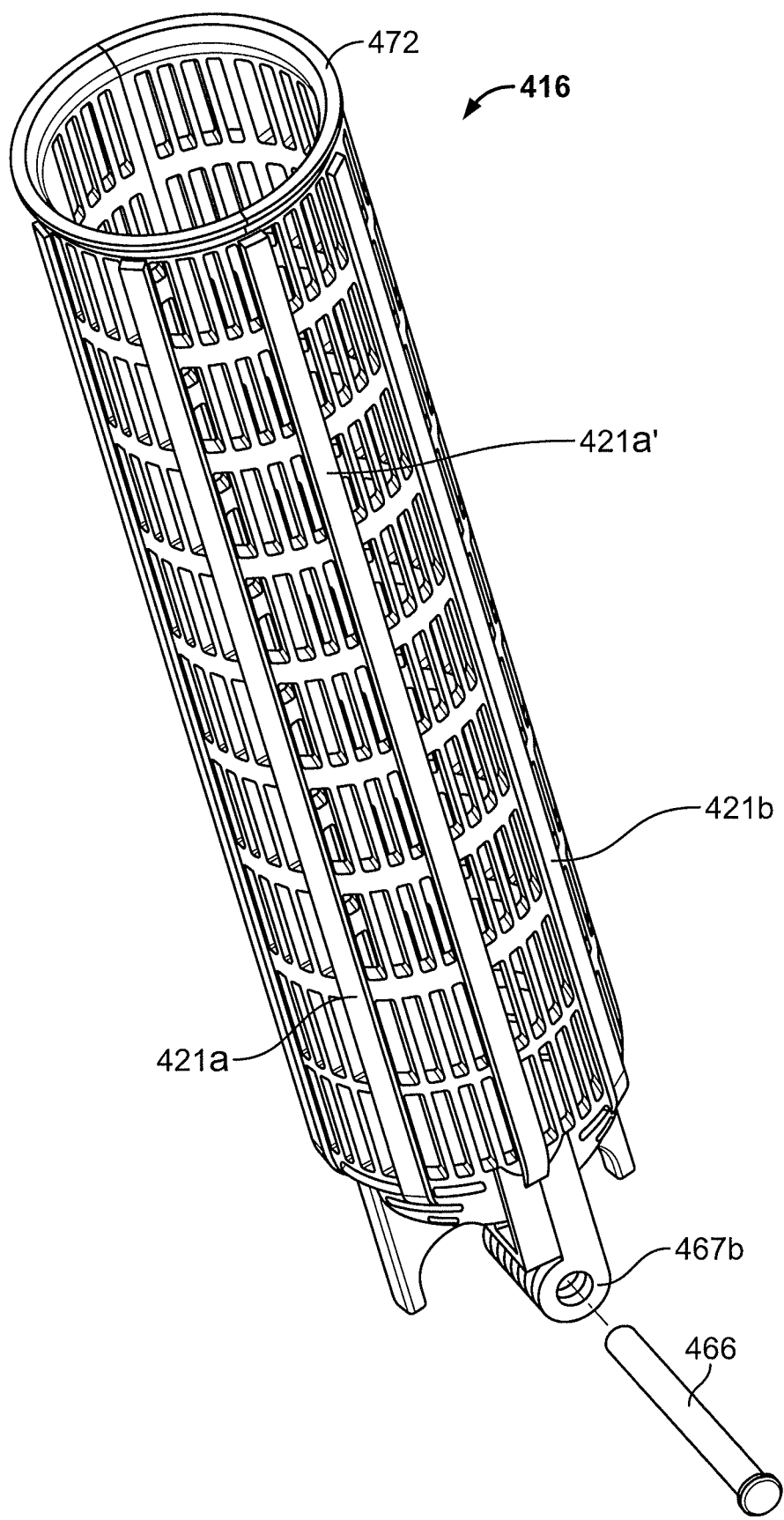
Figure 66:
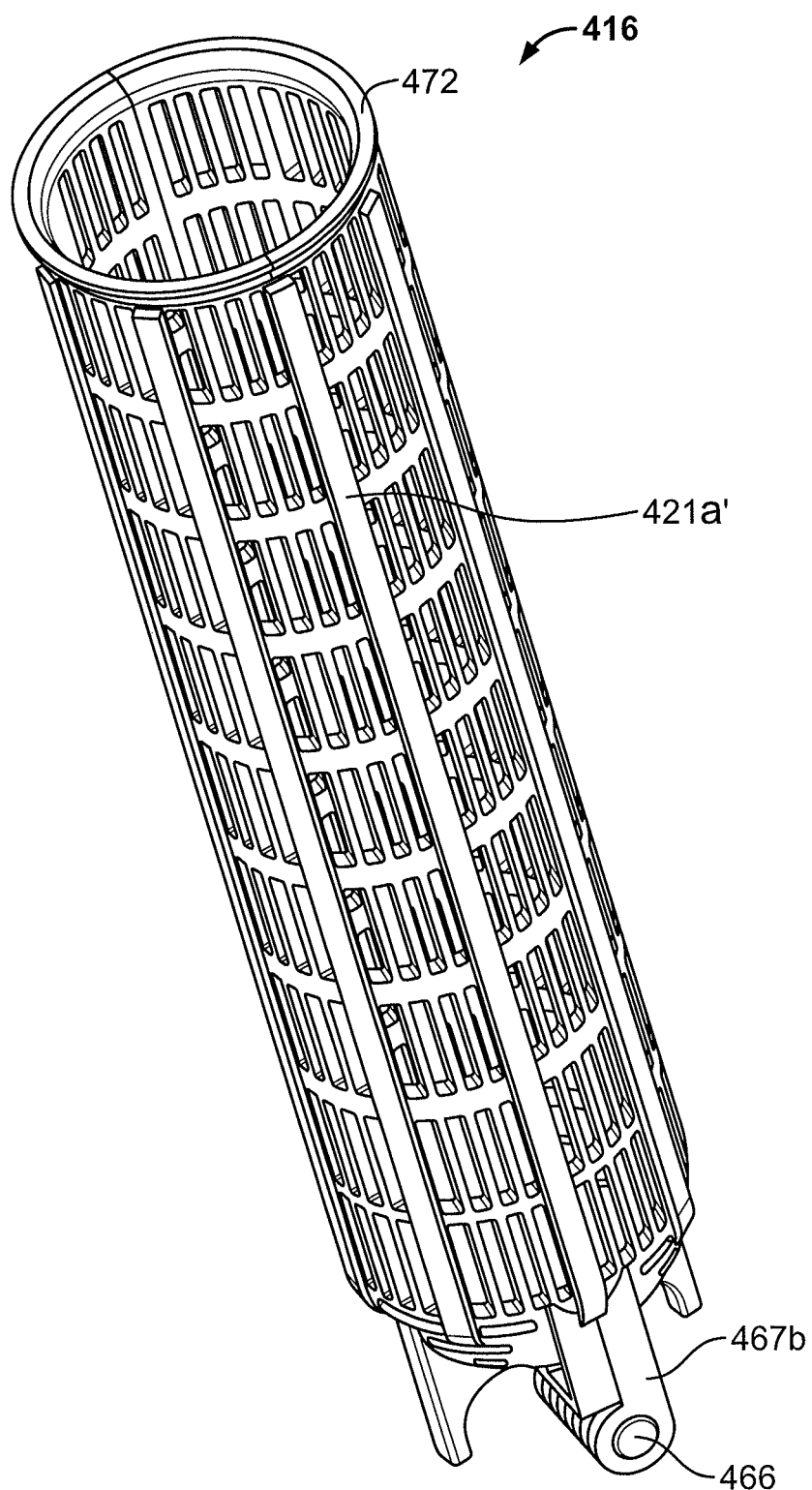
Figure 67:
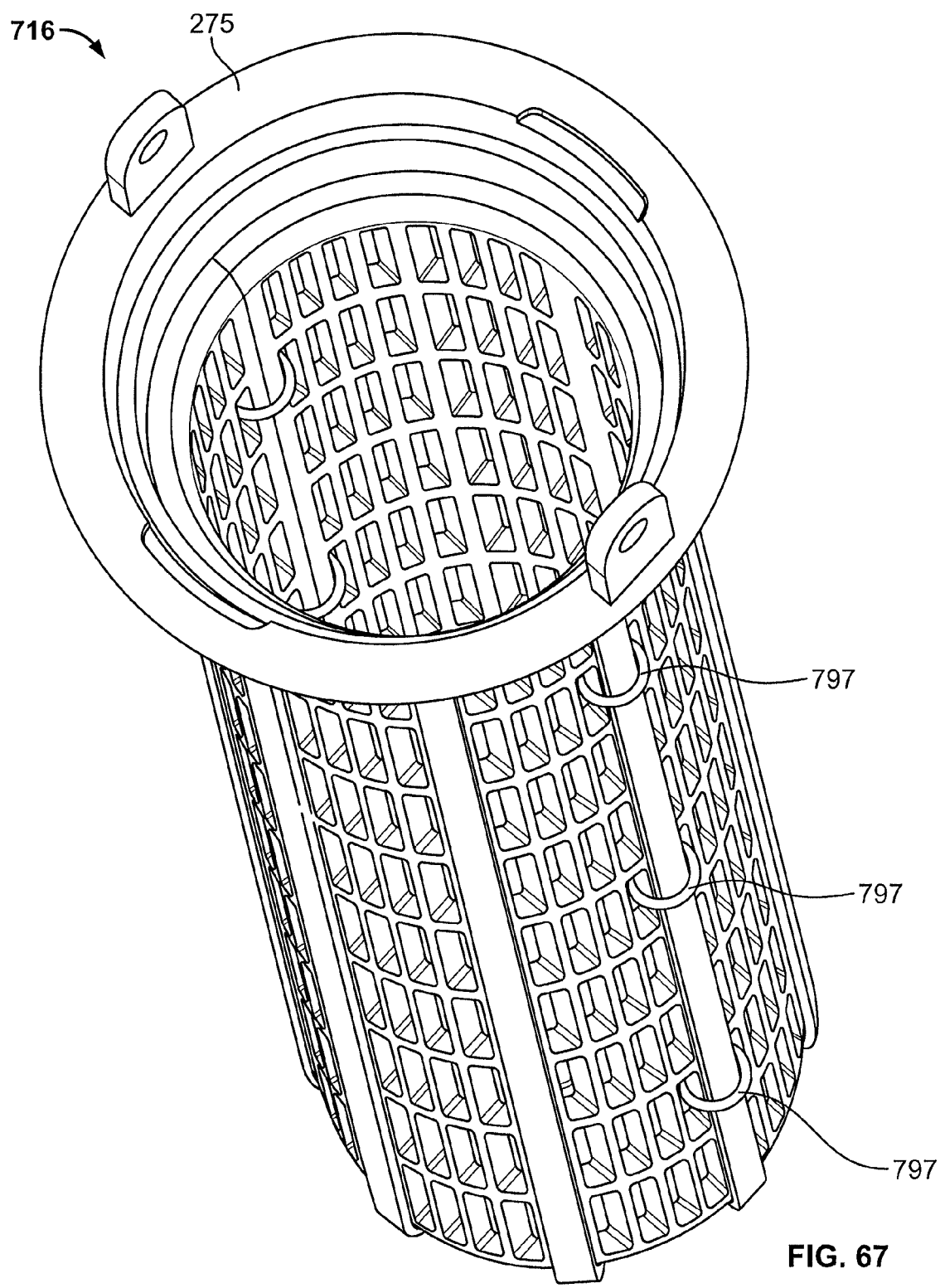
FIG. 67 is a top perspective view of a supporting assembly and a first securing member for a filter vessel assembly in accordance with another exemplary embodiment of the present disclosure.
Figure 68:
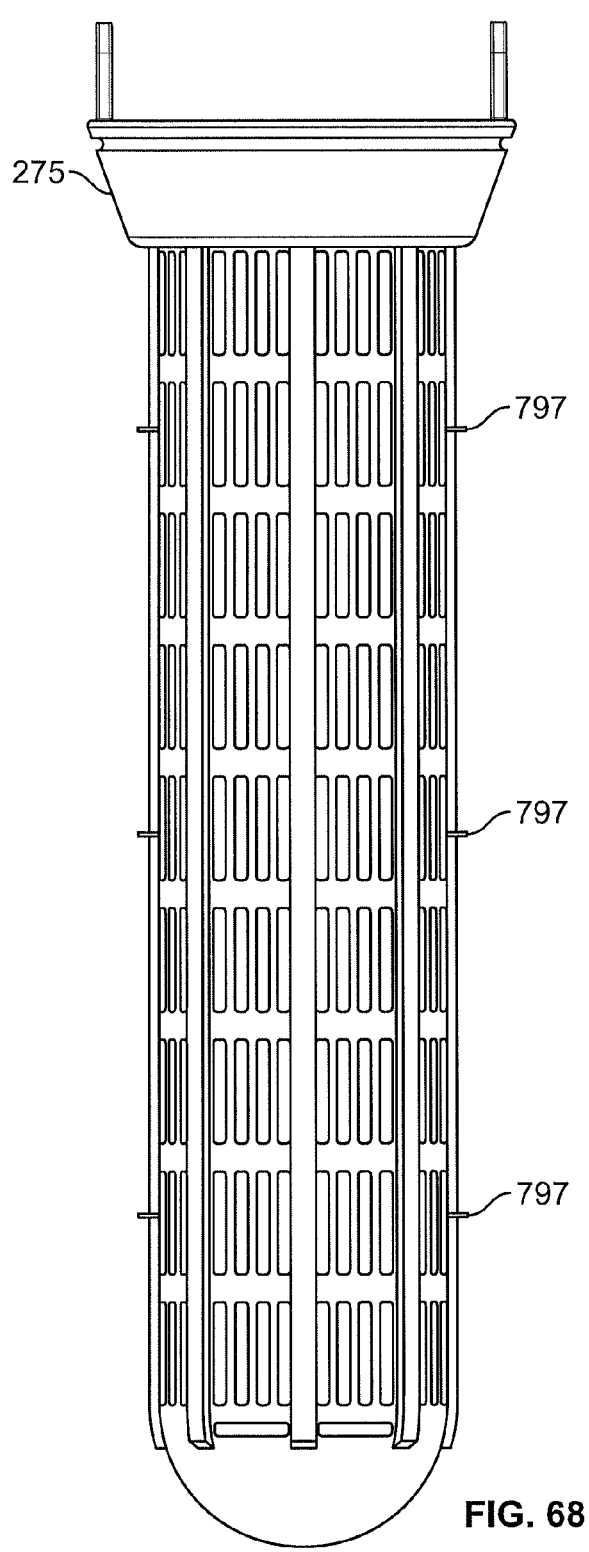
FIGS. 68-69 are side views of the supporting assembly and first securing member of FIG. 67.
Figure 69:
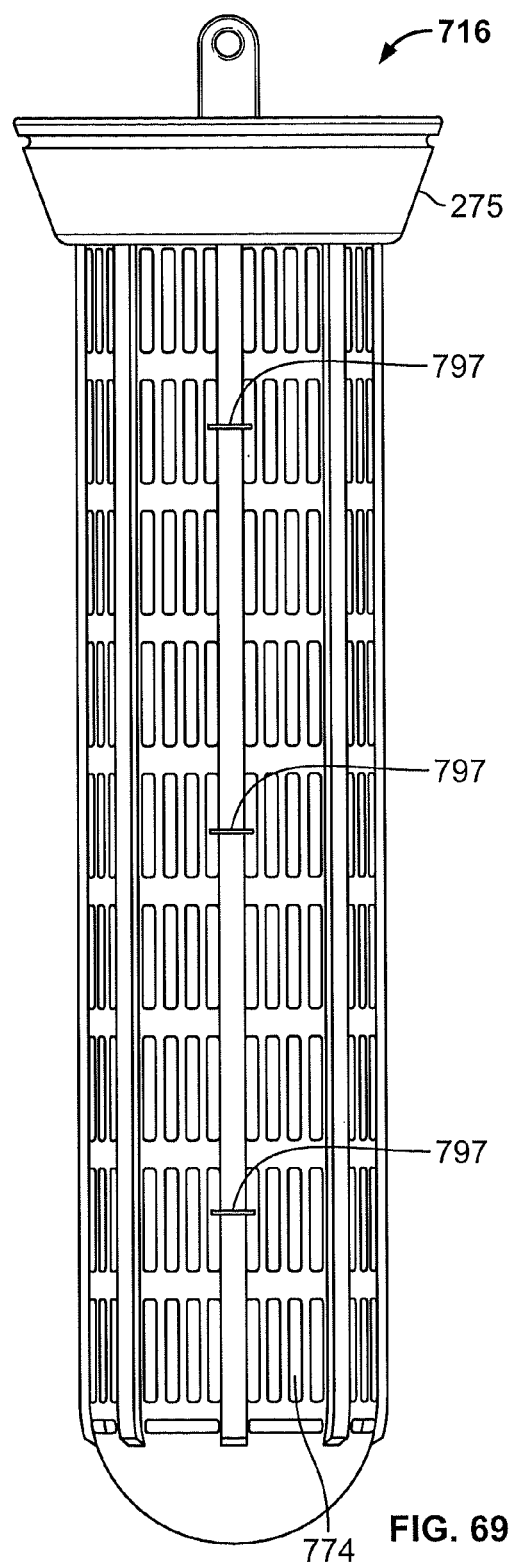
Figure 70:
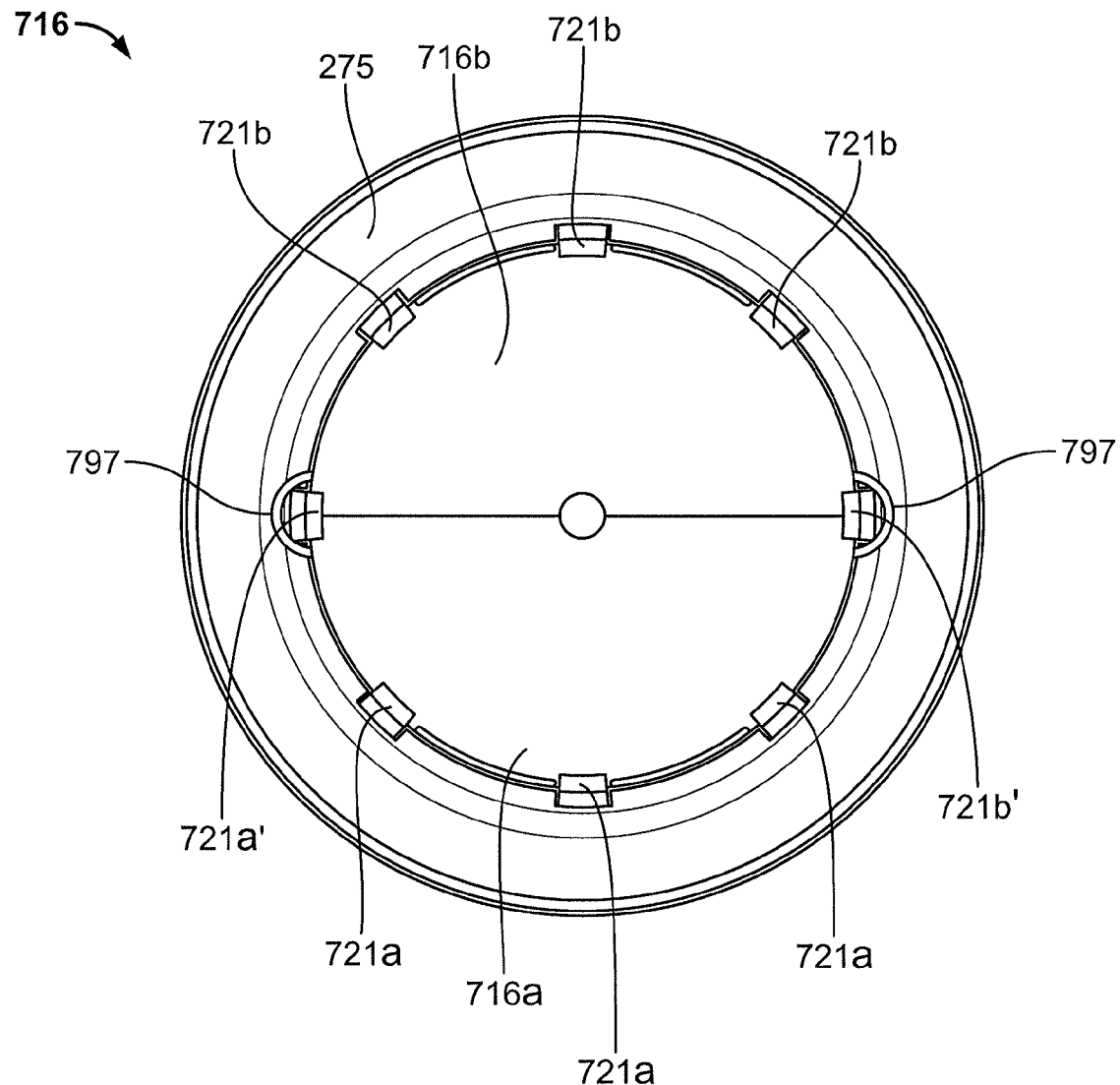
FIG. 70 is a bottom view of the supporting assembly and first securing member of FIG. 67.

Turning now to FIGS. 64-66, an alternative supporting assembly or basket assembly 416 for use with filter vessel assembly 10 in accordance with embodiments of the present disclosure is shown. The supporting assembly 416 is structurally and functionally similar to the supporting assembly 216 as discussed above, with some differences. Similar to supporting assembly 216, the supporting assembly 416 includes first and second supporting members 416a, 416b that are configured and dimensioned to be releasably secured/assembled together. Similar to the supporting assemblies described above, supporting assembly 416 is configured/adapted to be positioned within housing 14 of filter vessel assembly 10 to support and/or position filter member 18 within housing 14 (e.g., via locking assembly 73).

In one embodiment, supporting members 416a, 416b are substantially similar in dimensions, features and/or design. Each supporting member 416a, 416b typically includes at least one pin receiving member 467a or 467b that is configured and dimensioned to receive a pin or elongated rod member 466. In general, each pin receiving member 467a, 467b includes an aperture therethrough for receiving pin member 466. In an exemplary embodiment and as shown in FIGS. 64-66, member 416a includes five pin receiving members 467a, and member 416b includes five pin receiving members 467b.

Like supporting assembly 216 and as described above, supporting members 416a, 416b typically include at least one extending portion similar to 269a or 269b and at least one recessed portion similar to 270a or 270b, respectively. Supporting members 416a, 416b also typically include at least one leg member 471a or 471b.

Supporting members 416a, 416b typically include at least one rib member 421a, 421b, respectively. In one embodiment, supporting member 416a includes four rib members 421a, and supporting member 416b includes four rib members 421b (e.g., similar to assembly 216). For example, supporting members 416a, 416b each typically include a rib member 421a', 421b' that is positioned along a side or outer edge of supporting members 416a, 416b, where each rib member 421a', 421b' typically extends inwardly a distance past or beyond the interior surface of side or outer edge of supporting members 416a, 416b (again similar to assembly 216, described above).

The releasable securement of supporting members 416a, 416b together to form assembled supporting assembly 416 is described in part with reference to FIGS. 64-66, which depict an exemplary embodiment of a supporting assembly 416 for use with filter vessel assembly 10. Firstly, supporting members 416a, 416b can be positioned next to one another as shown in FIG. 64.

Supporting members 416a, 416b would then be positioned/moved adjacent one another as shown in FIG. 65. In this position, it is noted that the pin receiving members 467a, 467b substantially align adjacent one another in alternating fashion. Next, the pin member 466 is inserted through the apertures of aligned pin receiving members 467a, 467b as shown in FIG. 65. In exemplary embodiments, after inserting pin member 466 through the apertures, the pin member 466 may be retained by or in pin receiving members 467a, 467b by various means (e.g., welding, hot-iron melt seal, nut member, bolt, pin, O-ring and retaining ring groove, etc.). However, retained pin member 466 typically allows supporting members 416a, 416b to be rotated/hinged apart relative to one another and relative to retained pin member 466.

Supporting assembly 416 typically includes a plurality of apertures or openings 474 that are configured and dimensioned to allow filtered fluid to pass through the supporting assembly 416 and to fluid outlet port 24 after the filtered fluid has passed through filter member 18 housed/positioned within the interior of supporting assembly 416. First securing member 275 of locking assembly 73 is generally configured/adapted to releasably secure and/or position supporting assembly 416 within housing 14. As such, supporting assembly 416 and member 275 would typically be utilized in conjunction with member 80 (or member 80' or 180) and locking member 84 to releasably secure filter bag 18 to locking assembly 73 within housing 14 of filter vessel assembly 10 for filtering purposes, as described above.

Similar to the interaction between member 275 and assembly 216 described above, first securing member 275 is configured/dimensioned to be releasably secured and/or positioned with respect to supporting assembly 416. In this regard, first securing member 275 is typically first positioned beneath the lower end of assembled supporting assembly 416 so that each rib member 421 of assembly 416 was substantially aligned with a locking notch 239 of member 275.

As similarly described above with respect to assembly 216, a user would then typically move the lower end of assembly 416 through the central opening 257 of first securing member 275 and move/position the first securing member 275 towards the upper end of the assembly 416 until at least a portion of the collar member 472 of the assembly 416 engaged and/or rested upon at least a portion of the lower surface 278 of first securing member 275. Once the member 275 has reached a position where each locking notch 239 were positioned above the upper end of its respectively aligned rib member 421, a user could then rotate the member 275 either clockwise or counter-clockwise to a position where at least a portion of lower side 245 of lower surface 278 of member 275 would rest upon at least a portion of the upper end of rib members 421. In this regard, first securing member 275 can be advantageously releasably secured to supporting assembly 416.

In general, first securing member 275 with supporting assembly 416 positioned thereon and/or releasably secured therewith could then have a filter member 18 (e.g., filter bag) releasably secured thereto via interaction between second securing member 80 (or member 80' or 180), locking member 84, filter member 18 (e.g., sealing member 61 of filter member 18) and first securing member 275 as explained and described above.

With reference now to FIGS. 67-70, an embodiment of supporting assembly or basket assembly 716 for use with filter vessel assembly 10 in accordance with the present disclosure is shown. The supporting assembly 716 is structurally and functionally similar to the supporting assembly 216 as discussed above, with some differences. Similar to supporting assembly 216, the supporting assembly 716 includes first and second supporting members 716a, 716b that are configured and dimensioned to be releasably secured/assembled together. Similar to the supporting assemblies described above, supporting assembly 716 is configured/adapted to be positioned within housing 14 of filter vessel assembly 10 to support and/or position filter member 18 within housing 14 (e.g., via locking assembly 73).

In one embodiment, supporting members 716a, 716b are substantially similar in dimensions, features and/or design. Supporting assembly 716 typically includes a plurality of apertures or openings 774 that are configured and dimensioned to allow filtered fluid to pass through the supporting assembly 716 and to fluid outlet port 24 after the filtered fluid has passed through filter member 18 housed/positioned within the interior of supporting assembly 716. Like supporting assembly 216 and as described above, supporting members 716a, 716b typically include at least one extending portion similar to 269a or 269b and at least one recessed portion similar to 270a or 270b, respectively.

Supporting members 716a, 716b typically include at least one rib member 721a, 721b, respectively. In one embodiment, supporting member 716a includes four rib members 721a, and supporting member 716b includes four rib members 721b (e.g., similar to assembly 216). In general, supporting members 716a, 716b each typically include a rib member 721a', 721b' that is positioned along a side or outer edge of supporting members 716a, 716b, where each rib member 721a', 721b' typically extends inwardly a distance past or beyond the interior surface of side or outer edge of supporting members 716a, 716b (again similar to assembly 216, described above).

The releasable securement of supporting members 716a, 716b together to form assembled supporting assembly 716 is described in part with reference to FIGS. 67-70, which depict an exemplary embodiment of a supporting assembly 716 for use with filter vessel assembly 10. Firstly, supporting members 716a, 716b can be positioned adjacent one another as shown in FIGS. 67-70.

Next, a user would then releasably secure at least one securement member 797 around rib member 721a', and releasably secure at least one securement member 797 substantially around rib member 721b' to releasably secure members 716a, 716b together. In exemplary embodiments and as shown in FIGS. 67-70, three securement members 797 are secured around rib member 721a', and three securement members 797 are secured around rib member 721b'. Exemplary securement members 797 take the form of a substantially continuous metal or plastic ring member or the like, although the present disclosure is not limited thereto. Rather, securement members 797 may take a variety of forms (e.g., zip-ties, etc.). It is noted that each metal or plastic ring member 797 typically includes a slot that provides for the placement/securement of members 797 around rib members 721a', 721b'.

First securing member 275 of locking assembly 73 is generally configured/adapted to releasably secure and/or position supporting assembly 716 within housing 14. As such, supporting assembly 716 and member 275 would typically be utilized in conjunction with member 80 (or member 80' or 180) and locking member 84 to releasably secure filter bag 18 to locking assembly 73 within housing 14 of filter vessel assembly 10 for filtering purposes, as described above.

Similar to the interaction between member 275 and assembly 216 described above, first securing member 275 is configured/dimensioned to be releasably secured and/or positioned with respect to supporting assembly 716. In this regard, first securing member 275 is typically first positioned beneath the lower end of assembled supporting assembly 716 so that each rib member 721 of assembly 716 was substantially aligned with a locking notch 239 of member 275.

As similarly described above with respect to assembly 216, a user would then typically move the lower end of assembly 716 through the central opening 257 of first securing member 275 and move/position the first securing member 275 towards the upper end of the assembly 716 until at least a portion of the collar member of the assembly 716 (e.g., similar to collar member 272 of the assembly 216) engaged and/or rested upon at least a portion of the lower surface 278 of first securing member 275. Once the member 275 has reached a position where each locking notch 239 were positioned above the upper end of its respectively aligned rib member 721, a user could then rotate the member 275 either clockwise or counter-clockwise to a position where at least a portion of lower side 245 of lower surface 278 of member 275 would rest upon at least a portion of the upper end of rib members 721. In this regard, first securing member 275 can be advantageously releasably secured to supporting assembly 716.

In general, first securing member 275 with supporting assembly 716 positioned thereon and/or releasably secured therewith could then have a filter member 18 (e.g., filter bag) releasably secured thereto via interaction between second securing member 80 (or member 80' or 180), locking member 84, filter member 18 (e.g., sealing member 61 of filter member 18) and first securing member 275 as explained and described above.

Figure 71:
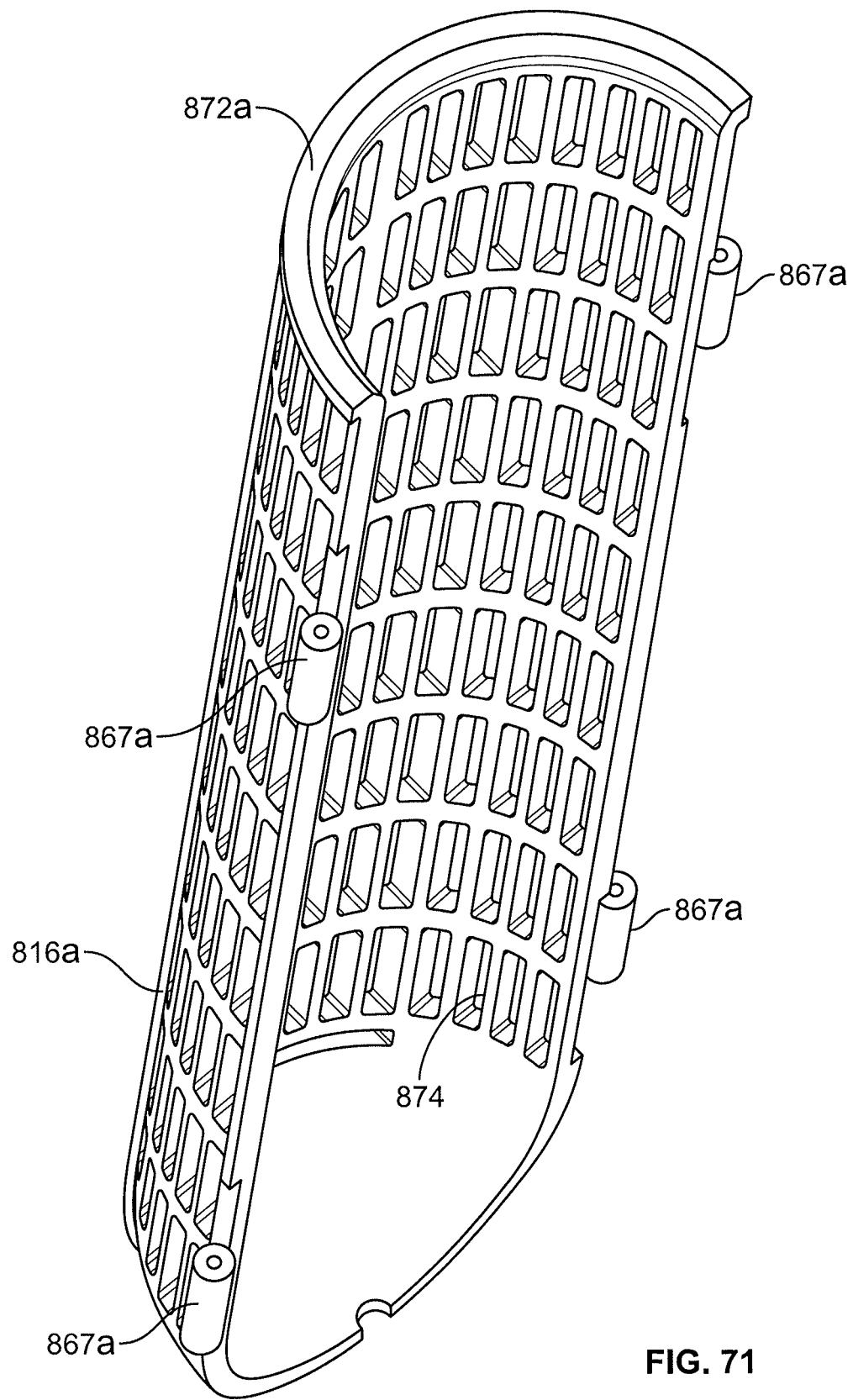
FIGS. 71-72 are partial side perspective views of a supporting assembly for a filter vessel assembly in accordance with another exemplary embodiment of the present disclosure.
Figure 72:
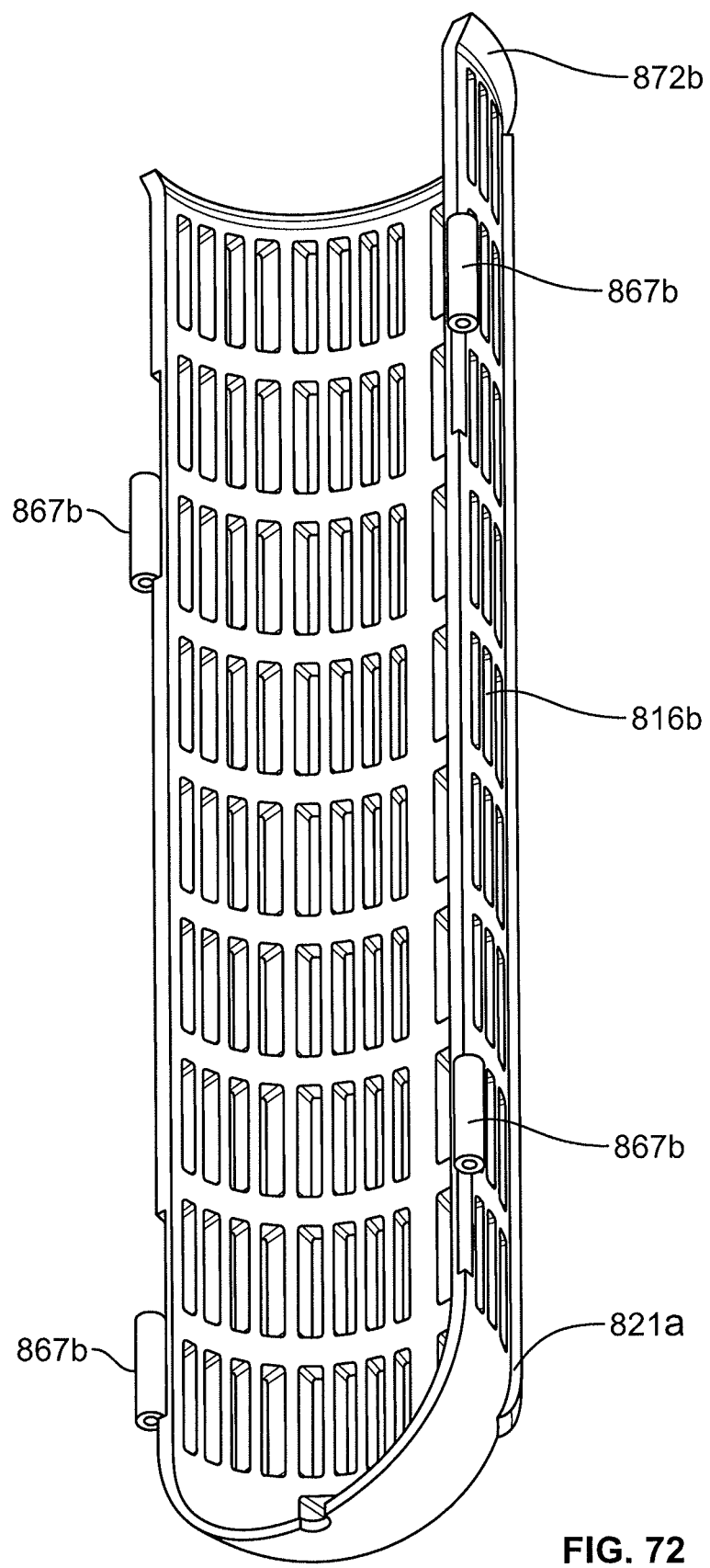
Figure 73:
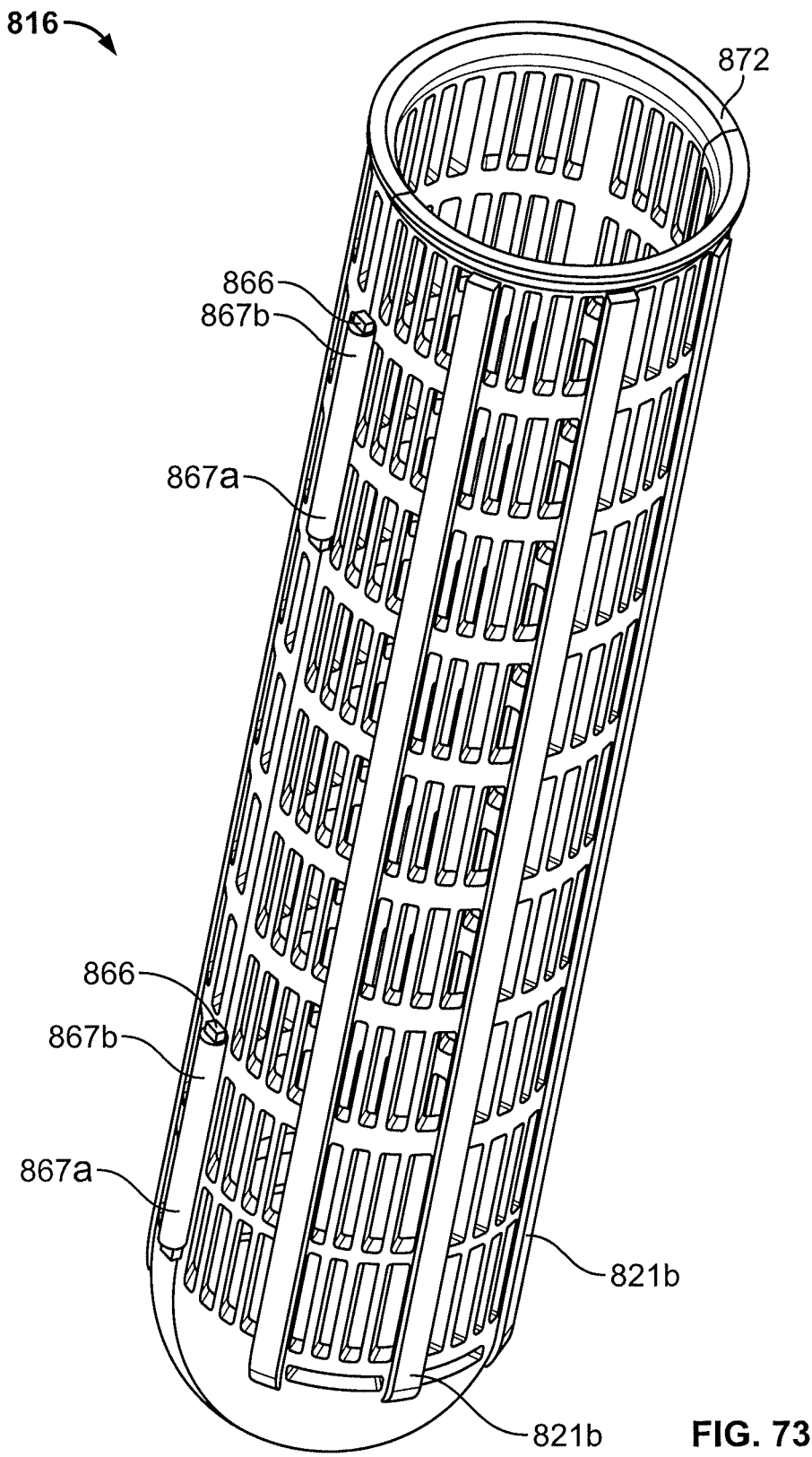
FIG. 73 is a side perspective view of the supporting assembly of FIGS. 71-72.
Figures 74, 75:
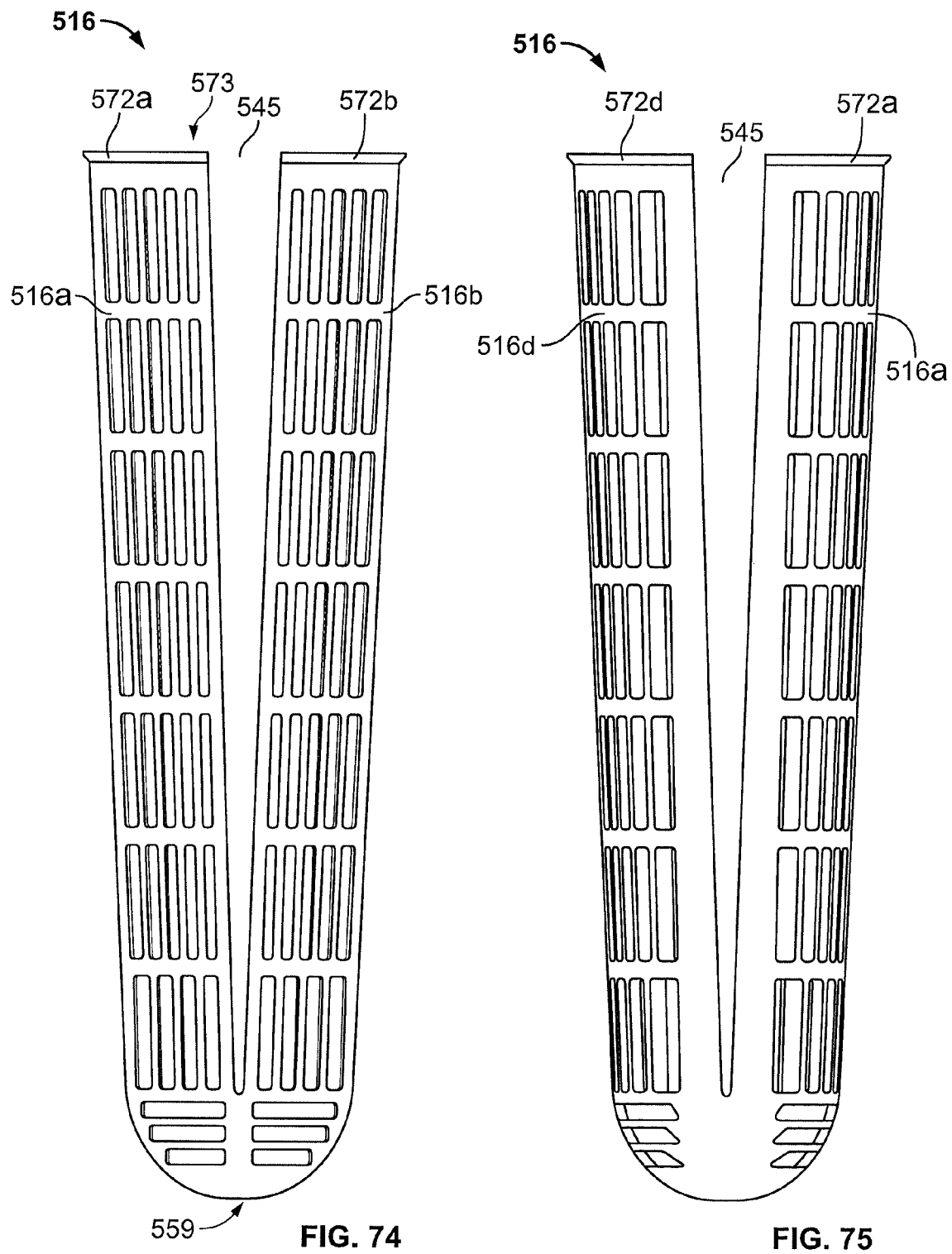
FIGS. 74-75 are side views of a supporting assembly for a filter vessel assembly in accordance with another exemplary embodiment of the present disclosure.
Figure 76:
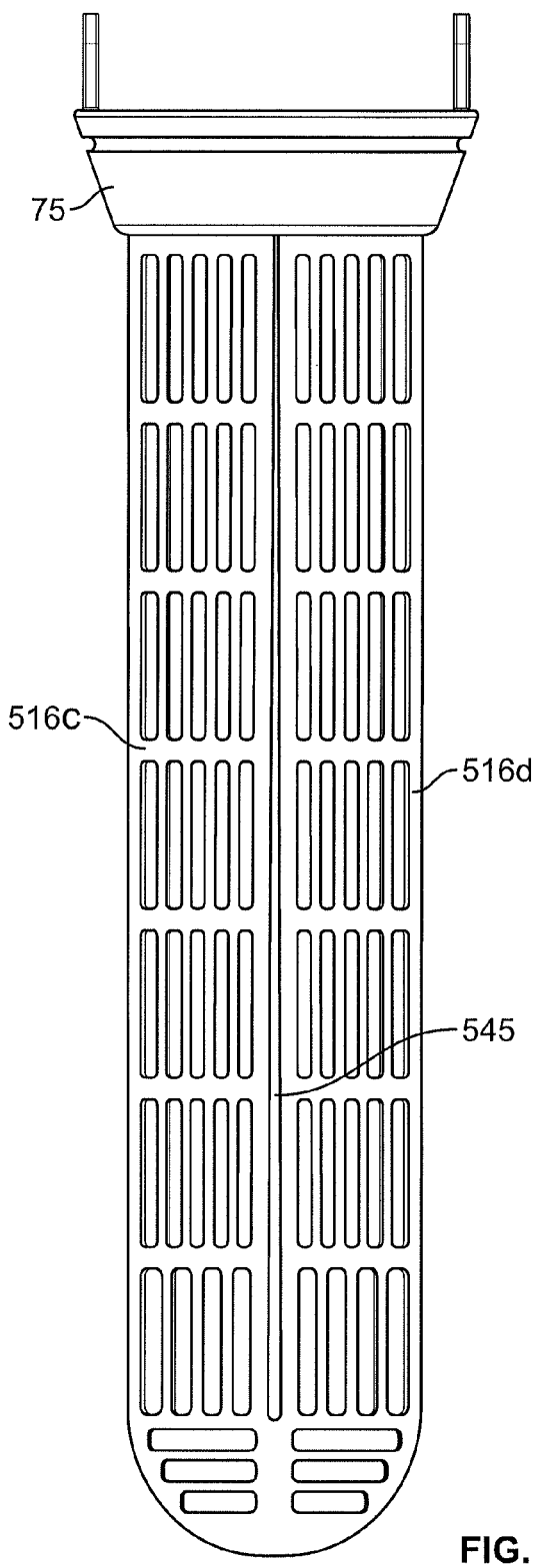
FIG. 76-77 are side views of the supporting assembly of FIGS. 74-75, and of a first securing member for a filter vessel assembly in accordance with another exemplary embodiment of the present disclosure.
Figure 77:
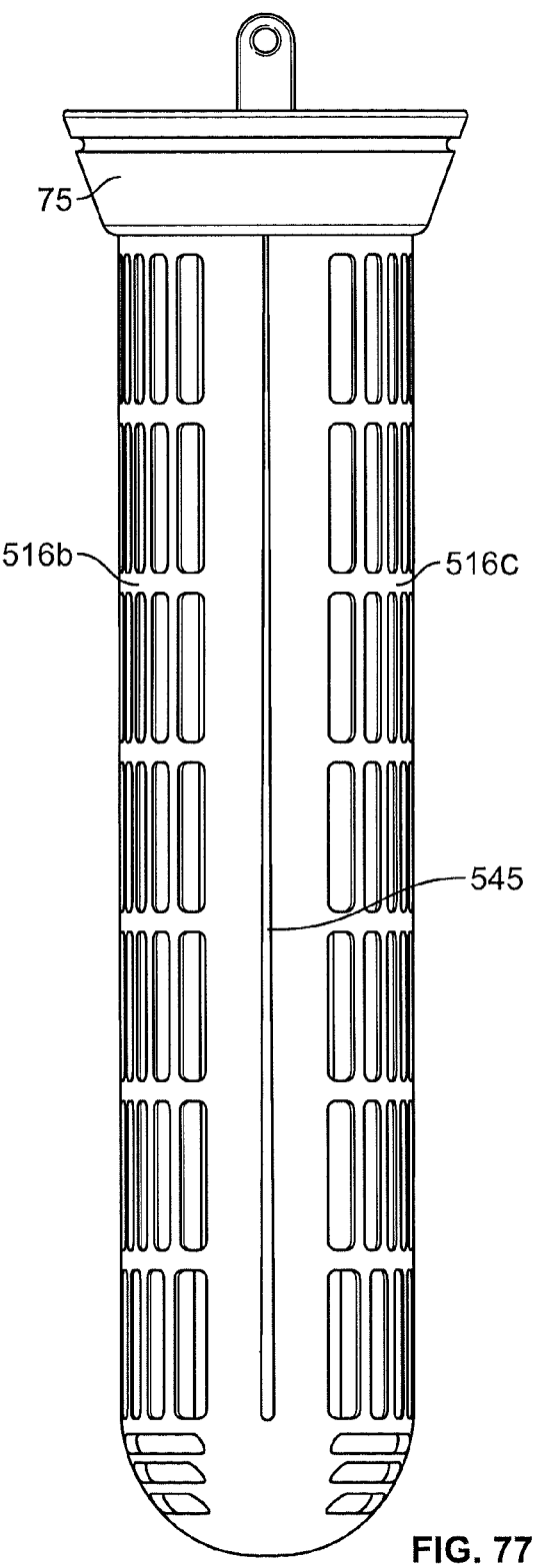
Figure 79:
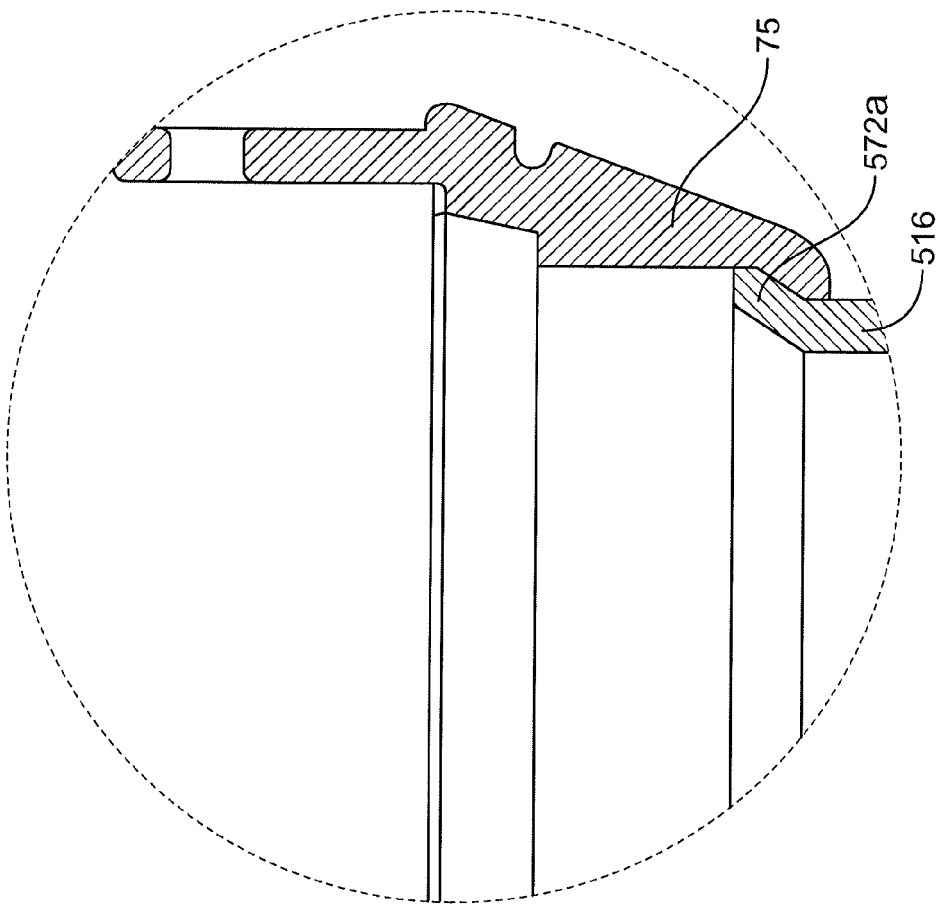
FIG. 79 is an exploded partial view of the supporting assembly and first securing member of FIG. 78.
Figure 78:
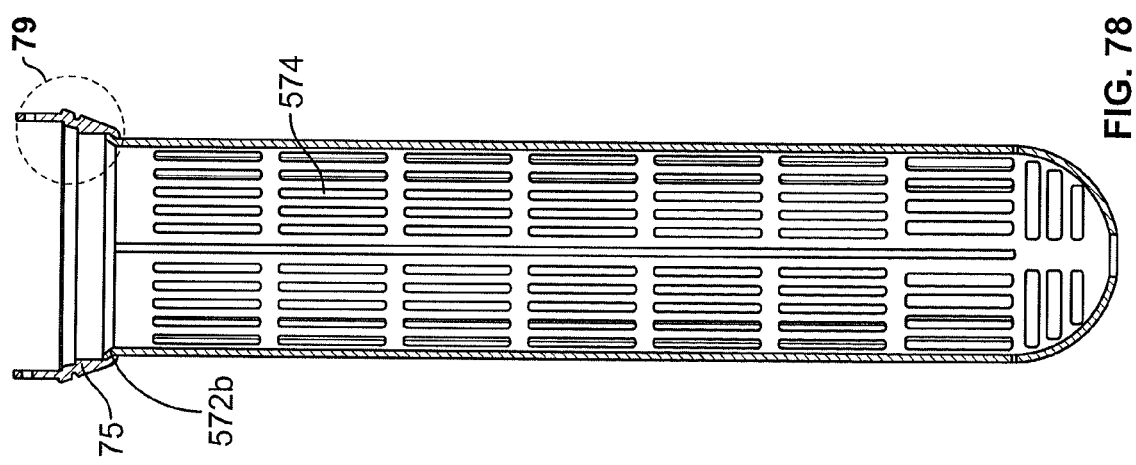
FIG. 78 is a side cross-sectional view of the supporting assembly and first securing member of FIG. 76.
Figures 80, 81:
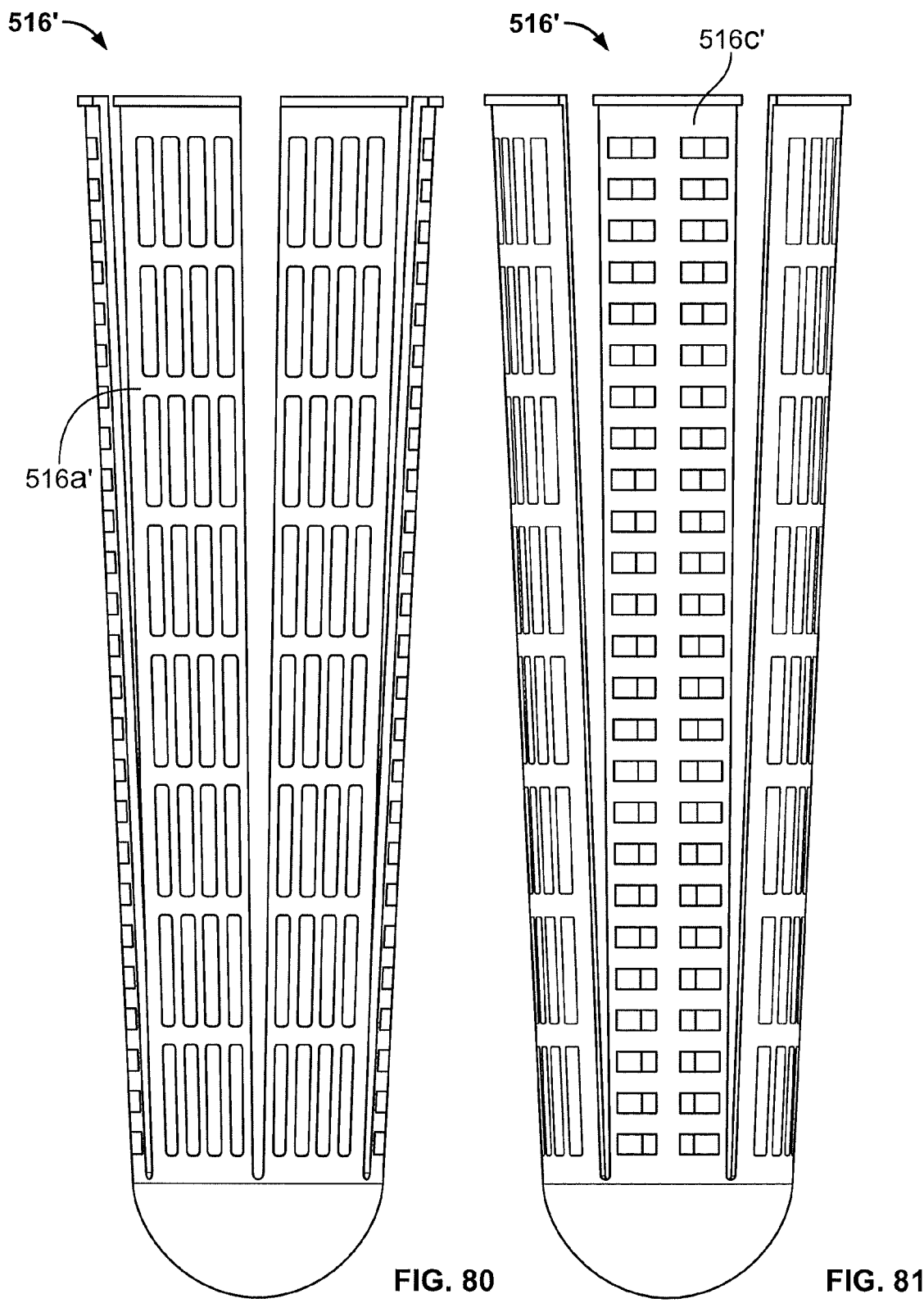
FIGS. 80-81 are side views of a supporting assembly for a filter vessel assembly in accordance with another exemplary embodiment of the present disclosure.
Figure 82:
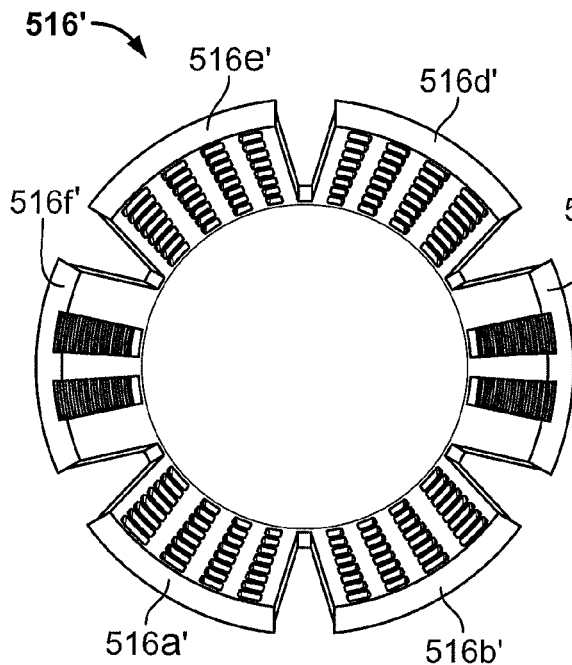
FIG. 82 is a top view of the supporting assembly of FIGS. 80-81.
Figure 83:
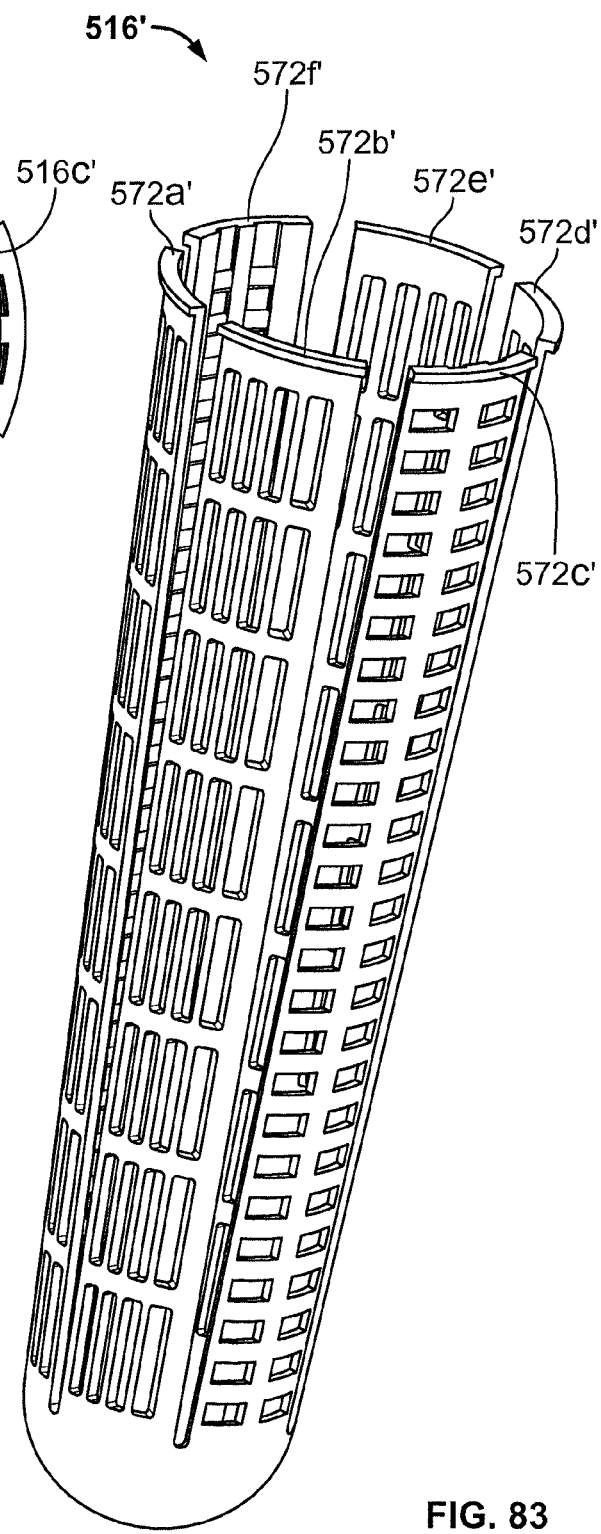
FIG. 83 is a side perspective view of the supporting assembly of FIGS. 80-81.
Figure 84:
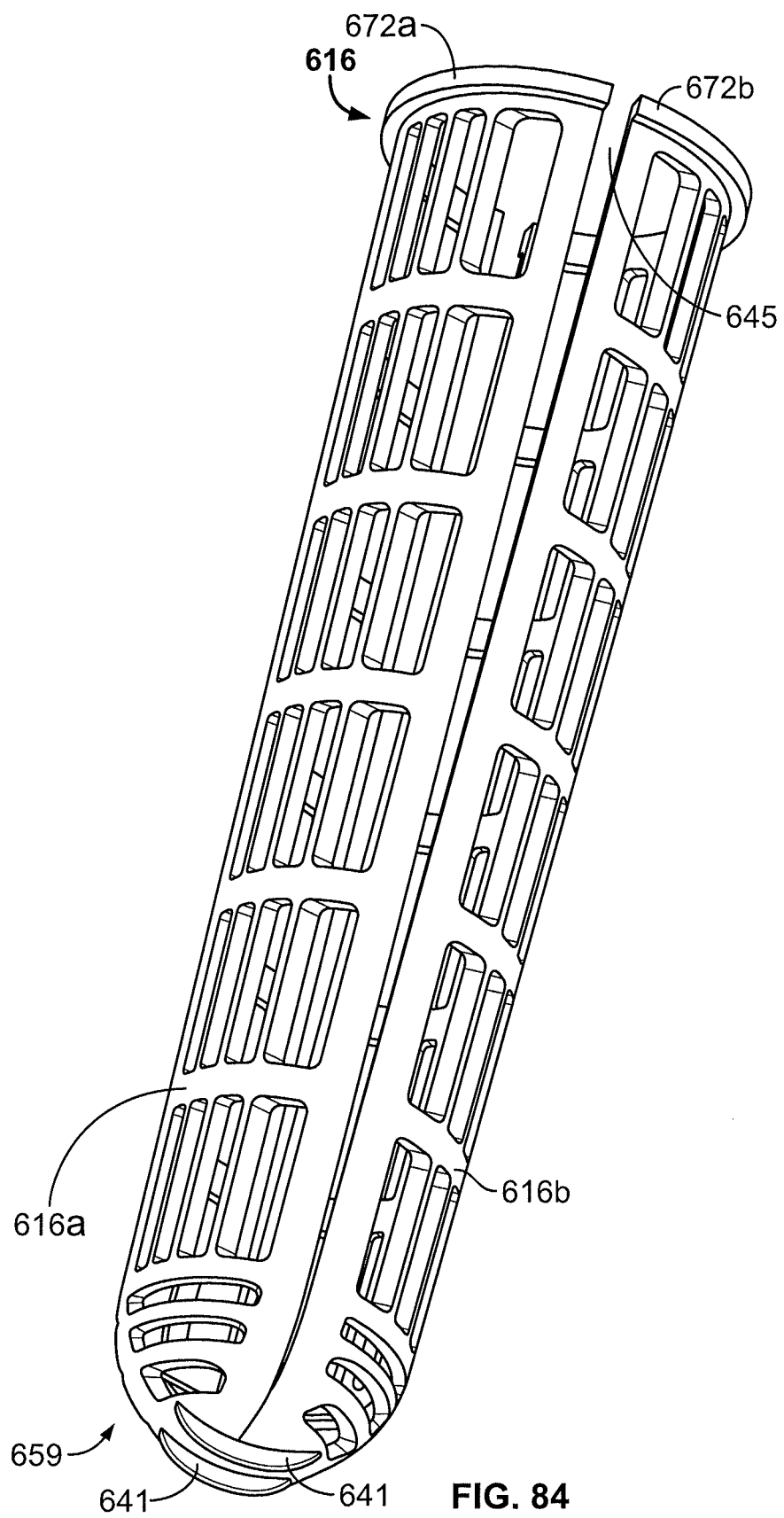
FIG. 84 is a side perspective view of a supporting assembly for a filter vessel assembly in accordance with another exemplary embodiment of the present disclosure.
Figure 85:
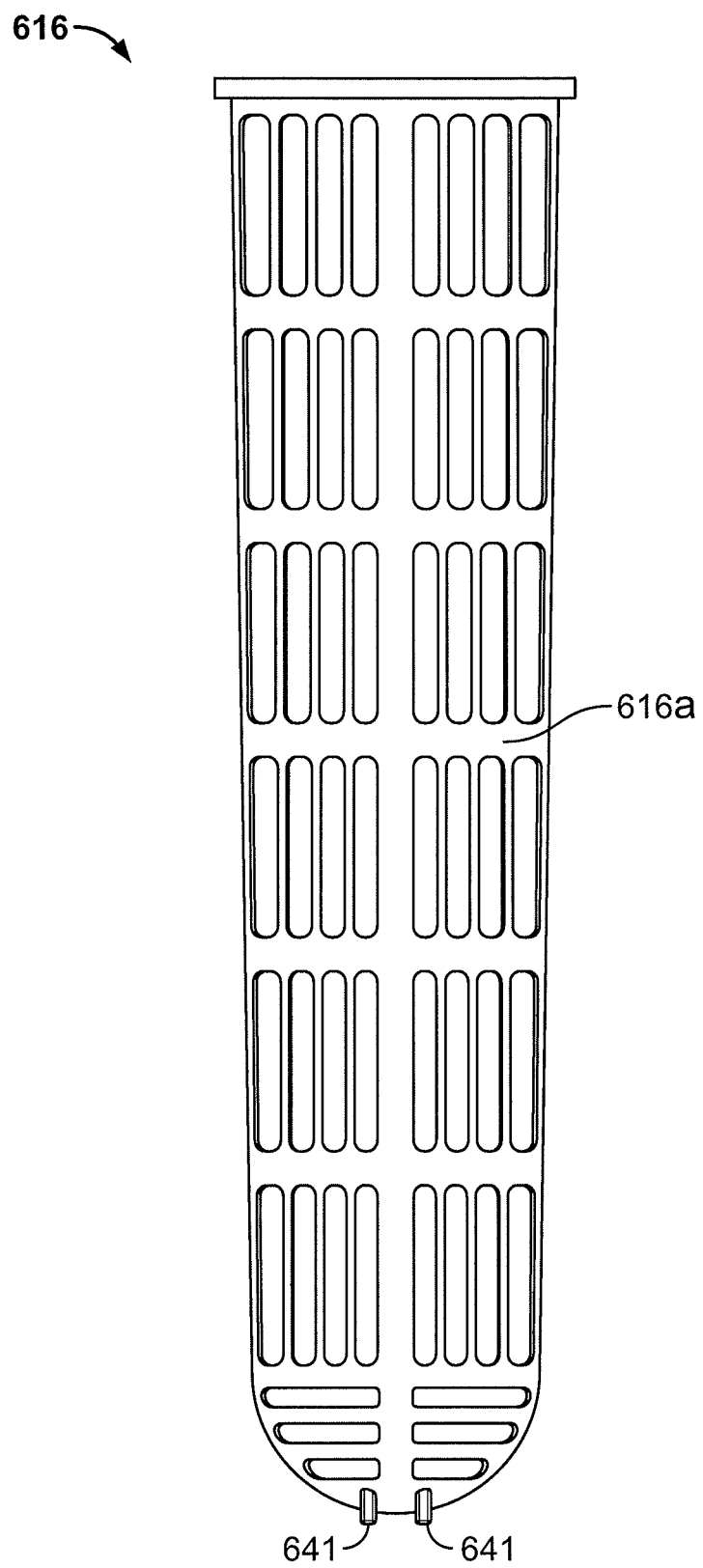
FIG. 85 is a side view of the supporting assembly of FIG. 84.
Figure 86:
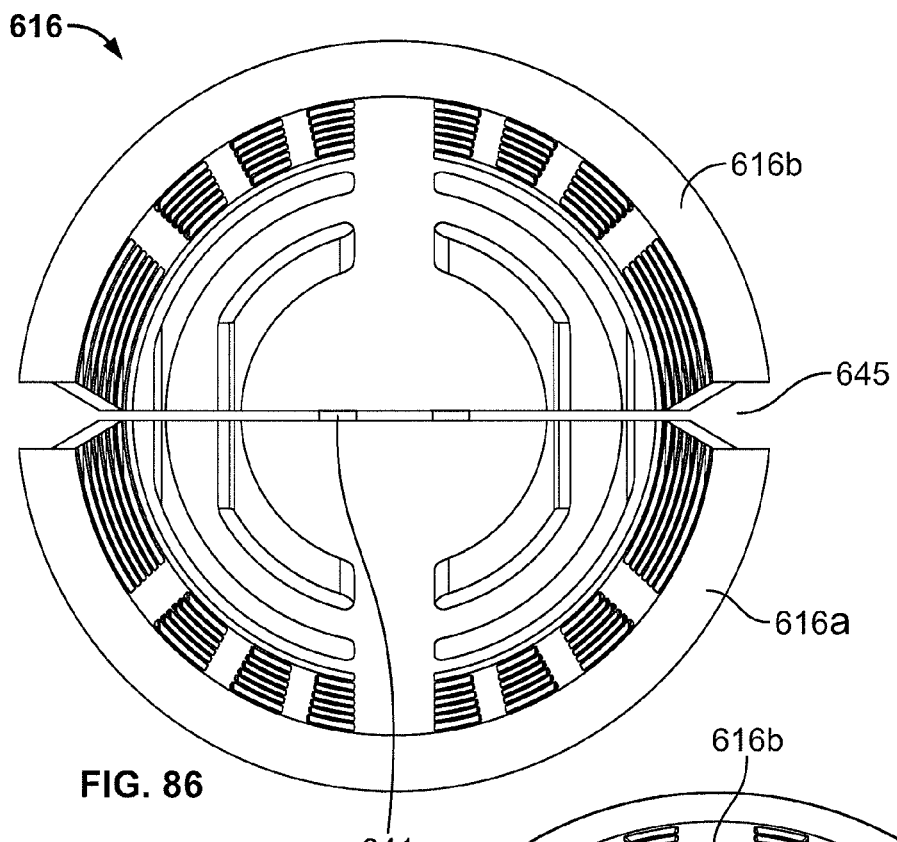
FIG. 86 is a top view of the supporting assembly of FIG. 84.
Figure 87:
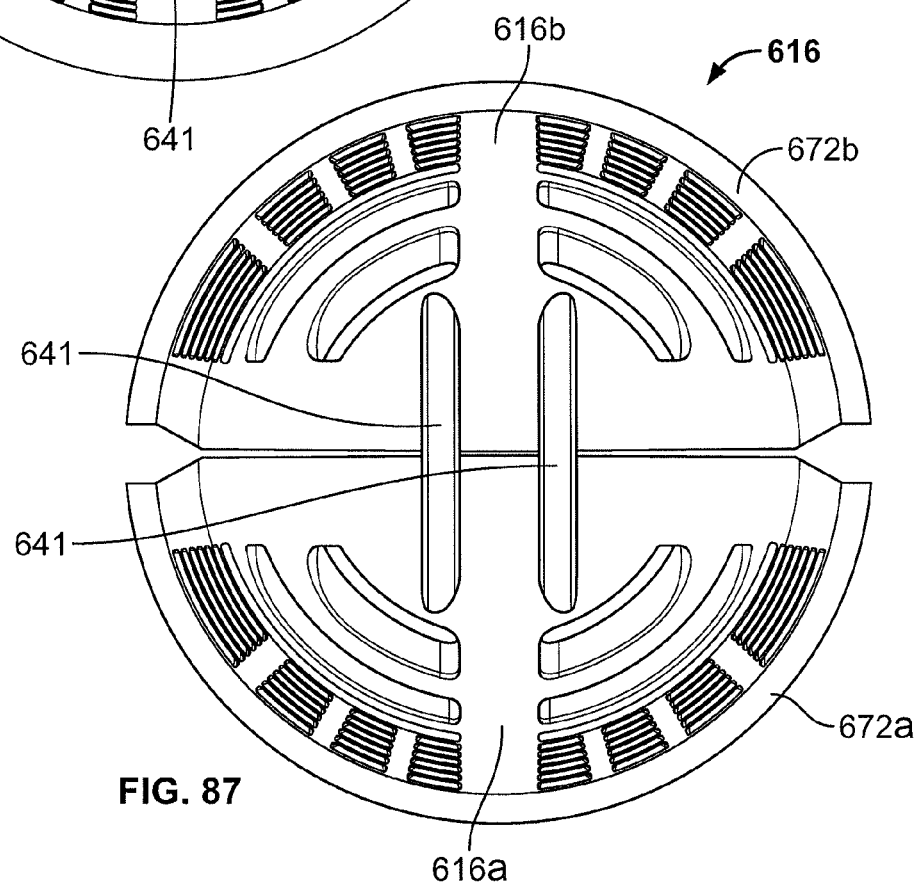
FIG. 87 is a bottom view of the supporting assembly of FIG. 84.
Figures 88, 89:
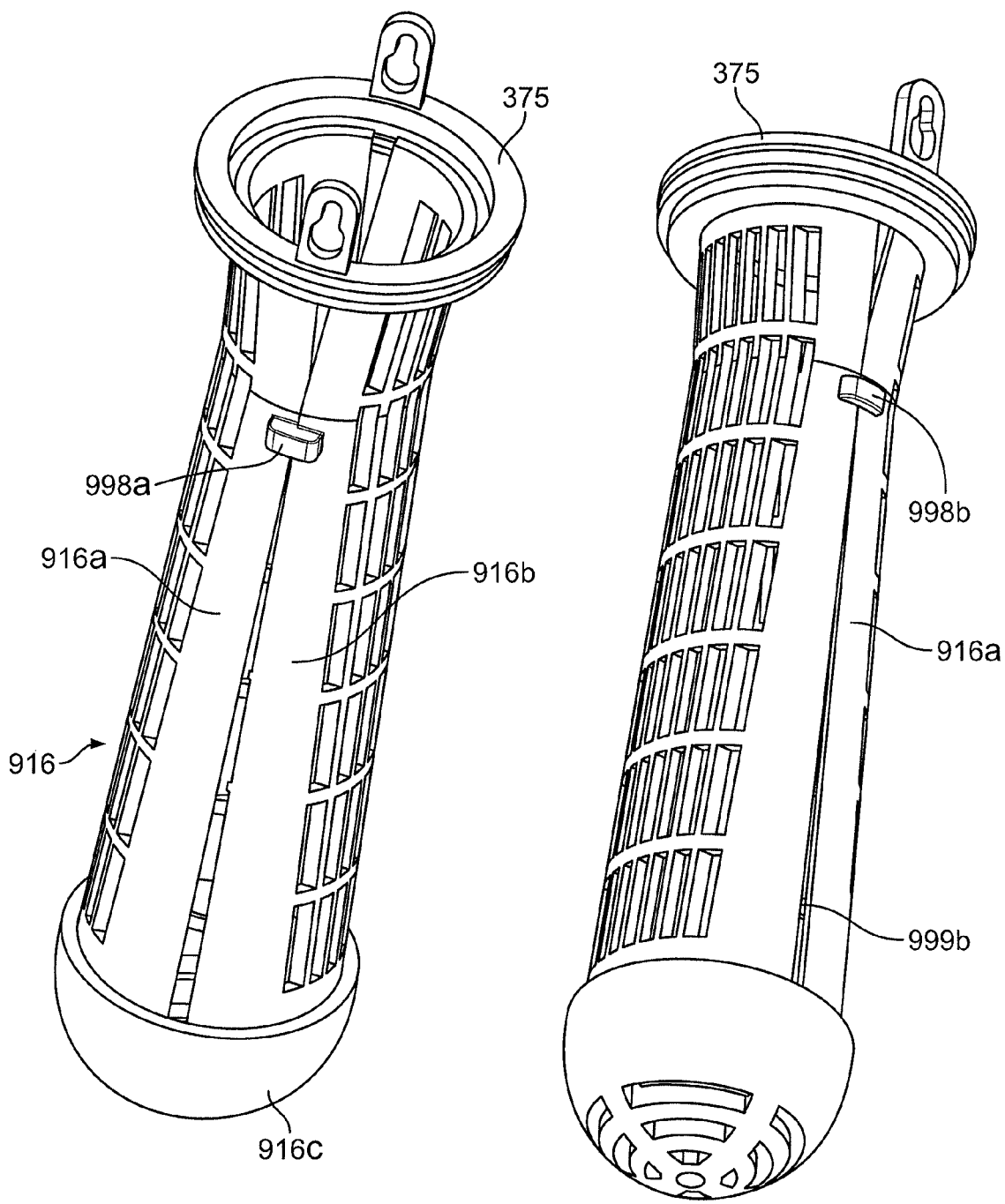
FIG. 88-89 are side perspective views of a supporting assembly and first securing member for a filter vessel assembly in accordance with another exemplary embodiment of the present disclosure.
Figures 90, 91:
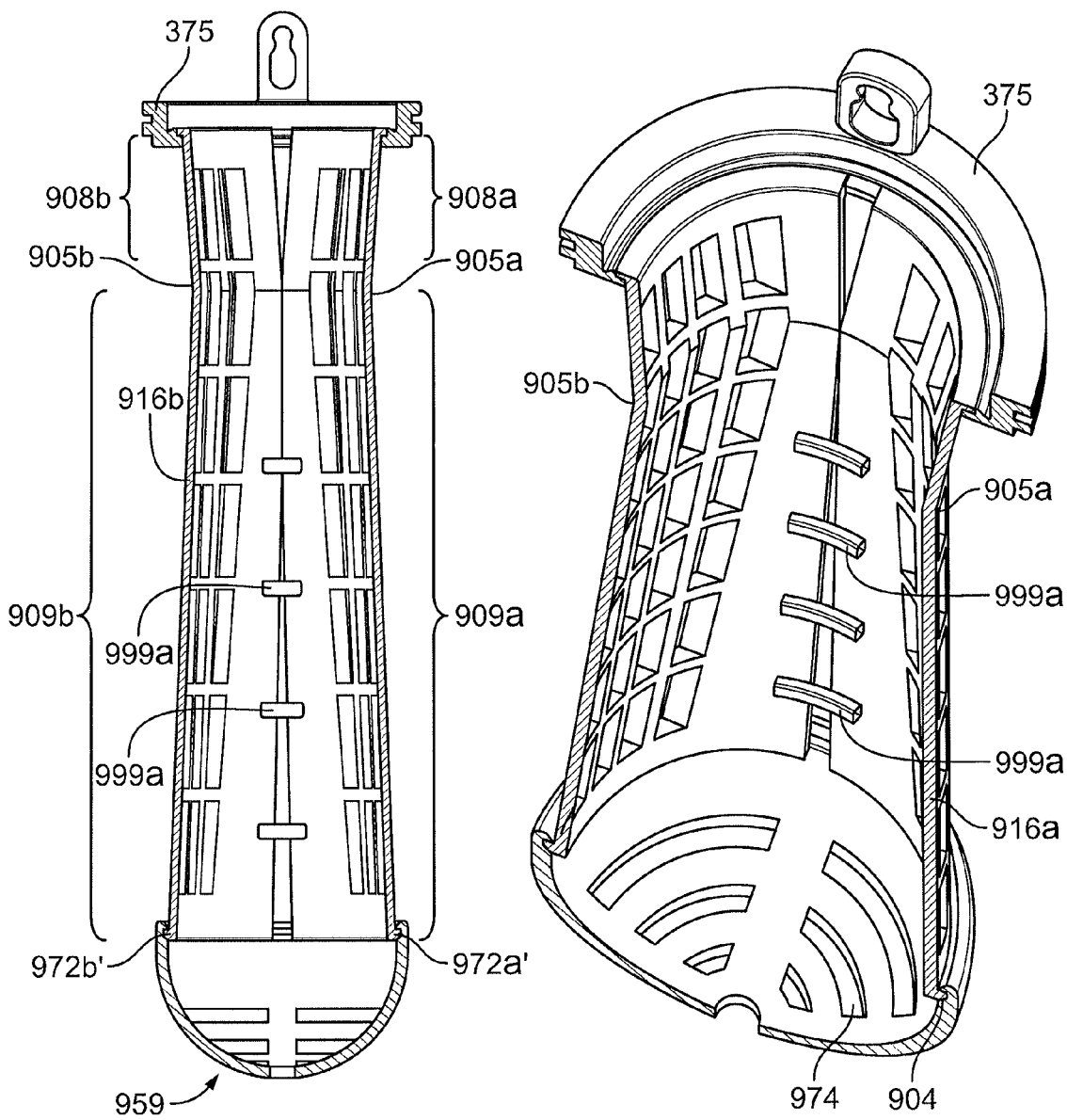
FIG. 90 is a side cross-sectional view of the supporting assembly and first securing member of FIGS. 88-89.
FIG. 91 is a side perspective cross-sectional view of the supporting assembly and first securing member of FIGS. 88-89.

Turning now to FIGS. 71-73, an alternative supporting assembly or basket assembly 816 for use with filter vessel assembly 10 in accordance with embodiments of the present disclosure is shown. The supporting assembly 816 is structurally and functionally similar to the supporting assembly 216 as discussed above, with some differences. Similar to supporting assembly 216, the supporting assembly 816 includes first and second supporting members 816a, 816b that are configured and dimensioned to be releasably secured/assembled together. Similar to the supporting assemblies described above, supporting assembly 816 is configured/adapted to be positioned within housing 14 of filter vessel assembly 10 to support and/or position filter member 18 within housing 14 (e.g., via locking assembly 73).

In an exemplary embodiment, supporting members 816a, 816b are substantially similar in dimensions, features and/or design. Supporting assembly 816 typically includes a plurality of apertures or openings 874 that are configured and dimensioned to allow filtered fluid to pass through the supporting assembly 816 and to fluid outlet port 24 after the filtered fluid has passed through filter member 18 housed/positioned within the interior of supporting assembly 816.

Each supporting member 816a, 816b typically includes at least one pin receiving member 867a or 867b that is configured and dimensioned to receive a pin or elongated rod member 866. In general, each pin receiving member 867a, 867b includes an aperture therethrough for receiving pin member 866. In an exemplary embodiment and as shown in FIGS. 71-72, member 816a includes two pin receiving members 867a, and member 816b includes two pin receiving members 867b. Supporting members 816a, 816b typically include at least one rib member 821a, 821b, respectively. In one embodiment, supporting member 816a includes three rib members 821a, and supporting member 816b includes three rib members 821b.

The releasable securement of supporting members 816a, 816b together to form assembled supporting assembly 816 is described in part with reference to FIGS. 71-73, which depict an exemplary embodiment of a supporting assembly 816 for use with filter vessel assembly 10. Firstly, supporting members 816a, 816b can be positioned next to one another as shown in FIG. 73.

In this position, it is noted that the upper pin receiving members 867a of member 816a substantially align adjacent to a corresponding upper pin receiving member 867b of member 816b, and that the lower pin receiving members 867a of member 816a substantially align adjacent to a corresponding lower pin receiving member 867b of member 816b. Next, a pin member 866 is inserted through the apertures of each of the four aligned pairs of pin receiving members 867a, 867b, as partially shown in FIG. 73. In exemplary embodiments, after inserting pin members 866 (e.g., four pin members 866, one for each pair of aligned pin receiving members 867a, 867b) through the apertures, each pin member 866 may be retained by or in pin receiving members 867a, 867b by various means (e.g., welding, hot-iron melt seal, nut member, bolt, pin, O-ring and retaining ring groove, etc.). However, each retained pin member 866 typically allows supporting members 816a, 816b to be rotated apart relative to one another and relative to retained pin members 866 (e.g., if two or three pin members 866 were removed from a mating side of assembly 816).

In general, first securing member 275 of locking assembly 73 is configured/adapted to releasably secure and/or position supporting assembly 816 within housing 14. As such, supporting assembly 816 and member 275 would typically be utilized in conjunction with member 80 (or member 80' or 180) and locking member 84 to releasably secure filter bag 18 to locking assembly 73 within housing 14 of filter vessel assembly 10 for filtering purposes, as described above.

Like the interaction between member 275 and assembly 216 described above, first securing member 275 is configured/dimensioned to be releasably secured and/or positioned with respect to supporting assembly 816. In this regard, first securing member 275 is typically first positioned beneath the lower end of assembled supporting assembly 816 so that each rib member 821 and/or each pair of aligned pin receiving members 867a, 867b of assembly 816 was substantially aligned with a locking notch 239 of member 275.

As described above, a user would then typically move the lower end of assembly 816 through the central opening 257 of first securing member 275 and move/position the first securing member 275 towards the upper end of the assembly 816 until at least a portion of the collar member 872 (e.g., collar members 872a and 872b) of the assembly 816 engaged and/or rested upon at least a portion of the lower surface 278 of first securing member 275. Once the member 275 has reached a position where each locking notch 239 were positioned above the upper end of its respectively aligned rib member 821 (and/or the upper end of each pair of aligned pin receiving members 867a, 867b), a user could then rotate the member 275 either clockwise or counterclockwise to a position where at least a portion of lower side 245 of lower surface 278 of member 275 would rest upon at least a portion of the upper end of rib members 821 (and/or the upper end of each pair of aligned pin receiving members 867a, 867b). In this regard, first securing member 275 can be advantageously releasably secured to supporting assembly 816.

In general, first securing member 275 with supporting assembly 816 positioned thereon and/or releasably secured therewith could then have a filter member 18 (e.g., filter bag) releasably secured thereto via interaction between second securing member 80 (or member 80' or 180), locking member 84, filter member 18 (e.g., sealing member 61 of filter member 18) and first securing member 275 as explained and described above.

Turning now to FIGS. 74-79, an alternative supporting assembly or basket assembly 516 for use with filter vessel assembly 10 in accordance with embodiments of the present disclosure is shown. The supporting assembly 516 is structurally and functionally similar to the supporting assembly 16 as discussed above, with some differences. In general, supporting assembly 516 is a one-piece assembly that includes four outwardly extending portions 516a, 516b, 516c and 516d, with a slit or slot 545 extending between each outwardly extending portion a substantial length of supporting assembly 516. In one embodiment, each slot 545 extends from the upper open end of assembly 516 to a position at or near the lower end of assembly 516, although the present disclosure is not limited thereto. Rather, each slot 545 may extend any desired length of assembly 516. Similar to supporting assemblies 16 and 216 as described above, supporting assembly 516 is configured/adapted to be positioned within housing 14 of filter vessel assembly 10 to support and/or position filter member 18 within housing 14 (e.g., via locking assembly 73).

In exemplary embodiments, supporting assembly 516 typically includes a plurality of apertures or openings 574 that are configured and dimensioned to allow filtered fluid to pass through the supporting assembly 516 and to fluid outlet port 24 after the filtered fluid has passed through filter member 18 housed/positioned within the interior of supporting assembly 516. In general, supporting assembly 516 typically includes an outwardly extending collar members 572a, 572b, 572c and 572d. In general, collar members extend, taper or slope outwardly from the upper open end 573 of supporting assembly 516.

First securing member 75 of locking assembly 73 is generally configured/adapted to releasably secure and/or position supporting assembly 516 within housing 14. As such, supporting assembly 516 and member 75 would typically be utilized in conjunction with member 80 (or member 80' or 180) and locking member 84 to releasably secure filter bag 18 to locking assembly 73 within housing 14 of filter vessel assembly 10 for filtering purposes, as described above.

First securing member 75 is typically first positioned beneath the lower end 559 of supporting assembly 516. A user would then typically move the lower end 559 of assembly 516 through the central opening 57 of first securing member 75 and move/position the first securing member 75 towards the upper end of the assembly 16 (with the user and/or member 75 compressing or squeezing the outwardly extending portions 516a, 516b, 516c and 516d together) until at least a portion of the collar members 572a, 572b, 572c and 572d of the assembly 516 engaged and/or rested upon at least a portion of the lower surface 78 of first securing member 75. In this regard, first securing member 75 can be advantageously releasably secured to supporting assembly 516 (e.g., via compressed portions 516a, 516b, 516c and 516d acting as leaf springs or like with their engaged interaction of collar members 572a, 572b, 572c and 572d and lower surface 78 of first securing member 75).

In general, first securing member 75 with supporting assembly 516 positioned thereon and/or releasably secured therewith could then have a filter member 18 (e.g., filter bag) releasably secured thereto via interaction between second securing member 80 (or member 80' or 180), locking member 84, filter member 18 (e.g., sealing member 61 of filter member 18) and first securing member 275 as explained and described above. Thus, supporting assembly 516 would typically be utilized in conjunction with locking assembly 73 within housing 14 of filter vessel assembly 10 for filtering purposes, as explained and described above with respect to assembly 16.

In an alternative embodiment and as shown in FIGS. 80-83, supporting assembly 516' may include six outwardly extending portions 516a', 516b', 516c', 516d', 516e' and 516f, with each outwardly extending portion having collar members 572a', 572b', 572c', 572d', 572e' and 572e', respectively. As such, assembly 516' may be utilized similarly as assembly 516 in conjunction with member 75 and locking assembly 73 within housing 14 of filter vessel assembly 10 for filtering purposes, as explained and described above with respect to assembly 16 and assembly 516. It is to be noted that assembly 516 or 516' could include any number of outwardly extending portions.

In another alternative embodiment and as shown in FIGS. 84-87, supporting assembly 616 includes two outwardly extending portions 616a and 616b, with a slit or slot 645 extending between each outwardly extending portion 616a, 616b substantially the entire length of supporting assembly 616, with the exception of at least one hinge member 641 crossing slot 645 at the lower end 659 of assembly 616. In exemplary embodiments, assembly 616 includes two spaced apart hinge members 641 crossing slot 645 at the lower end 659 of assembly 616. Assembly 616 may include any number of hinge members 641. Outwardly extending portions 616a, 616b are generally free to rotate with respect to another (e.g., be place together or apart) via hinge members 641.

In general, each outwardly extending portion 616a, 616b includes collar members 672a and 672b, respectively. As such, assembly 616 may be utilized similarly as assembly 516 in conjunction with member 75 and locking assembly 73 within housing 14 of filter vessel assembly 10 for filtering purposes, as explained and described above with respect to assembly 16 and assembly 516.

Turning now to FIGS. 88-95, an alternative supporting assembly or basket assembly 916 for use with filter vessel assembly 10 in accordance with embodiments of the present disclosure is shown. The supporting assembly 916 is structurally and functionally similar to the supporting assembly 16 as discussed above, with some differences. In general, supporting assembly 916 is a three-piece assembly that includes first, second and third supporting members 916a, 916b and 916c that are configured and dimensioned to be releasably secured/assembled together. Similar to the supporting assemblies described above, supporting assembly 916 is configured/adapted to be positioned within housing 14 of filter vessel assembly 10 to support and/or position filter member 18 within housing 14 (e.g., via locking assembly 73).

In one embodiment, supporting members 916a, 916b are substantially similar in dimensions, features and/or design. In exemplary embodiments, assembled supporting assembly 916 typically includes a plurality of apertures or openings 974 that are configured and dimensioned to allow filtered fluid to pass through the assembled supporting assembly 916 and to fluid outlet port 24 after the filtered fluid has passed through filter member 18 housed/positioned within the interior of supporting assembly 916. In general, supporting assembly 916 typically includes outwardly extending upper collar members 972a and 972b and outwardly extending lower collar members 972a' and 972b'. Collar members 972a, 972b typically extend, taper or slope outwardly from the upper open end 973 of supporting assembly 916, and collar members 972a', 972b' typically extend, taper or slope outwardly from the lower end 959 of members 916a, 916b.

In exemplary embodiments, members 916a, 916b include at least one outer projection 998a, 998b and at least one inner projection 999a, 999b, respectively. In one embodiment, members 916a, 916b include one outer projection 998a, 998b and four inner projections 999a, 999b, respectively. In general, projections 998a, 999a of member 916a are positioned on the same side of member 916a, and projections 998b, 999b, of member 916b are positioned on the same side of member 916b, although the present disclosure is not limited thereto. Rather, projections 998a, 998b, 999a, 999b may be positioned on members 916a, 916b in a variety of locations.

In general, projections 998a, 998b, 999a, 999b extend past or beyond the side of members 916a, 916b (e.g., outer projections 998a, 998b extend past the side of the exterior of members 916a, 916b, and inner projections 999a, 999b extend past the side of the interior of members 916a, 916b). In exemplary embodiments, members 916a, 916b each taper outwardly from an inner or intermediate section 905a, 905b, respectively, to define upper tapered sections 908a, 908b and lower tapered sections 909a, 909b, respectively.

In general and as shown in FIGS. 88-95, exemplary third supporting member 916c takes the form of a substantially half-spherical-like or half-dome-like member 916c. Member 916c typically includes a groove or ledge 904 (e.g., annular groove or ledge) positioned at an upper portion of member 916c. In general, groove 904 travels around the inner circumference/perimeter of the interior surface of member 916c.

The releasable securement of supporting members 916a, 916b and 916c together to form assembled supporting assembly 916 is described in part with reference to FIGS. 88-95, which depict an exemplary embodiment of an assembled supporting assembly 916 for use with filter vessel assembly 10. Firstly, member 916c is positioned underneath supporting members 916a, 916b. A user would then typically squeeze or compress lower sections 909a, 909b of members 916a, 916b together until the lower collar members 972a' and 972b' were positioned at least in part within groove 904 of member 916c. In this position and as shown in FIGS. 88-91, members 916a, 916b would then be releasable secured to member 916c to form/define assembled supporting assembly 916.

It is noted that member 916c may be releasably secured to members 916a, 916b before or after first securing member 375 (or member 75 or 275) is releasably secured and/or positioned with respect to supporting assembly 916, as further described below.

Figure 95:
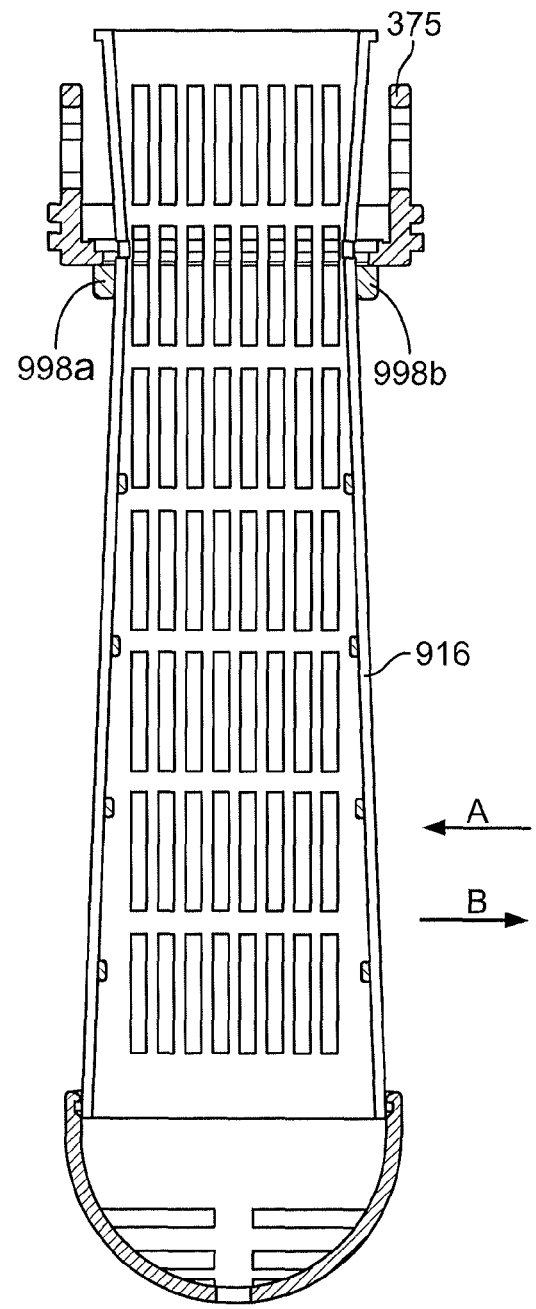

In general, projections 998a, 998b, 999a, 999b of assembled supporting assembly 916 function to substantially prevent relative motion between supporting members 916a, 916b in the general lateral directions of Arrow A and/or Arrow B of FIG. 95 when supporting assembly 916 is in the assembled position. It is noted that the interior and/or exterior surfaces of exemplary projections 998a, 998b, 999a, 999b are substantially smooth and/or planar/continuous, although the present disclosure is not limited thereto. Rather, the interior and/or exterior surfaces of projections 998a, 998b, 999a, 999b may take a variety of forms (e.g., they may include a fastening member or recess that releasably cooperates with a corresponding fastening member or recess on member 916a and/or 916b).

In exemplary embodiments and as shown in FIGS. 88-95, first securing member 375 (or member 75 or 275) for use with locking assembly 73 or the like is configured/adapted to releasably secure and/or position supporting assembly 916 within housing 14. As such, supporting assembly 916 and member 375 (or member 75 or 275) would typically be utilized in conjunction with member 80 (or member 80' or 180) and locking member 84 to releasably secure filter bag 18 to locking assembly 73 within housing 14 of filter vessel assembly 10 for filtering purposes, as described above.

As such, a user would then typically move the upper open end 973 of supporting assembly 916 through the central opening 357 of first securing member 375 and move/position the first securing member 375 towards the upper end 973 of the assembly 916 (e.g., with the user and/or member 375 compressing or squeezing the outwardly extending sections 908a, 908b together) until at least a portion of the collar members 972a and 972b of the assembly 916 engaged and/or rested upon at least a portion of the lower surface 378 of first securing member 375. In this regard, first securing member 375 can be advantageously releasably secured to supporting assembly 916 (e.g., via compressed portions 908a, 908b acting as leaf springs or like with their engaged interaction of collar members 972a and 972b and lower surface 378 of first securing member 375).

In general, first securing member 375 with supporting assembly 916 positioned thereon and/or releasably secured therewith could then have a filter member 18 (e.g., filter bag) releasably secured thereto via interaction between second securing member 80 (or member 80' or 180), locking member 84, filter member 18 (e.g., sealing member 61 of filter member 18) and first securing member 375 as similarly explained and described above. It is noted that supporting assembly 16 and other supporting assemblies explained and described above may utilize member 375 in lieu of member 75 (or 275) in locking assembly 73 or the like.

As noted above, member 916c may be releasably secured to members 916a, 916b before or after first securing member 375 (or member 75 or 275) is releasably secured and/or positioned with respect to supporting assembly 916. In exemplary embodiments, after the upper open end 973 of supporting assembly 916 has been moved through the central opening 357 of first securing member 375, the member 375 may be moved to the position shown in FIGS. 92-95. In this position, member 375 is engaged by and/or rests upon outer projections 998a, 998b. As such, a user may either first position member 375 around assembly 916 so that member 375 rests upon outer projections 998a, 998b, and then releasably secure member 916c to members 916a, 916b, or a user may first releasably secure member 916c to members 916a, 916b before member 375 is positioned around assembly 916 (e.g., either engaged with collar members 972a, 972b, or resting upon projections 998a, 998b). In an exemplary embodiment, a user first positions members 375 so that it rests upon projections 998a, 998b, then releasably secures member 916c to members 916a, 916b, and then moves member 375 so that it engaged with collar members 972a, 972b. However and as described above, these assembly/disassembly steps can generally be performed in any order desired by the user.

Figure 92:
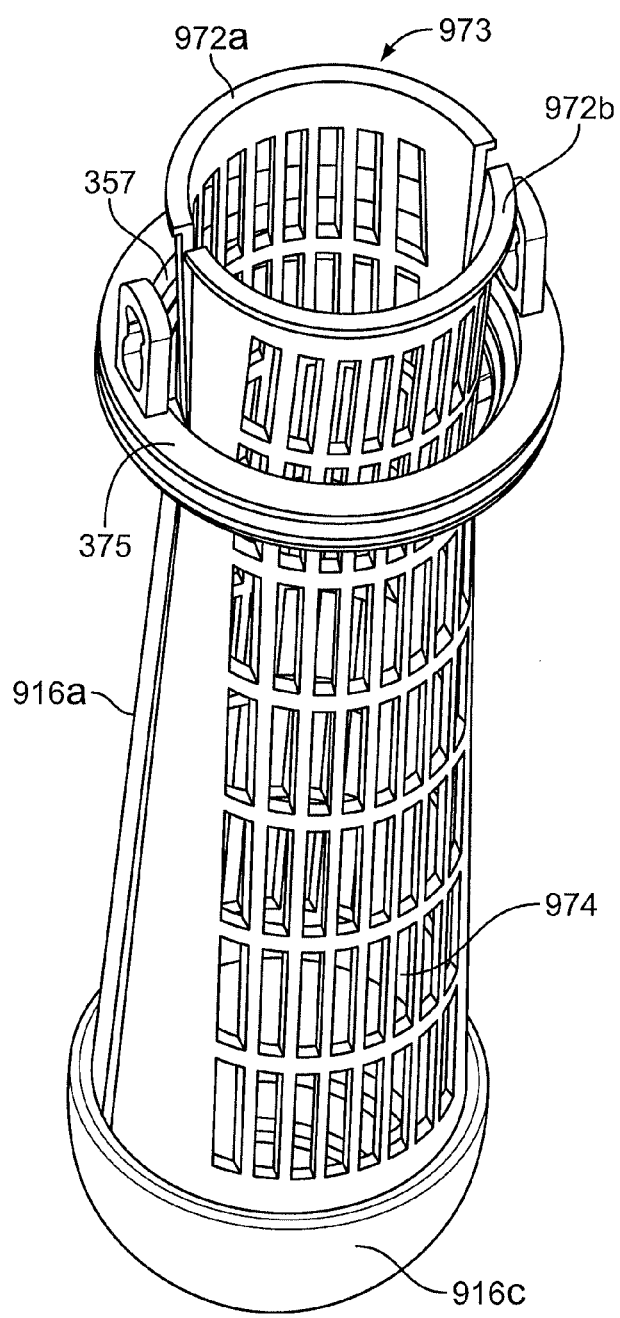
FIG. 92 is a side perspective view of the supporting assembly and first securing member of FIGS. 88-89.
Figure 93:
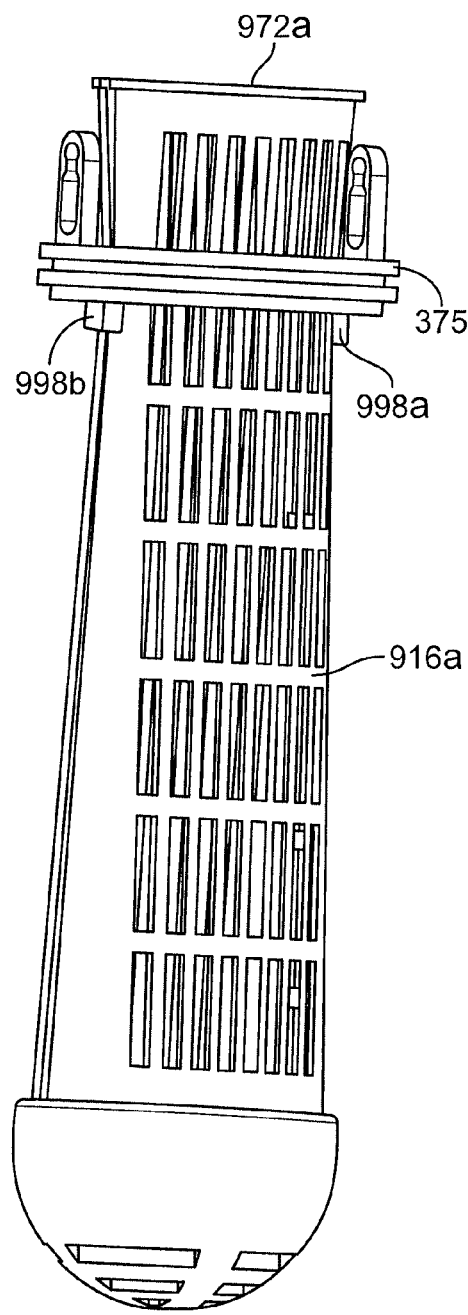
FIG. 93 is a side view of the supporting assembly and first securing member of FIGS. 88-89.
Figure 94:
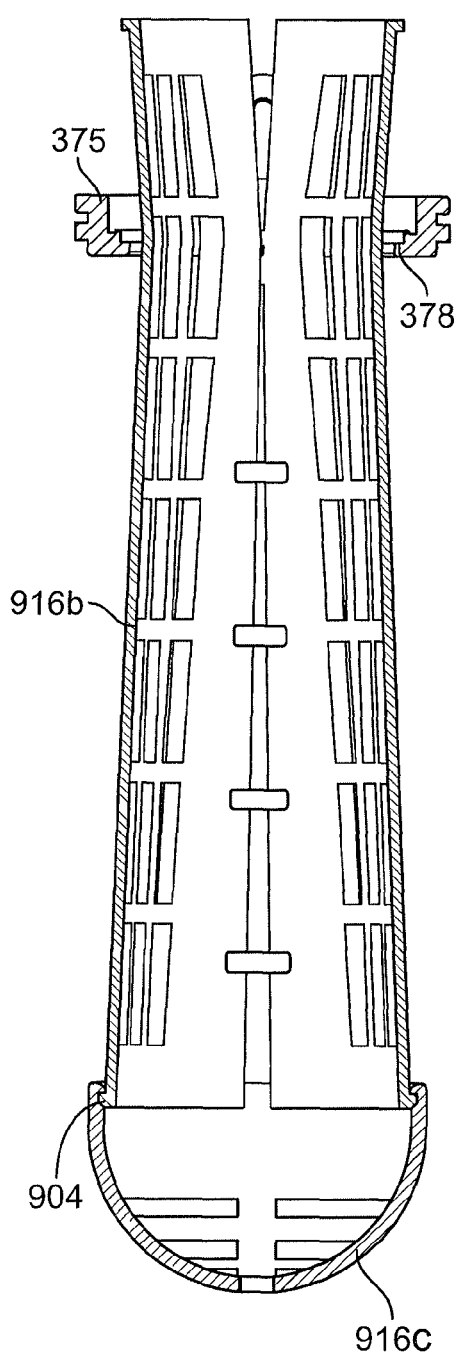
FIGS. 94-95 are side cross-sectional views of the supporting assembly and first securing member of FIGS. 88-89.

In exemplary embodiments, when a user desired to remove filter member 18 from supporting assembly 916, a user may first position members 375 so that it rests upon projections 998a, 998b. In this position and as best shown in FIG. 92, there is a clearance distance between the inner diameter of member 375 and with the members 916a, 916b of assembly 916. As such a user may wish to expand members 916a, 916b apart (e.g., until they reach the inner diameter of member 375) to assist in the removal or installation of filter member 18 from/to assembly 916. Moreover, a user may also wish to un-secure member 916c from members 916a, 916b to assist in the removal or installation of filter member 18 from/to assembly 916 (e.g., with member 375 either engaged with collar members 972a, 972b, or resting upon projections 998a, 998b).

As noted above, it has been found that in certain situations, movable supporting members 916a, 916b advantageously allow users to expand supporting assembly 916 to thereby assist users in the removal or installation of filter member 18 from/to supporting assembly 916. However, it is again to be noted that it is not required that a user expand assembled supporting assembly 916 to remove or install filter member 18 from/to supporting assembly 916. As such, a user would have the choice whether or not to expand assembled supporting assembly 916 for these purposes.

Although the systems, assemblies and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure.

What is claimed is:

1. A filter vessel assembly comprising:
an elongated housing having an interior surface;
a supporting assembly disposed within the housing;
a removable filter member configured to be at least partially disposed within the supporting assembly;
a locking assembly including a first securing member, a second securing member and a locking member disposed within the housing;
wherein the locking member is movably secured to the first securing member, thereby allowing the locking member to be moved to a desired position;
wherein at least a portion of the first securing member is sized to rest upon at least a portion of the interior surface of the housing;
wherein the first securing member defines a central opening therethrough, the first securing member including a lower surface;
wherein at least a portion of the supporting assembly is configured to travel within the central opening of the first securing member to a position where an upper end of the supporting assembly mounts to at least a portion of the lower surface of the first securing member;
wherein at least a portion of the filter member is sized to rest upon at least a portion of the first securing member;

wherein at least a portion of the second securing member is configured to be positioned above at least a portion of the filter member resting upon the first securing member; and wherein the movably secured locking member is configured to be moved to engage at least a portion of the locking member with at least a portion of at least one of the first and second securing member to releasably secure the filter member to the locking assembly.

2. The filter vessel assembly of claim 1, wherein the housing includes an open end and at least one fluid inlet;

wherein the interior surface of the housing includes an intermediate interior surface that extends inwardly toward a center of the housing;

wherein at least the portion of the first securing member is sized to rest upon at least a portion of the intermediate interior surface of the housing; and wherein the intermediate interior surface of the housing is positioned below the at least one fluid inlet relative to the open end of the housing.

3. The filter vessel assembly of claim 1, wherein the housing includes an open end; and further comprising a cover member removably mounted to the open end of the housing; and wherein the cover member fluidically seals the open end of the housing when the cover member is removably mounted to the open end of the housing.

4. The filter vessel assembly of claim 3, wherein the open end of the housing includes external threads, the external threads having a non-threaded section that is configured to allow fluid to escape from the housing via the non-threaded section when the cover member is mounted to the open end of the housing, and at least one of: (i) the housing is over-pressurized, (ii) attempt is made to remove the cover member from the open end of the housing without de-pressurizing the housing, and (iii) the cover member is not fully secured to the housing and attempt is made to pressurize the housing.

5. A filter vessel assembly comprising an elongated housing having an interior surface;

a supporting assembly disposed within the housing;

a removable filter member configured to be at least partially disposed within the supporting assembly;

a locking assembly including a first securing member, a second securing member and a locking member disposed within the housing;

wherein the locking member is movably secured to the first securing member, thereby allowing the locking member to be moved to a desired position;

wherein at least a portion of the first securing member is sized to rest upon at least a portion of the interior surface of the housing;

wherein at least a portion of the supporting assembly is configured to mount to at least a portion of the first securing member;

wherein at least a portion of the filter member is sized to rest upon at least a portion of the first securing member;

wherein at least a portion of the second securing member is configured to be positioned above at least a portion of the filter member resting upon the first securing member;

wherein the movably secured locking member is configured to be moved to engage at least a portion of the locking member with at least a portion of at least one of the first and second securing member to releasably secure the filter member to the locking assembly;

wherein the housing includes an open end; and further comprising a cover member removably mounted to the open end of the housing;

wherein the cover member fluidically seals the open end of the housing when the cover member is removably mounted to the open end of the housing;

wherein the open end of the housing includes a groove that extends around a perimeter of the open end of the housing, the groove defined by a lower wall, an outer wall and an inner wall, the inner wall including at least one slot configured to allow fluid to drain from the outer wall to a center of the housing;

wherein the lower wall extends from the outer wall to the inner wall at a downward angle between about 1° to about 10° toward the center of the housing.

6. The filter vessel assembly of claim 5, wherein the groove is configured to house a gasketing material;

wherein the cover member is configured to create a sealing surface with the gasketing material housed in the groove of the open end of the housing when the cover member is mounted to the open end of the housing; and wherein internal pressure forces the gasketing material toward the outer wall when the cover member is mounted to the open end of the housing.

7. The filter vessel assembly of claim 1, wherein the housing includes first and second fluid inlets, first and second fluid outlets, at least one fluid inlet boss, and first and second fluid outlet bosses;

wherein the first fluid inlet includes a removable cap that fluidically seals the first fluid inlet and the first fluid outlet includes a removable cap that fluidically seals the first fluid outlet; and wherein the second fluid inlet includes a hollow connector member and the second fluid outlet includes a hollow connector member.

8. The filter vessel assembly of claim 7, wherein the first and second fluid inlets and the at least one fluid inlet boss are positioned at an upper end of the housing;

wherein the first and second fluid outlets and the first and second fluid outlet bosses are positioned at a lower end of the housing;

wherein the at least one fluid inlet boss is positioned about 90° from the first and second fluid inlets on the housing; and wherein the first and second fluid outlet bosses are positioned about 90° from the first and second fluid outlets on the housing.

9. The filter vessel assembly of claim 1, wherein the supporting assembly includes an open end having a collar member;

wherein the collar member is substantially annular and extends outwardly from and around a perimeter of the open end of the supporting assembly; and wherein at least a portion of the collar member is configured to mount to at least a portion of the first securing member.

10. The filter vessel assembly of claim 1, wherein the filter member is a removable filter bag that includes an open end and a sealing member;

wherein the sealing member of the filter member is positioned proximal the open end of the filter member; and wherein at least a portion of the sealing member is sized to rest upon at least a portion of the first securing member.

11. The filter vessel assembly of claim 1, wherein the interior surface of the housing includes at least one inner protrusion that is configured to guidingly engage the supporting assembly toward a center of the housing when the supporting assembly is disposed within the housing.

12. The filter vessel assembly of claim 1, wherein the interior surface of the housing includes at least three inner protrusions positioned in a lower end of the housing, the at least three inner protrusions: (i) spaced substantially equidistantly apart from each adjacent inner protrusion, (ii) tapering inwardly from a top portion to a bottom portion of each protrusion toward a center of the housing, and (iii) configured to guidingly engage the supporting assembly toward the center of the housing when the supporting assembly is disposed within the housing.

13. The filter vessel assembly of claim 10, wherein the sealing member is a substantially annular member, the substantially annular member selected from the group consisting of a sewn-in member, a welded member, a fusion bonded member, a molded member, an adhered member, a folded member and a rolled member.

14. The filter vessel assembly of claim 1, wherein the housing defines a central vertical axis; and
wherein the interior surface of the housing includes an intermediate interior surface that extends inwardly toward a center of the housing at an angle from about 15° to about 90° relative to the central vertical axis of the housing.

15. A filter vessel assembly comprising:
an elongated housing having an interior surface;
a supporting assembly disposed within the housing;
a removable filter member configured to be at least partially disposed within the supporting assembly;
a locking assembly including a first securing member, a second securing member and a locking member disposed within the housing;
wherein the locking member is movably secured to the first securing member, thereby allowing the locking member to be moved to a desired position;
wherein at least a portion of the first securing member is sized to rest upon at least a portion of the interior surface of the housing;
wherein at least a portion of the supporting assembly is configured to mount to at least a portion of the first securing member;
wherein at least a portion of the filter member is sized to rest upon at least a portion of the first securing member;
wherein at least a portion of the second securing member is configured to be positioned above at least a portion of the filter member resting upon the first securing member;
wherein the movably secured locking member is configured to be moved to engage at least a portion of the locking member with at least a portion of at least one of the first and second securing member to releasably secure the filter member to the locking assembly;
wherein the second securing member includes an upper surface, the upper surface having a plurality of pairs of recessed portions disposed thereon;
wherein each pair includes a first recessed portion and a second recessed portion, the first and second recessed portions positioned about 180° from one another about the upper surface of the second securing member; and
wherein each pair includes a different recessed portion depth as compared to the depth of the other pairs of recessed portions.

16. A filter vessel assembly comprising:
an elongated housing having an interior surface;
a supporting assembly disposed within the housing;
a removable filter member configured to be at least partially disposed within the supporting assembly;
a locking assembly including a first securing member, a second securing member and a locking member disposed within the housing;
wherein the locking member is movably secured to the first securing member, thereby allowing the locking member to be moved to a desired position;
wherein at least a portion of the first securing member is sized to rest upon at least a portion of the interior surface of the housing;
wherein at least a portion of the supporting assembly is configured to mount to at least a portion of the first securing member;
wherein at least a portion of the filter member is sized to rest upon at least a portion of the first securing member;
wherein at least a portion of the second securing member is configured to be positioned above at least a portion of the filter member resting upon the first securing member;
wherein the movably secured locking member is configured to be moved to engage at least a portion of the locking member with at least a portion of at least one of the first and second securing member to releasably secure the filter member to the locking assembly;
wherein the first securing member includes an upper surface having a first notch and a second notch;
wherein the second securing member includes an upper surface having a first protuberance and a second protuberance extending therefrom; and
wherein at least a portion of the first protuberance is configured to be positioned within the first notch and at least a portion of the second protuberance is configured to be positioned within the second notch.

17. The filter vessel assembly of claim 16, wherein first and second post members extend from the upper surface of the first securing member; and
wherein each notch is positioned about 90° from each post member about the upper surface of the first securing member.

18. The filter vessel assembly of claim 1, wherein the first securing member includes an upper surface, an intermediate surface, the lower surface, and an outer surface;
wherein the second securing member includes an upper surface and a lower surface; and
wherein the locking member extends from a first end to a second end.

19. The filter vessel assembly of claim 18, wherein the locking member is movably secured to the upper surface of the first securing member, thereby allowing the locking member to be moved to a desired position;
wherein at least a portion of the outer surface of the first securing member is sized to rest upon at least a portion of the interior surface of the housing;
wherein at least a portion of the filter member is sized to rest upon at least a portion of the intermediate surface of the first securing member; and
wherein at least a portion of the lower surface of the second securing member is configured to be positioned above at least a portion of the filter member resting upon the intermediate surface of the first securing member.

20. The filter vessel assembly of claim 18, wherein the movably secured locking member is configured to be moved to engage at least a portion of at least one of the first and second end of the locking member with at least a portion of the upper surface of at least one of the first and second securing member to releasably secure the filter member to at least one of the first and second securing member.

21. The filter vessel assembly of claim 19, wherein the movably secured locking member is configured to be moved to engage at least a portion of at least one of the first and second end of the locking member with at least a portion of the upper surface of at least one of the first and second securing member to releasably secure the filter member to at least one of the first and second securing member.

22. The filter vessel assembly of claim 18, wherein a first camming member extends from the first end of the locking member and a second camming member extends from the second end of the locking member; and
    wherein the movably secured locking member is configured to be moved to engage at least a portion of at least one of the first and second camming member with at least a portion of the upper surface of at least one of the first and second securing member to releasably secure the filter member to at least one of the first and second securing member.

23. The filter vessel assembly of claim 18, wherein first and second post members extend from the upper surface of the first securing member; and
    wherein the first end of the locking member is movably secured to the first post member and the second end of the locking member is movably secured to the second post member.

24. The filter vessel assembly of claim 23, wherein the first post member includes a first receiving portion and the second post member includes a second receiving portion;
    wherein the locking member includes first and second mating members; and
    wherein the first mating member is configured to be movably secured to the first receiving portion and the second mating member is configured to be movably secured to the second receiving portion.

25. The filter vessel assembly of claim 24, wherein the first and second receiving portions are selected from the group consisting of apertures and recesses, and wherein the first and second mating members are selected from the group consisting of knobs and protrusions.

26. The filter vessel assembly of claim 24, wherein the first and second receiving portions are selected from the group consisting of knobs and protrusions, and wherein the first and second mating members are selected from the group consisting of apertures and recesses.

27. The filter vessel assembly of claim 18, wherein the first securing member is a substantially ring-like basket member; and
    wherein the lower surface of the first securing member tapers inwardly toward a center of the first securing member.

28. The filter vessel assembly of claim 18, wherein the intermediate surface of the first securing member extends inwardly to define a substantially planar shelf surface.

29. The filter vessel assembly of claim 18, wherein the outer surface of the first securing member extends inwardly toward a center of the first securing member; and
    wherein the outer surface of the first securing member includes a groove configured to house a gasketing material that forms a seal between the first securing member and the interior surface of the housing.

30. The filter vessel assembly of claim 23, wherein the upper surfaces of the first and second securing members include a recessed portion disposed substantially adjacent to each post member.

31. A filter vessel assembly comprising:
    an elongated housing having an interior surface;
    a supporting assembly disposed within the housing;
    a removable filter member configured to be at least partially disposed within the supporting assembly;
    a locking assembly including a first securing member, a second securing member and a locking member disposed within the housing;
    wherein the locking member is movably secured to the first securing member, thereby allowing the locking member to be moved to a desired position;
    wherein at least a portion of the first securing member is sized to rest upon at least a portion of the interior surface of the housing;
    wherein at least a portion of the supporting assembly is configured to mount to at least a portion of the first securing member;
    wherein at least a portion of the filter member is sized to rest upon at least a portion of the first securing member;
    wherein at least a portion of the second securing member is configured to be positioned above at least a portion of the filter member resting upon the first securing member;
    wherein the movably secured locking member is configured to be moved to engage at least a portion of the locking member with at least a portion of at least one of the first and second securing member to releasably secure the filter member to the locking assembly;
    wherein the first securing member includes an upper surface, an intermediate surface, a lower surface, and an outer surface;
    wherein the second securing member includes an upper surface and a lower surface; and
    wherein the lacking member extends from a first end to a second end;
    wherein first and second post members extend from the upper surface of the first securing member;
    wherein the first end of the locking member is movably secured to the first post member and the second end of the locking member is movably secured to the second post member;
    wherein the upper surfaces of the first and second securing members include a recessed portion disposed substantially adjacent to each post member;
    wherein a first camming member extends from the first end of the locking member and a second camming member extends from the second end of the locking member; and
    wherein the movably secured locking member is configured to be moved to engage at least a portion of at least one of the first and second camming member with at least at portion of the recessed portion of at least one of the first and second securing member to releasably secure the filter member to at least one of the first and second securing member.

32. The filter vessel assembly of claim 18, wherein the housing includes an open end and at least one fluid inlet;
    wherein the interior surface of the housing includes an intermediate interior surface that extends inwardly toward a center of the housing to define a substantially planar shelf surface;

wherein at least a portion of the outer surface of the first securing member is sized to rest upon at least a portion of the intermediate interior surface of the housing; and wherein the intermediate interior surface of the housing is positioned below the at least one fluid inlet relative to the open end of the housing.

33. The filter vessel assembly of claim 18, wherein the second securing member is a hollow, substantially ring-like member; and wherein the lower surface of the second securing member includes a downwardly extending lip portion depending therefrom.

34. The filter vessel assembly of claim 24, wherein the locking member is a substantially C-shaped locking handle; and wherein the first mating member is positioned proximal the first end of the locking member and the second mating member is positioned proximal the second end of the locking member.

35. A filter vessel assembly comprising:

an elongated housing having an interior surface;

a supporting assembly disposed within the housing;

a removable filter member configured to be at least partially disposed within the supporting assembly;

a locking assembly including a first securing member, a second securing member and a locking member disposed within the housing;

wherein the locking member is movably secured to the first securing member, thereby allowing the locking member to be moved to a desired position;

wherein at least a portion of the first securing member is sized to rest upon at least a portion of the interior surface of the housing;

wherein at least a portion of the supporting assembly is configured to mount to at least a portion of the first securing member;

wherein at least a portion of the filter member is sized to rest upon at least a portion of the first securing member;

wherein at least a portion of the second securing member is configured to be positioned above at least a portion of the filter member resting upon the first securing member;

wherein the movably secured locking member is configured to be moved to engage at least a portion of the locking member with at least a portion of at least one of the first and second securing member to releasably secure the filter member to the locking assembly;

wherein the first securing member includes an upper surface, an intermediate surface, a lower surface, and an outer surface;

wherein the second securing member includes an upper surface and a lower surface; and wherein the locking member extends from a first end to a second end;

wherein the filter member is a removable filter bag that includes an open end and a sealing member;

wherein the sealing member of the filter member is substantially annular and is positioned proximal the open end of the filter member;

wherein at least a portion of the sealing member is sized to rest upon at least a portion of the intermediate surface of the first securing member; and wherein the intermediate surface of the first securing member extends inwardly to define a substantially planar shelf surface.

36. The filter vessel assembly of claim 18, wherein the first securing member further includes an interior surface; and wherein the second securing member further includes an outer surface having a groove configured to house a gasketing material, the gasketing material forming a seal with the interior surface of the first securing member when the filter member is releasably secured to the locking assembly.

37. The filter vessel assembly of claim 29, wherein the interior surface of the housing includes an intermediate interior surface that extends inwardly toward a center of the housing; and wherein the gasketing material housed in the groove of the outer surface of the first securing member forms a face seal between the first securing member and the intermediate interior surface of the housing.

38. The filter vessel assembly of claim 1, wherein the supporting assembly includes a first rib member that extends from the upper end of the supporting assembly to a position along the length of the supporting assembly;

wherein the first securing member includes the lower surface, the lower surface having a first slot; and wherein at least a portion of the first rib member is configured to travel within the first slot to a position where the upper end of the supporting assembly rests upon at least a portion of the lower surface of the first securing member.

39. The filter vessel assembly of claim 38, wherein after the upper end of the supporting assembly rests upon at least a portion of the lower surface of the first securing member, the first securing member is configured to be rotated to a position where the first slot is not aligned with the first rib member, thereby preventing the first rib member from traveling within the first slot.

40. The filter vessel assembly of claim 39, wherein at least one of the upper end of the first rib member and the first slot includes a camming surface; and wherein after the first securing member is rotated to a position where the first slot is not aligned with the first rib member, the camming surface releasably secures the first securing member to the supporting assembly.

41. The filter vessel assembly of claim 1, wherein the supporting assembly includes a first supporting member and a second supporting member, the first and second supporting members are configured to be releasably secured together to form the supporting assembly.

42. A filter vessel assembly comprising:

an elongated housing having an interior surface;

a supporting assembly disposed within the housing;

a removable filter member configured to be at least partially disposed within the spotting assembly;

a locking assembly including a first securing member, a second securing member and a locking member disposed within the housing;

wherein the locking member is movably secured to the first securing member, thereby allowing the locking member to be moved to desired position;

wherein at least a portion of the first securing member is sized to rest upon at least a portion of the interior surface of the housing;

wherein at least a portion of the supporting assembly is configured to mount to at least a portion of the first securing member;

wherein at least a portion of the filter member is sized to rest upon at least a portion of the first securing member;

wherein at least a portion of the second securing member is configured to be positioned above at least a portion of the filter member resting upon the first securing member;

wherein the movably secured locking member is configured to be moved to engage at least a portion of the locking member with at least a portion of at least one of the first and second securing member to releasably secure the filter member to the locking assembly;

wherein the supporting assembly includes a first supporting member and a second supporting member, the first and second supporting members are con figured to be releasably secured together to form the supporting assembly;

wherein the first supporting member includes a first receiving rod, a first receiving opening and a first fastening member;

wherein the second supporting member includes a second receiving rod, a second receiving opening and a second fastening member; and wherein at least a portion of the first fastening member is positioned around the second receiving rod and within at least a portion of the second receiving opening, and at least a portion of the second fastening member is positioned around the first receiving rod and within at least a portion of the first receiving opening to releasably secure the first and second supporting members together to form the supporting assembly.

43. A filter vessel assembly comprising:

an elongated housing having an interior surface;

a supporting assembly disposed within the housing;

a removable filter member configured to be at least partially disposed within the supporting assembly;

a locking assembly including a first securing member, a second securing member and a locking member disposed within the horsing;

wherein the locking member is movably secured to the first securing member, thereby allowing the locking member to be moved to a desired position;

wherein at least a portion of the first securing member is sized to rest upon at least a portion of the interior surface of the housing;

wherein at least a portion of the supporting assembly is configured to mount to at least a portion of the first securing member;

wherein at least a portion of the filter member is sized to rest upon at least a portion of the first securing member;

wherein at least a portion of the second securing member is configured to be positioned above at least a portion of the filter member resting upon the first securing member;

wherein the movably secured locking member is configured to be moved to engage at least a portion of the locking member with at least a portion of at least one of the first and second securing member to releasably secure the filter member to the locking assembly;

wherein the supporting assembly includes a first supporting member and a second supporting member, the first and second supporting members are configured to be releasably secured together to form the supporting assembly;

wherein the first supporting member includes a first receiving rod, first and second receiving openings and first and second fastening members;

wherein the second supporting member includes a second receiving rod, third and fourth receiving openings and third and fourth fastening members;

wherein when the first and second supporting members are releasably secured together to form the supporting assembly: (i) at least a portion of the first fastening member is positioned around the second receiving rod and within at least a portion of the third receiving opening, (ii) at least a portion of the second fastening member is positioned around the second receiving rod and within at least a portion of the fourth receiving opening, (iii) at least a portion of the third fastening member is positioned around the first receiving rod and within at least a portion of the first receiving opening, and (iv) at least a portion of the fourth fastening member is positioned around the first receiving rod and within at least a portion of the second receiving opening; and wherein the first and second fastening members are selected from the group consisting of U-shaped and C-shaped fastening members.

44. The filter vessel assembly of claim 16, wherein the supporting assembly is integrally mounted with respect to the first securing member.

45. A filter vessel assembly comprising:

an elongated housing having an interior surface;

a supporting assembly disposed within the housing;

a removable filter member configured to be at least partially disposed within the supporting assembly;

a locking assembly including a first securing member, a second securing member and a locking member disposed within the housing;

wherein the locking member is movably secured to the first securing member, thereby allowing the locking member to be moved to a desired position;

wherein at least a portion of the first securing member is sized to rest upon at least a portion of the interior surface of the housing;

wherein at least a portion of the supporting assembly is configured to mount to at least a portion of the first securing member;

wherein at least a portion of the filter member is sized to rest upon at least a portion of the first securing member;

wherein at least a portion of the second securing member is configured to be positioned above at least a portion of the filter member resting upon the first securing member;

wherein the movably secured locking member is configured to be moved to engage at least a portion of the locking member with at least a portion of at least one of the first and second securing member to releasably secure the filter member to the locking assembly;

wherein the supporting assembly includes a first supporting member and a second supporting member, the first and second supporting members are configured to be releasably secured together to form the supporting assembly;

wherein the first supporting member includes a first extending portion and a first recessed portion;

wherein the second supporting member includes a second extending portion and a second recessed portion;

wherein when the first and second supporting members are releasably secured together to form the supporting assembly, at least a portion of the first extending portion is housed within the second recessed portion, and at least a portion of the second extending portion is housed within the first recessed portion; and wherein the first and second extending portions and the first and second recessed portions are substantially triangular in shape.

46. A filter vessel assembly comprising:

an elongated housing having an interior surface;

a supporting assembly disposed within the housing;

a removable filter member configured to be at least partially disposed within the supporting assembly;
a locking assembly including a first securing member, a second securing member and a locking member disposed within the housing;
wherein the locking member is movably secured to the first securing member, thereby allowing the locking member to be moved to a desired position;
wherein at least a portion of the first securing member is sized to rest upon at least a portion of the interior surface of the housing;
wherein at least a portion of the supporting assembly is configured to mount to at least a portion of the first securing member;
wherein at least a portion of the filter member is sized to rest upon at least a portion of the first securing member;
wherein at least a portion of the second securing member is configured to be positioned above at least a portion of the filter member resting upon the first securing member;
wherein the movably secured locking member is configured to be moved to engage at least a portion of the locking member with at least a portion of at least one of the first and second securing member to releasably secure the filter member to the locking assembly;
wherein the supporting assembly includes a first supporting member and a second supporting member, the first and second supporting members are configured to be releasably secured together to form the supporting assembly;
wherein the first supporting member includes a first leg member and the second supporting member includes a second leg member; and
wherein when the first and second supporting members are releasably secured together to form the supporting assembly, the first and second leg members are configured to position the supporting assembly on a surface via the first and second leg members.

47. A filter vessel assembly comprising:
an elongated housing having an interior surface;
a supporting assembly disposed within the housing;
a removable filter member configured to be at least partially disposed within the supporting assembly;
a locking assembly including a first securing member, a second securing member and a locking member disposed within the housing;
wherein the locking member is movably secured to the first securing member, thereby allowing the locking member to be moved to a desired position;
wherein at least a portion of the first securing member is sized to rest upon at least a portion of the interior surface of the housing;
wherein at least a portion of the supporting assembly is configured to mount to at least a portion of the first securing member;
wherein at least a portion of the filter member is sized to rest upon at least a portion of the first securing member;
wherein at least a portion of the second securing member is configured to be positioned above at least a portion of the filter member resting upon the first securing member;
wherein the movably secured locking member is configured to be moved to engage at least a portion of the locking member with at least a portion of at least one of the first and second securing member to releasably secure the filter member to the locking assembly;
wherein the supporting assembly includes a first supporting member and a second supporting member, the first and second supporting members are configured to be releasably secured together to form the supporting assembly;
wherein the first supporting member includes a first rib member that extends from an upper end of the first supporting member to a position along the length of the first supporting member;
wherein the second supporting member includes a second rib member that extends from an upper end of the second supporting member to a position along the length of the second supporting member;
wherein the first securing member includes the lower surface having a first slot and a second slot; and
wherein at least a portion of the first rib member is configured to travel within the first slot and at least a portion of the second rib member is configured to travel within the second slot to a position where the upper end of the supporting assembly rests upon at least a portion of the lower surface of the first securing member.

48. The filter vessel assembly of claim 47, wherein after the upper end of the supporting assembly rests upon at least a portion of the lower surface of the first securing member, the first securing member is configured to be rotated to a position where the first and second slot are not aligned with the first and second rib members, thereby preventing the first and second rib members from traveling within the first and second slots.

49. A filter vessel assembly comprising:
an elongated housing having an interior surface;
a supporting assembly disposed within the housing;
a removable filter member configured to be at least partially disposed within the supporting assembly;
a locking assembly including a first securing member, a second securing member and a locking member disposed within the housing;
wherein the locking member is movably secured to the first securing member, thereby allowing the locking member to be moved to a desired position;
wherein at least a portion of the first securing member is sized to rest upon at least a portion of the interior surface of the housing;
wherein at least a portion of the supporting assembly is configured to mount to at least a portion of the first securing member;
wherein at least a portion of the filter member is sized to rest upon at least a portion of the first securing member;
wherein at least a portion of the second securing member is configured to be positioned above at least a portion of the filter member resting upon the first securing member;
wherein the movably secured locking member is configured to be moved to engage at least a portion of the locking member with at least a portion of at least one of the first and second securing member to releasably secure the filter member to the locking assembly;
wherein the supporting assembly includes a first supporting member and a second supporting member, the first and second supporting members are configured to be releasably secured together to form the supporting assembly;
wherein the first supporting member includes a first plurality of rib members extending from an upper end of the first supporting member to a position along the length of the first supporting member;

wherein the second supporting member includes a second plurality of rib members extending from an upper end of the second supporting member to a position along the length of the second supporting member;

wherein when the first and second supporting members are releasably secured together to form the supporting assembly, each rib member of the first and second plurality is spaced substantially equidistantly apart from each adjacent rib member around the assembled supporting assembly;

wherein the first securing member includes a lower surface having a plurality of slots; and wherein each rib member is configured to travel within one of the slots to a position where the upper end of the supporting assembly rests upon at least a portion of the lower surface of the first securing member.

50. The filter vessel assembly of claim 47, wherein the first rib member is positioned along an outer edge of the first supporting member, the first rib member extending a distance past the outer edge of the first supporting member; and wherein when the first and second supporting members are releasably secured together to form the supporting assembly, the first rib member substantially prevents lateral motion of the first and second supporting members.

51. A filter vessel assembly comprising:
an elongated housing having an interior surface;
a supporting assembly disposed within the housing;
a removable filter member configured to be at least partially disposed within the supporting assembly;
a locking assembly including a first securing member, a second securing member and a locking member disposed within the housing;
wherein the locking member is movably secured to the first securing member, thereby allowing the locking member to be moved to a desired position;
wherein at least a portion of the first securing member is sized to rest upon at least portion of the interior surface of the housing;
wherein at least a portion of the supporting assembly is configured to mount to at least a portion of the first securing member;
wherein at least a portion of the filter member is sized to rest upon at least a portion of the first securing member;
wherein at least a portion of the second securing member is configured to be positioned above at least a portion of the filter member resting upon the first securing member;
wherein the movably secured locking member is configured to be moved to engage at least a portion of the locking member with at least a portion of at least one of the first and second securing member to releasably secure the filter member to the locking assembly;
wherein the supporting assembly includes a first supporting member and a second supporting member, the first and second supporting members are configured to be releasably secured together to form the supporting assembly;
wherein the first supporting member includes at least a first receiving member at a lower end of the first supporting member, the first receiving member configured to receive at least a first portion of an elongated member;
wherein the second supporting member includes at least a second receiving member at a lower end of the second supporting member, the second receiving member configured to receive at least a second portion of the elongated member; and wherein at least the first portion of the elongated member is positioned within the first receiving member and at least the second portion of the elongated member is positioned within the second receiving member to hingedly secure the first and second supporting members together.

52. The filter vessel assembly of claim 51, wherein the first supporting member includes a first plurality of receiving members configured to receive at least a portion of an elongated rod member, each receiving member of the first plurality having an aperture therethrough;

wherein the second supporting member includes a second plurality of receiving members configured to receive at least a portion of the elongated rod member, each receiving member of the second plurality having an aperture therethrough; and wherein the first and second supporting members are hingedly secured together when: (i) each receiving member of the first plurality is positioned adjacent to a receiving member of the second plurality, and (ii) at least a portion of the elongated rod member is positioned within the apertures of the first and second plurality of receiving members.

53. A filter vessel assembly comprising:
an elongated housing having an interior surface;
a supporting assembly disposed within the housing;
a removable filter member configured to be at least partially disposed within the supporting assembly;
a locking assembly including a first securing member, a second securing member and a locking member disposed within the housing;
wherein the locking member is movably secured to the first securing member there allowing the locking member to be moved to a desired position;
wherein at least a portion of the first securing member is sized to rest upon at least a portion of the interior surface of the housing;
wherein at least a portion of the supporting assembly is configured to mount to at least a portion of the first securing member;
wherein at least a portion of the filter member is sized to rest upon at least a portion of the first securing member;
wherein at least a portion of the second securing member is configured to be positioned above at least a portion of the filter member resting upon the first securing member;
wherein the movably secured locking member is configured to be moved to engage at least a portion of the locking member with at least a portion of at least one of the first and second securing member to releasably secure the filter member to the locking assembly;
wherein the supporting assembly includes a first supporting member and a second supporting member, the first and second supporting members are configured to be releasably secured together to form the supporting assembly;
wherein the first supporting member includes a first rib member that extends from an upper end of the first supporting member to a position along the length of the first securing member;
wherein the second supporting member includes a second rib member that extends from an upper end of the second supporting member to a position along the length of the second securing member;

wherein the first rib member is positioned along an outer edge of the first supporting member, the first rib member extending a distance past the outer edge of the first supporting member;

wherein the second rib member is positioned along an outer edge of the second supporting member, the second rib member extending a distance past the outer edge of the second supporting member; and wherein at least a first securement member is positioned around the first rib member and around at least a portion of the second supporting member, and at least a second securement member is positioned around the second rib member and around at least a portion of the first supporting member to releasably secure the first and second supporting members together to form the supporting assembly.

54. The filter vessel assembly of claim 53, wherein a first plurality of securement members are positioned around the first rib member and around at least a portion of the second supporting member, and a second plurality of securement members are positioned around the second rib member and around at least a portion of the first supporting member to releasably secure the first and second supporting members together to form the supporting assembly; and wherein each securement member of the first and second plurality is a substantially continuous ring member having a slot.

55. A filter vessel assembly comprising:
an elongated housing having an interior surface;
a supporting assembly disposed within the housing;
a removable filter member configured to be at least partially disposed within the supporting assembly;
a locking assembly including a first securing member, a second securing member and a locking member disposed within the housing;
wherein the locking member is movably secured to the first securing member, thereby allowing the locking member to be moved to a desired position;
wherein at least a portion of the first securing member is sized to rest upon at least a portion of the interior surface of the housing;
wherein at least a portion of the supporting assembly is configured to mount to at least a portion of the first securing member;
wherein at least a portion of the filter member is sized to rest upon at least a portion of the first securing member;
wherein at least a portion of the second securing member is configured to be positioned above at least a portion of the filter member resting upon the first securing member;
wherein the movably secured locking member is configured to be moved to engage at least a portion of the locking member with at least a portion of at least one of the first and second securing member to releasably secure the filter member to the locking assembly;
wherein the first supporting member includes at least a first receiving member positioned along a first outer edge of the first supporting member, and at least a second receiving member positioned along a second outer edge of the first supporting member;
wherein the second supporting member includes at least a third receiving member positioned along a first outer edge of the second supporting member, and at least a fourth receiving member positioned along a second outer edge of the second supporting member;
wherein at least a portion of a first elongated member is positioned within the first and third receiving members, and at least a portion of a second elongated member is positioned within the second and fourth receiving members to releasably secure the first and second supporting members together to form the supporting assembly.

56. A filter vessel assembly comprising:
an elongated housing having an interior surface;
a supporting assembly disposed within the housing;
a removable tilter member configured to be at least partially disposed within the supporting assembly;
a locking assembly including a first securing member, a second securing member and a locking member disposed within the housing;
wherein the lock ing member is movably secured to the first securing member, thereby allowing the locking member to be moved to a desired position;
wherein at least a portion of the first securing member is sized to rest upon at least a portion of the interior surface of the housing;
wherein at least a portion of the supporting assembly is configured to mount to at least a portion of the first securing member;
wherein at least a portion of the filter member is sized to rest upon at least a portion of the first securing member;
wherein at least a portion of the second securing member is configured to be positioned above at least a portion of the filter member resting upon the first securing member;
wherein the movably secured locking member is configured to be moved to engage at least a portion of the locking member with at least a portion of at least one of the first and second securing member to releasably secure the filter member to the locking assembly;
wherein the supporting assembly includes an upper end, a lower end, and a plurality of extending portions; and
wherein a slit extends between each extending portion, each slit extending from the upper end to a position along the length of the supporting assembly.

57. The filter vessel assembly of claim 56, wherein the supporting assembly includes four extending portions, each extending portion extending from the upper end to the lower end; and wherein each slit extends from the upper end to the lower end.

58. The filter vessel assembly of claim 56, wherein when the supporting assembly is mounted to at least a portion of the first securing member, the upper end of each extending portion is compressively engaged with the first securing member.

59. The filter vessel assembly of claim 56, wherein the supporting assembly includes two extending portions; and wherein the lower end of the supporting assembly includes at least one hinge member that is hingedly attached to each extending portion.

60. The filter vessel assembly of claim 1, wherein the supporting assembly includes a first supporting member, a second supporting member and a third supporting member, the first, second and third supporting members configured to be releasably secured together to form the supporting assembly.

61. A filter vessel assembly comprising:
an elongated housing having an interior surface;
a supporting assembly disposed within the housing;
a removable filter member configured to be at least partially disposed within the supporting assembly;

a locking assembly including a first securing member, a second securing member and a locking member disposed within the housing;
wherein the locking member is movably secured to the first securing member, thereby allowing the locking member to be moved to a desired position;
wherein at least a portion of the first securing member is sized to rest upon at least a portion of the interior surface of the housing;
wherein at least a portion of the supporting assembly is configured to mount to at least a portion of the first securing member;
wherein at least a portion of the filter member is sized to rest upon at least a portion of the first securing member;
wherein at least a portion of the second securing member is configured to be positioned above at least a portion of the filter member resting upon the first securing member;
wherein the movably secured locking member is configured to be moved to engage at least a portion of the locking member with at least a portion of at least one of the first and second securing member to releasably secure the filter member to the locking assembly;
wherein the supporting assembly includes a first supporting member, a second supporting member and a third supporting member, the first, second and third supporting members configured to be releasably secured together to form the supporting assembly;
wherein the first and second supporting members each taper outwardly from an intermediate section to define an upper tapered section and a lower tapered section, each upper tapered section having an upper end and each lower tapered section having a lower end;
wherein the third supporting member is a substantially half-spherical member, the third supporting member including an interior surface having a groove; and
wherein at least a portion of each lower end of each lower tapered section is positioned within the groove to releasably secure the first, second and third supporting members together to form the supporting assembly.

62. The filter vessel assembly of claim 61, wherein the first and second supporting members each include at least one outer projection and at least one inner projection positioned along and extending a distance past an outer edge of each supporting member; and
wherein when the first, second and third supporting members are releasably secured together to form the supporting assembly, each outer and inner projection substantially prevents lateral motion of the first and second supporting members.

63. The filter vessel assembly of claim 62, wherein when the supporting assembly is mounted to at least a portion of the first securing member, the upper end of each upper tapered section is compressively engaged with the first securing member; and
wherein the first securing member is configured to rest upon at least one outer projection when the upper end of each upper tapered section is compressively disengaged from the first securing member.

64. The filter vessel assembly of claim 6, wherein the cover member includes an inner surface having a protruding section that is configured to create a sealing surface with the gasketing material housed in the groove of the open end of the housing when the cover member is mounted to the open end of the housing.

65. The filter vessel assembly of claim 3, wherein the cover member includes a downwardly extending member that is configured to displace the fluid in the housing as the cover member is removably secured to the open end of the housing.

66. A filter locking assembly comprising:
a supporting assembly having an upper open end;
a removable filter member configured to be at least partially disposed within the supporting assembly;
a first securing member, a second securing member and a locking member;
wherein the first securing member defines a central opening therethrough, the first securing member including a lower surface;
wherein at least a portion of the supporting assembly is configured to travel within the central opening of the first securing member to a position where the upper open end of the supporting assembly mounts to at least a portion of the lower surface of the first securing, member;
wherein the locking member is movably secured to the first securing member, thereby allowing the locking member to be moved to a desired position;
wherein at least a portion of the filter member is sized to rest upon at least a portion of the first securing member;
wherein at least a portion of the second securing member is configured to be positioned above at least a portion of the filter member resting upon the first securing member; and
wherein the movably secured locking member is configured to be moved to engage at least a portion of the locking member with at least a portion of at least one of the first and second securing member to releasably secure the filter member to at least one of the first and second securing member.

67. A filter vessel assembly comprising:
an elongated housing having an interior surface, an open end, at least one fluid inlet and at least one fluid outlet;
a cover member removably mounted to the open end of the housing;
a removable supporting assembly configured to be disposed within the housing, the supporting assembly including: (i) an open end having an upper collar member, and (ii) a plurality of apertures configured to allow fluid to pass therethrough;
a removable filter member configured to be at least partially disposed within the supporting assembly;
a locking assembly including a first securing member, a second securing member and a locking member disposed within the housing, the first securing member having: (i) an upper surface, (ii) an intermediate surface, (iii) a lower surface and (iv) an outer surface, the second securing member having: (i) an upper surface, and (ii) a lower surface, and the locking member extending from a first end to a second end, a first camming member extending from the first end and a second camming member extending from the second end;
wherein the first securing member defines a central opening therethrough;
wherein the locking member is movably secured to the upper surface of the first securing member, thereby allowing the locking member to be moved to a desired position;
wherein at least a portion of the outer surface of the first securing member is sized to rest upon at least a portion of the interior surface of the housing;
wherein at least a portion of the supporting assembly is configured to travel within the central opening of the first securing member to a position where the upper collar member of the supporting assembly mounts to at least a portion of the lower surface of the first securing member;

wherein at least a portion of the filter member is sized to rest upon at least a portion of the intermediate surface of the first securing member;

wherein at least a portion of the lower surface of the second securing member is configured to be positioned above at least a portion of the filter member resting upon the intermediate surface of the first securing member; and wherein the movably secured locking member is configured to be moved to engage the first and second camming members with the upper surfaces of the first and second securing members to releasably secure the filter member to the first and second securing members.

68. A filter vessel assembly comprising:

an elongated housing having an interior surface and an open end;

a removable filter member configured to be at least partially disposed within the housing;

a cover member removably mounted to the open end of the housing; and wherein the cover member fluidically seals the open end of the housing when the cover member is removably mounted to the open end of the housing;

wherein the open end of the housing includes a groove that extends around a perimeter of the open end of the housing, the groove defined by a lower wall, an outer wall and an inner wall;

wherein the lower wall extends from the outer wall to the inner wall at a downward angle between about 10° to about 10° toward a center of the housing;

wherein the groove is configured to house a gasketing material;

wherein the cover member is configured to create a sealing surface with the gasketing material housed in the groove of the open end of the housing when the cover member is mounted to the open end of the housing; and wherein internal pressure forces the gasketing material toward the outer wall when the cover member is mounted to the open end of the housing.

69. The filter vessel assembly of claim 68, wherein the cover member includes an inner surface having a protruding section that is configured to create a sealing surface with the gasketing material housed in the groove of the open end of the housing when the cover member is mounted to the open end of the housing.

70. The filter vessel assembly of claim 68, wherein the housing includes first and second fluid inlets, first and second fluid outlets, at least one fluid inlet boss, and first and second fluid outlet bosses;

wherein the first fluid inlet includes a removable cap that fluidically seals the first fluid inlet and the first fluid outlet includes a removable cap that fluidically seals the first fluid outlet; and wherein the second fluid inlet includes a hollow connector member and the second fluid outlet includes a hollow connector member.

71. The filter vessel assembly of claim 68, wherein the interior surface of the housing includes at least three inner protrusions positioned in a lower end of the housing, the at least three inner protrusions: (i) spaced substantially equidistantly apart from each adjacent inner protrusion, (ii) tapering inwardly from a top portion to a bottom portion of each protrusion toward the center of the housing, and (iii) configured to removably secure the removable filter member in the housing when the removable filter member is disposed within the housing.

72. The filter vessel assembly of claim 68, wherein the open end of the housing includes external threads, the external threads having a non-threaded section that is configured to allow fluid to escape from the housing via the non-threaded section when the cover member is mounted to the open end of the housing, and at least one of: (i) the housing is over-pressurized, (ii) attempt is made to remove the cover member from the open end of the housing without de-pressurizing the housing, and (iii) the cover member is not fully secured to the housing and attempt is made to pressurize the housing.

73. The filter vessel assembly of claim 70, wherein the first and second fluid inlets and the at least one fluid inlet boss are positioned at an upper end of the housing;

wherein the first and second fluid outlets and the first and second fluid outlet bosses are positioned at a lower end of the housing;

wherein the at least one fluid inlet boss is positioned about 90° from the first and second fluid inlets on the housing; and wherein the first and second fluid outlet bosses are positioned about 90° from the first and second fluid outlets on the housing.

74. The filter vessel assembly of claim 68, wherein the removable filter member is a filter cartridge.

75. The filter vessel assembly of claim 68, wherein the cover member includes a downwardly extending member that is configured to displace the fluid in the housing as the cover member is removably secured to the open end of the housing.

76. The filter vessel assembly of claim 68, wherein the inner wall includes at least one slot configured to allow fluid to drain from the outer wall to the center of the housing.

* * * * *